(12) United States Patent
Hasegawa et al.

(10) Patent No.: US 7,197,188 B2
(45) Date of Patent: Mar. 27, 2007

(54) IMAGE CODING APPARATUS, IMAGE CODING METHOD, IMAGE DECODING APPARATUS AND IMAGE DECODING METHOD

(75) Inventors: Yuri Hasegawa, Tokyo (JP); Shunichi Sekiguchi, Tokyo (JP); Shinichi Kuroda, Tokyo (JP); Kohtaro Asai, Tokyo (JP); Hirofumi Nishikawa, Tokyo (JP); Yoshimi Isu, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/231,835

(22) Filed: Sep. 22, 2005

(65) Prior Publication Data

US 2006/0067581 A1    Mar. 30, 2006

Related U.S. Application Data

(62) Division of application No. 09/530,136, filed as application No. PCT/JP98/04815 on Oct. 23, 1998.

(30) Foreign Application Priority Data

Oct. 27, 1997 (JP) ................... 9-293940
Mar. 6, 1998 (JP) ................... 10-054694

(51) Int. Cl.
*G06K 9/36* (2006.01)
(52) U.S. Cl. ............... 382/232; 382/233; 382/236
(58) Field of Classification Search ............ 382/236, 382/232, 233, 203, 248, 199; 375/240.27, 375/240.25, 240.16, 240.12, 240.15; 386/111; 360/32; 348/386.1, 586; 714/752
See application file for complete search history.

(56) References Cited

U.S. PATENT DOCUMENTS

| 5,623,312 A | 4/1997 | Yan et al. ............... 375/240.16 |
| 5,629,736 A | 5/1997 | Haskell et al. ........... 348/386.1 |
| 5,687,095 A | 11/1997 | Haskell et al. ........... 348/396.1 |
| 5,778,143 A | 7/1998 | Boyce ....................... 386/111 |
| 5,786,858 A | 7/1998 | Yagasaki et al. ........ 375/240.15 |

(Continued)

FOREIGN PATENT DOCUMENTS

EP    0674448 A2    9/1995

(Continued)

OTHER PUBLICATIONS

ISO/IEC JTC1/SC29/WG11 MPEG97/N1796, MPEG-4 Video Verification Model Version 8.0, Stockholm 1997, Jul. 1997, XP002234444.

*Primary Examiner*—Anh Hong Do
(74) *Attorney, Agent, or Firm*—Birch, Stewart, Kolasch & Birch, LLP

(57) ABSTRACT

A coded bit stream generated on a coding side consists of a VO header, a VOL header, a GOV header, a VOP header and VOP data, and the VOL header multiplexes an object intra-coded indicator signal indicating whether all the VOP data contained in a VOL or GOV are intra coded or not. This enables a decoding side to recognize whether all the VOP data contained in the VOL or GOV in the coded bit stream are intra coded or not by only analyzing the object intra-coded indicator signal. This can facilitate such processings as frame skip control or random access of the VOPs.

1 Claim, 41 Drawing Sheets

U.S. PATENT DOCUMENTS

| | | | |
|---|---|---|---|
| 5,887,110 A | 3/1999 | Tomoaki et al. | 386/68 |
| 6,134,695 A * | 10/2000 | Sasaki et al. | 714/752 |
| 6,141,385 A * | 10/2000 | Yamaji | 375/240.27 |
| 6,298,460 B1 * | 10/2001 | Sasaki et al. | 714/752 |
| 6,574,765 B2 * | 6/2003 | Sasaki et al. | 714/752 |

FOREIGN PATENT DOCUMENTS

| | | |
|---|---|---|
| EP | 0752705 A3 | 1/1997 |
| JP | 5030454 A | 2/1993 |
| JP | 6268969 A | 9/1994 |
| JP | 7264590 A | 10/1995 |
| JP | 8-125967 B1 | 5/1996 |
| JP | 9-23404 A | 1/1997 |
| JP | 9-27944 | 1/1997 |
| JP | 9-507976 | 8/1997 |
| WO | WO-94/17634 | 8/1994 |

* cited by examiner

IMAGE CODING APPARATUS, IMAGE CODING METHOD, IMAGE DECODING APPARATUS AND IMAGE DECODING METHOD

CROSS REFERENCE TO RELATED APPLICATIONS

This application is a Divisional of co-pending application Ser No. 09/530,136 filed on Apr. 27, 2000 and for which priority is claimed under 35 U.S.C. § 120. Application Ser. No. 09/530,136 is the national phase of PCT International Application No. PCT/JP98/04815 filed on Oct. 23, 1998 under 35 U.S.C. § 371, which claims priority of Application Ser. No. 9-293940 filed in Japan on Oct. 27, 1997 and Application No. 10-054694 filed in Japan on Mar. 6, 1998 under 35 U.S.C. § 119. The entire contents of each of the above-identified applications are hereby incorporated by reference.

BACKGROUND OF THE INVENTION

1. Field of the Invention

The present invention relates to an image coding apparatus and an image coding method for generating a coded bit stream by coding images, and an image decoding apparatus and an image decoding method for receiving a coded bit stream and for decoding an image signal contained in the coded bit stream, and more particularly to an image coding apparatus and an image coding method according to MPEG-4 for coding images on an object by object basis, and to an image decoding apparatus and an image decoding method according to MPEG-4 for decoding a coded bit stream generated by coding images on an object by object basis.

2. Background Art

Conventionally, as a method of coding or decoding an image signal, MPEG-4 (Moving Picture Experts Group Phase-4) is known which is currently in progress toward standardization by ISO/IEC JTC11/SC29/WG11, for example.

The MPEG-4 is a method that captures a moving picture sequence as a collection of moving image objects that take any shapes in time and space, and carries out coding and decoding based on individual moving image objects.

FIG. 1 shows a video data structure according to the MPEG-4 standard.

In the MPEG-4, a moving image object including a time axis is referred to as a Video Object (VO), components of the VO are each referred to as a Video Object Layer (VOL), components of the VOL are each called a Group of Video Object Plane (GOV), and the image data that represents the momentary state of the GOV and forms a unit of coding is called a Video Object Plane (VOP). For example, the VO corresponds to individual talkers and the background in a video conference scene, the VOL is a unit of the talkers and the background with a particular temporal and spatial resolution, and the VOP is the momentary image data of the VOLs (corresponding to frames). The GOV is a data structure consisting of a plurality of VOPs, which is used as a unit of edition and random access, and not necessarily required in coding.

FIG. 2 shows a concrete example of the VOPs. FIG. 2 shows two VOPs, (VOP1 represents a man, and VOP2 represents a picture on a wall). Each VOP consists of texture data representing color gradation levels and geometric data representing the shape of the VOP. The texture data consists of 8-bit luminance signal and color difference signals (with a size ½ sub-sampled in the horizontal and vertical directions with respect to the luminance signal). The geometric data is binary matrix data that assigns "1" to the inside of the VOP and "0" to the outside thereof, and has the same image size as the luminance signal (although the geometric data has 8-bit width per pixel, and the inside of the VOP is assigned "255" and the outside assigned "0" in practice, it is assumed in the following that they are assigned the binary value "1" and "0" for convenience sake).

In the moving picture representation based on the VOPs, a conventional frame image is obtained by placing the plurality of VOPs in position in a picture. If the shape of the VOP is rectangular and time-invariant, the VOP becomes synonymous with the frame. In this case, the geometric data is absent, and only the texture data is coded.

FIG. 3 shows an example of a conventional coded bit stream. A bit string called a start code is placed at the initial positions of the VO, VOL, GOV and VOP headers and of the VOP data. The start code is a unique word (a bit string that can be interpreted uniquely) for indicating the beginning of the individual header information and VOP data information. The individual header information contains information required for decoding data in that and its lower layers, and information representing layer attribute. For example, the VOL header information contains information required for decoding the VOPs constituting the VOL. The VOP data consists of the image data divided into macroblocks, a unit block to be coded. Although the VOP data as shown in FIG. 3 does not usually include the start code, the start code can be added to every set of a plurality of macroblocks. The VOP header information contains coding type information as to whether the VOP is intra coded or inter coded. The intra coding refers to a coding mode that codes the VOP to be coded using only information about the VOP itself without using the information associated with other VOPs. In contrast, the inter coding refers to a coding mode that codes the information on the VOP using the information associated with previous and following VOPs.

With the foregoing structure, the conventional image coding apparatus and image decoding apparatus can identify the coding mode of the VOP data only after it analyzes the coding type information contained in the VOP header information in the coded bit stream. As a result, although the coding side codes the entire VOP data in such units as VOL, GOV or the like of the object using only the intra coding, the decoding side must analyze the header information of the individual VOPs to identify the coding mode applied to the VOPs.

Therefore, although the coding side codes the entire VOP data in the units like VOL or GOV of the object using only the intra coding, to achieve instantaneous access to a VOP at a desired time, or to carry out "frame skip control" for decimating image signal to be coded in accordance with the load of a decoder, the decoding side cannot identify the desired VOP to be accessed or the VOP to be decoded in the frame skip control until it recognizes the predictive structure and time information of the coded bit stream by analyzing the coded data of all the VOPs. This presents a problem of making the decoding processing difficult and prolonging the decoding.

SUMMARY OF THE INVENTION

The present invention is implemented to solve the foregoing problem. Therefore, it is an object of the present invention to provide an image coding apparatus, image coding method, image decoding apparatus and image decoding method capable of enabling, when all the images contained in a moving picture sequence undergo only the intra coding, the image decoding apparatus to carry out access to the very image at a desired time, so as to facilitate smooth decoding processing like the frame skip control, thereby shortening the decoding processing.

In particular, an object of the present invention is to provide an image coding apparatus, image coding method, image decoding apparatus and image decoding method capable of enabling the image decoding apparatus to carry out access to the very image at a desired time, and to facilitate smooth decoding processing like the frame skip control, thereby shortening the decoding processing, when the coding side codes all the VOPs contained in the units like VOL or GOV of the object using only the intra coding according to the MPEG-4 standard that decodes the images consisting of a plurality of objects on an object by object basis.

The image coding apparatus or image coding method according to the present invention encodes images contained in a moving picture sequence in accordance with intra-coding instruction information instructing whether all the images contained in the moving picture sequence are to be intra coded or not; and multiplexes an encoded image coded signal with intra-coded indicator information indicating whether all the images contained in the moving picture sequence are intra coded or not.

This enables the decoding side to decide as to whether all the image data contained in the moving picture sequence undergo the intra coding or not without decoding the headers or overheads of the individual image data constituting the moving picture sequence. This offers an advantage of being able to generate the coded bit stream that enables the decoding side to carry out decoding with simply varying display rate or decoding rate, and to make random access to the image at a desired time with ease.

The image decoding apparatus or image decoding method according to the present invention analyzes, in a coded bit stream, intra-coded indicator information indicating whether all images contained in a moving picture sequence are intra coded or not; and decodes the images contained in the moving picture sequence in accordance with the intra-coded indicator information.

This enables the decoding side to decide as to whether all the image data contained in the moving picture sequence undergo the intra coding or not without decoding the headers or overheads of the individual image data constituting the moving picture sequence. This offers an advantage of being able to enable the decoding side to carry out decoding with simply varying display rate or decoding rate, and to make random access to the image at a desired time with ease.

DETAILED DESCRIPTION OF THE INVENTION

The best mode for carrying out the invention will now be described with reference to the accompanying drawings to explain the present invention in more detail.

Embodiment 1

In the embodiment 1 in accordance with the present invention, a VOP encoder will be described that employs the MPEG-4 video coding scheme disclosed in the ISO/IEC JTC1/SC29/WG11/N1796, and comprises a coding means and a multiplexing means. The coding means carries out coding based on information as to whether only the intra coding is applied to all the VOPs contained in the unit such as a VOL or GOV of each object which is an element of the present embodiment 1. The multiplexing means adds to each object the information on whether only the intra coding is applied to all the VOPs contained in the unit such as a VOL or GOV, thereby generating a coded bit stream. Here, the intra coding refers to a coding mode that codes the VOP to be coded using only the information about that VOP itself without using the information about remaining VOPs. Thus, intra-coded VOP can be decoded by itself.

Because the image coding apparatus of the present embodiment 1 is based on the MPEG-4 video encoder that carries out coding on a VOP by VOP basis, it is called a VOP encoder from now on. Since the operation of the existing VOP encoder is disclosed in the ISO/IEC JTC1/SC29/WG11/N1796 and the like, the operation of the encoder itself is only surveyed here, and the components of the present embodiment 1 will be described in detail.

Figure 4:
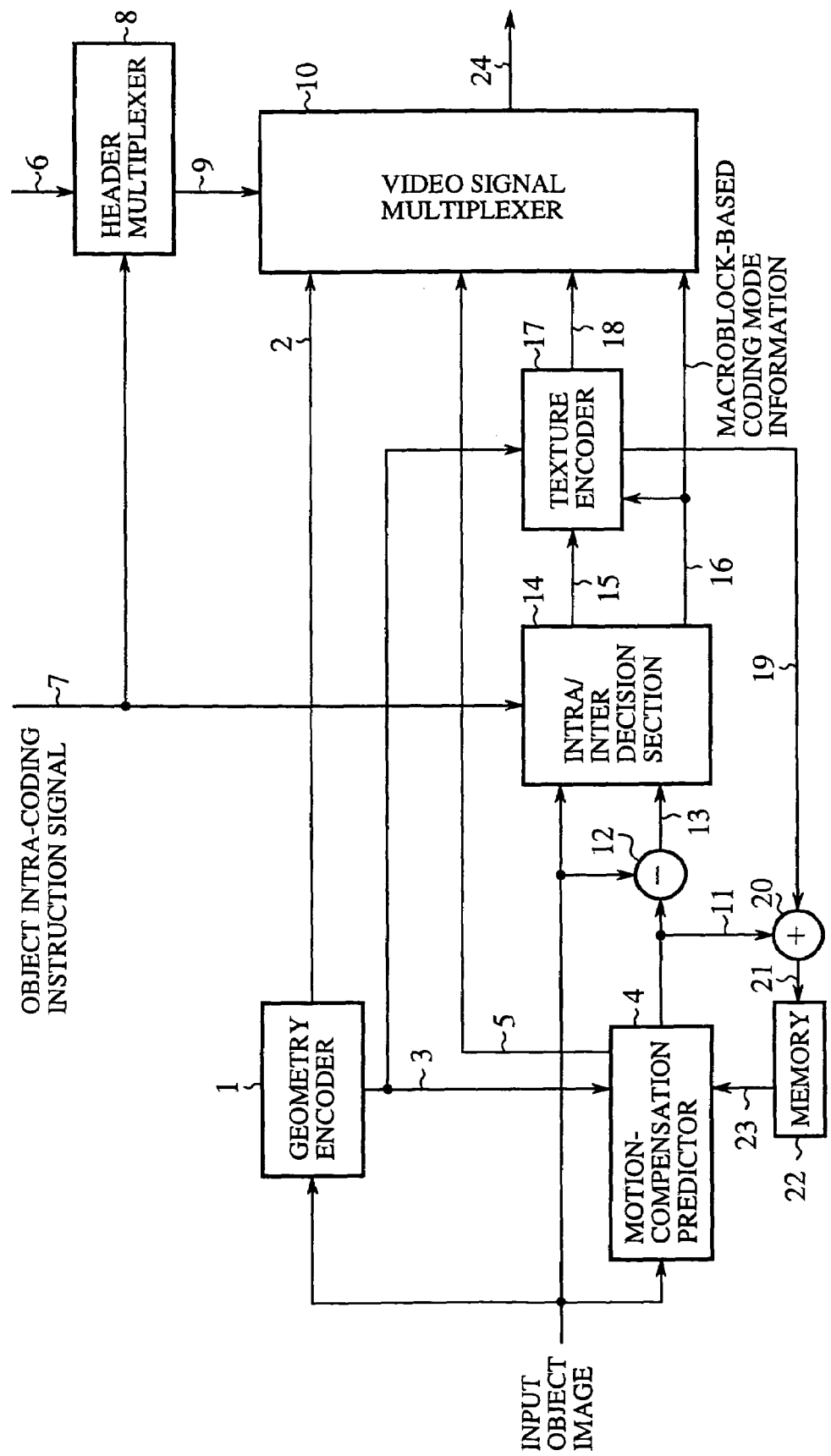
FIG. 4 is a block diagram showing an internal configuration of a VOP encoder in an embodiment 1 in accordance with the present invention.

FIG. 4 shows a configuration of the VOP encoder of the present embodiment 1. In FIG. 4, the reference numeral 1 designates a geometry encoder; 2 designates geometry coded data; 3 designates locally decoded geometry data; 4 designates a motion-compensation predictor; 5 designates motion information; 6 designates GOV multiplex information; 7 designates an object intra-coding instruction signal; 8 designates a header multiplexer; 9 designates a bit stream after header information multiplexing; 10 designates a video signal multiplexer; 11 designates a predicted image; 12 designates a subtracter; 13 designates a prediction error image; 14 designates an INTRA/INTER decision section; 15 designates texture data to be coded (referred to as an input image from now on); 16 designates macroblock-based coding mode information; 17 designates a texture encoder; 18 designates texture coded data; 19 designates a locally decoded prediction error image; 20 designates an adder; 21 designates locally decoded texture data; 22 designates a memory; 23 designates reference texture data; and 24 designates a coded bit stream.

Figure 5:
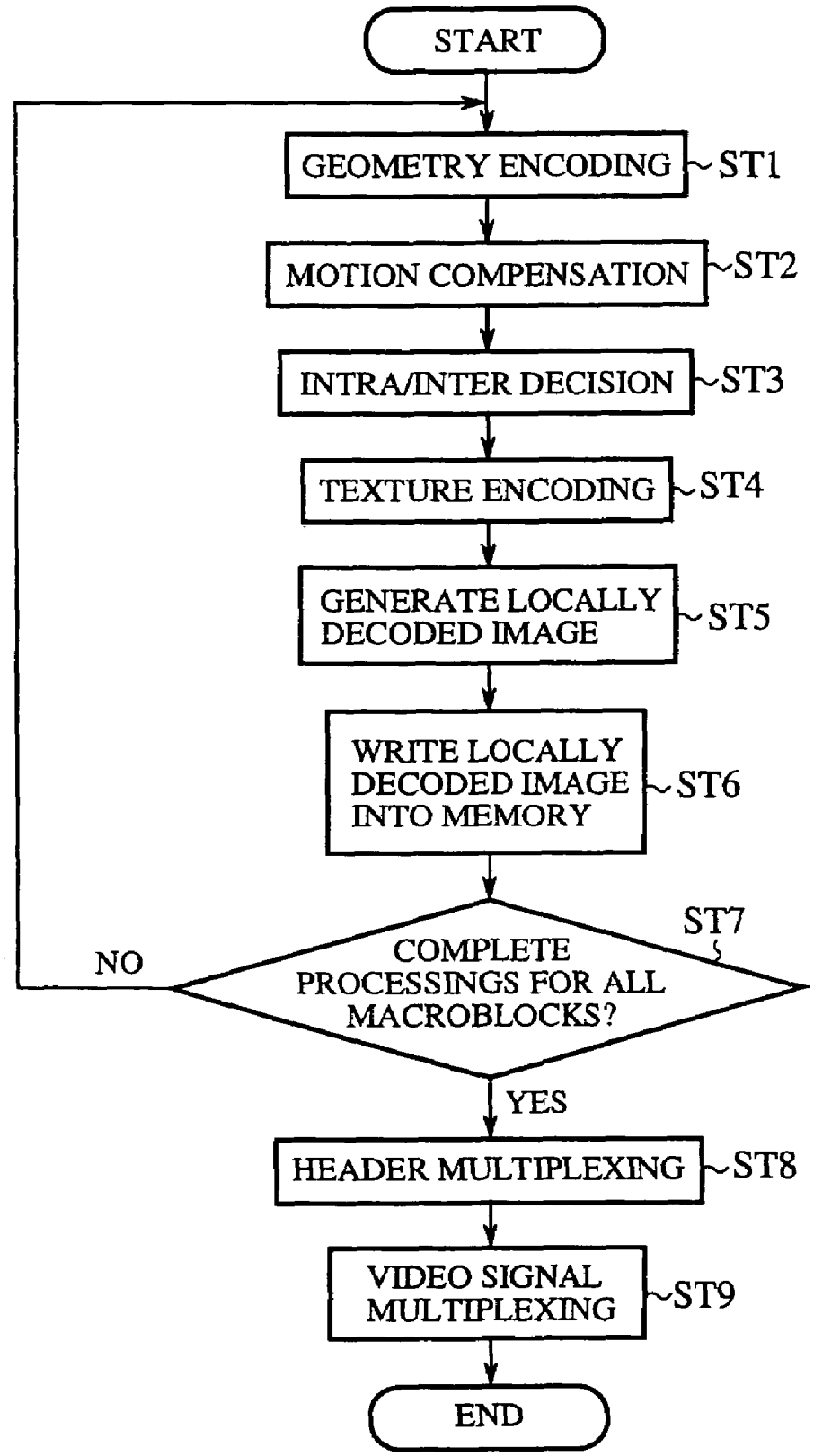
FIG. 5 is a flowchart illustrating the operation of the VOP encoder of FIG. 4.

Next, the operation of the VOP encoder of the present embodiment 1 as shown in FIG. 4 will be described briefly. FIG. 5 is a flowchart illustrating the operation of the VOP encoder of the present embodiment 1 as shown in FIG. 4.

An input object image is supplied to the geometry encoder 1, motion-compensation predictor 4, INTRA/INTER decision section 14 and subtracter 12. In this case, the geometric data of the input object image is supplied on every 16×16 pixel block basis called an alpha block, and the texture data of the input object image is also supplied on every 16×16 pixel block basis called a macroblock.

First, the geometry encoder 1 encodes the input alpha block, and outputs the geometry coded data 2 and locally decoded geometry data 3 (step ST1). Since the coding processing of the geometry encoder 1 is off the subject of the present invention, the description thereof is omitted here. The geometry coded data 2 is transferred to the video signal multiplexer 10, and the locally decoded geometry data 3 is delivered to the motion-compensation predictor 4 and texture encoder 17.

Subsequently, the motion-compensation predictor 4 reads the reference texture data 23 from the memory 22, and carries out macroblock-based block matching to obtain the motion information 5 (step ST2). Specifically, the motion-compensation predictor 4 obtains the motion information 5 by carrying out the block matching of only an object included in the macroblock on the basis of the locally decoded geometry data 3. Then, the motion-compensation predictor 4 reads from the memory 22 the reference tenure data 23 at the location corresponding to the motion information 5, and generates the predicted image 11 from the locally decoded geometry data 3. The motion information 5 generated by the motion-compensation predictor 4 is supplied to the video signal multiplexer 10, and the predicted image 11 is fed to the subtracter 12 and adder 20.

Then, the INTRA/INTER decision section 14 decides on the basis of the externally set object intra-coding instruction signal 7 the coding mode of the individual macroblocks of the VOPs to be coded, and selects an input image in response to the coding mode decided. The image selected (in the case of the inter coding, it is the prediction error image 13) is supplied to the texture encoder 17, and the macroblock-based coding mode information 16 decided is supplied to the video signal multiplexer 10 (step ST3). Here, the object intra-coding instruction signal 7 is information indicating whether all the VOPs contained in the unit such as a VOL or GOV are to be coded only by the intra coding or not, which is set by a user operating a switch or inputting a command. When all the VOPs are to be coded by only the intra coding, the signal is turned ON ("1"), and otherwise it is turned OFF ("0").

Figure 6:
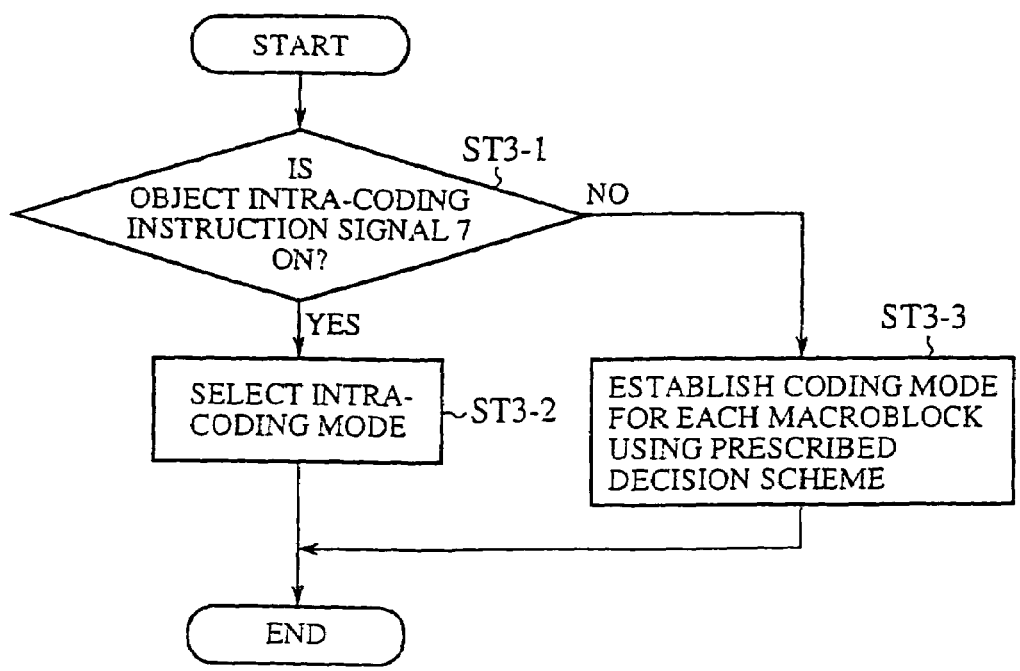
FIG. 6 is a flowchart illustrating the operation of the INTRA/INTER decision section 14.
Figure 2:
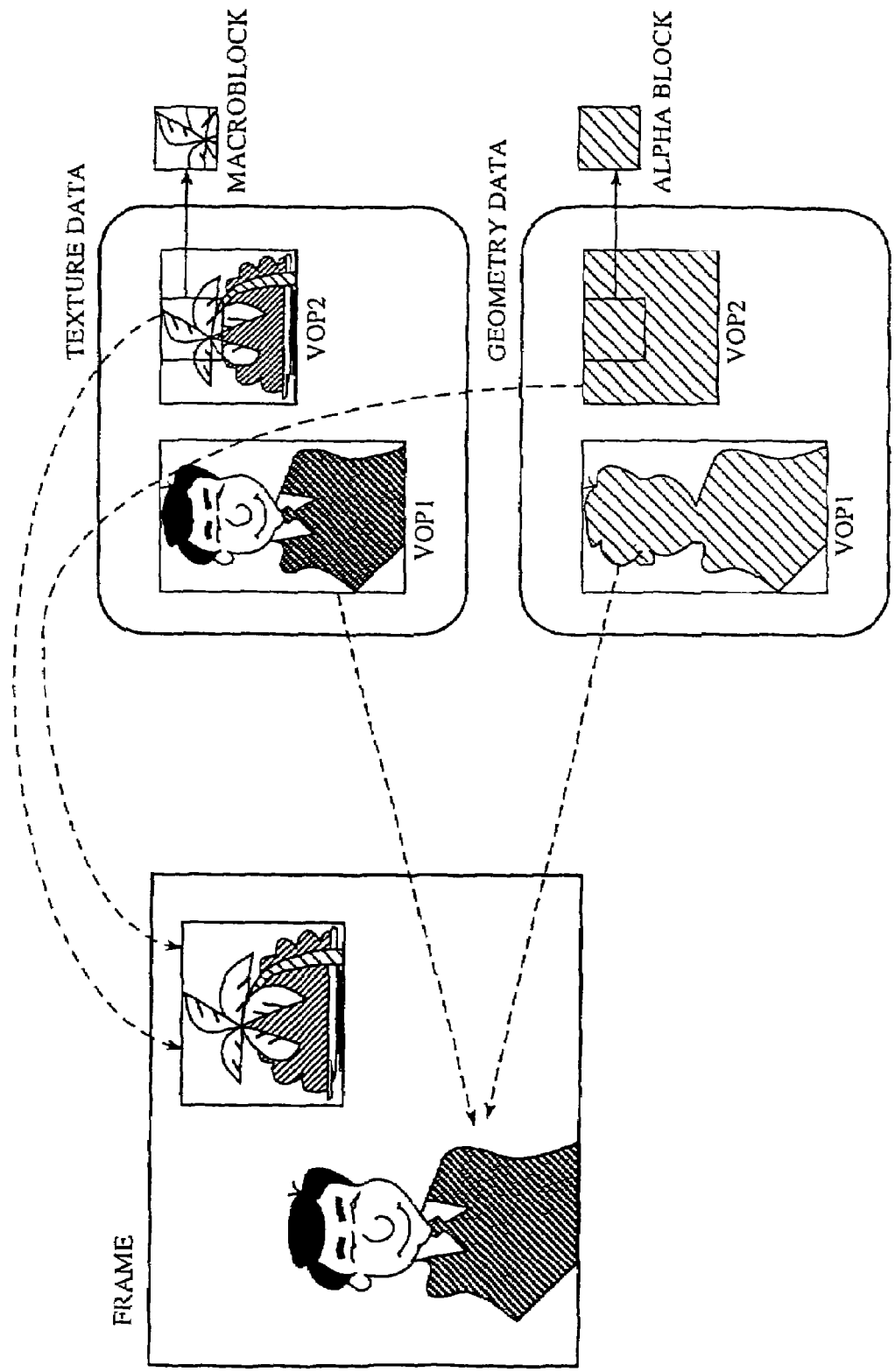
FIG. 2 is a diagram showing a concrete example of VOPs.

FIG. 6 is a flowchart illustrating the operation of the INTRA/INTER decision section 14. The operation will now be described with reference to FIG. 6. First, the operation is switched in response to the value of the object intra-coding instruction signal 7 (step ST3-1). When the object intra-coding instruction signal 7 is ON, the INTRA/INTER decision section 14 selects the input object image as the input image 15, sets the macroblock-based coding mode information 16 to the intra-coding mode, and supplies the input image 15 selected to the texture encoder 17 (step ST3-2).

On the other hand, when the object intra-coding instruction signal 7 input is OFF, the INTRA/INTER decision section 14 selects the coding mode for each macroblock according to the method defined by the ISO/IEC JTC1/SC29/WG11/N1796, for example. Then, the INTRA/INTER decision section 14 selects as input image 15 the input object image when the macroblock-based coding mode selected is the intra-coding mode, but the prediction error image 13 when the macroblock-based coding mode selected is the inter-coding mode, and supplies it to the texture encoder 17 (step ST3-3). In addition, the INTRA/INTER decision section 14 supplies the video signal multiplexer 10 with the macroblock-based coding mode selected as the macroblock-based coding mode information 16.

Returning to the flowchart of FIG. 5, the texture encoder 17 encodes the input image 15 according to the method defined by the ISO/IEC JTC1/SC29/WG11/N1796, thereby obtaining the texture coded data 18 and locally decoded prediction error image 19 (step ST4). In the course of this, the texture encoder 17 carries out the coding of only the object in the block in response to the locally decoded geometry data 3. The texture encoder 17 transfers the texture coded data 18 to the video signal multiplexer 10, and the locally decoded prediction error image 19 to the adder 20.

The adder 20 sums up the predicted image 11 and the locally decoded prediction error image 19 to generate the locally decoded texture data 21 (step ST5), and writes the sum to the memory 22 (step ST6). The foregoing processings are iterated for each macroblock, and when the processings of the entire macroblocks included in a single VOP are completed, the coding processing of the single VOP is terminated. Otherwise, the coding processing of the remaining macroblocks is continued (step ST7).

The header multiplexer 8 multiplexes the individual items of the header information into the bit stream 9, and supplies it to the video signal multiplexer 10 (step ST8).

The video signal multiplexer 10 multiplexes the bit stream 9, which consists of the multiplexed items of the header information, with the geometry coded data 2, motion information 5, texture coded data 18 and macroblock-based coding mode information 16, and outputs the coded bit stream 24 (step ST9).

Next, the operation of the header multiplexer 8, which characterizes the present embodiment 1, will be described in detail.

Figure 7:
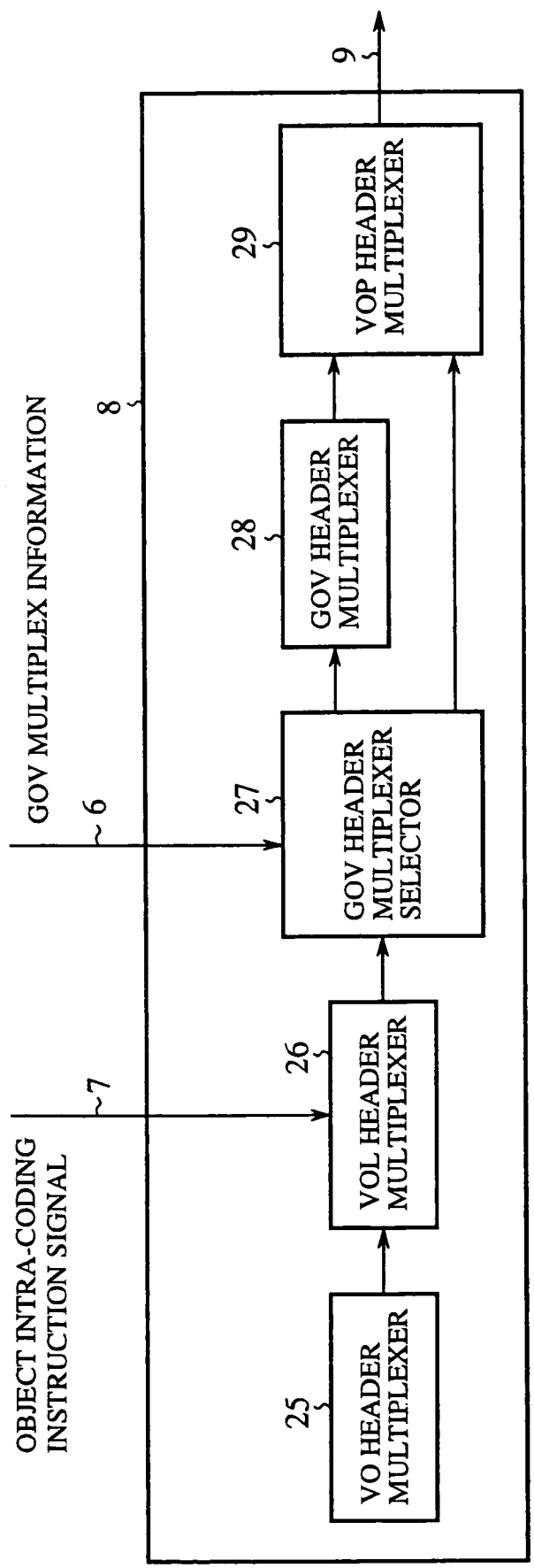
FIG. 7 is a block diagram showing a configuration of the header multiplexer 8 as shown in FIG. 4.

FIG. 7 shows a configuration of the header multiplexer 8 as shown in FIG. 4. In FIG. 7, the reference numeral 25 designates a VO header multiplexer; 26 designates a VOL header multiplexer; 27 designates a GOV header multiplexer selector; 28 designates a GOV header multiplexer; and 29 designates a VOP header multiplexer.

The VO header multiplexer 25 generates a bit stream into which the VO header is multiplexed, and supplies it to the VOL header multiplexer 26. The VOL header multiplexer 26 multiplexes into the bit stream fed from the VO header multiplexer 25 various VOL header items including an object intra-coded indicator signal 7' as one of them. Here, the object intra-coded indicator signal 7' refers to the information on whether or not all the VOPs contained in the unit such as a VOL or GOV are coded by only the intra coding. The object intra-coded indicator signal 7' can be multiplexed as 1-bit information in the VOL header information, which is placed at "1" when the object intra-coding instruction signal 7 is ON, and at "0" when it is OFF, for example. The bit stream after the multiplexing is supplied to the GOV header multiplexer selector 27.

The GOV header multiplexer selector 27 decides the output destination of the bit stream fed from the VOL header multiplexer 26 in accordance with the GOV multiplex information 6 that indicates whether multiplexing of the GOV header is to be carried out or not. According to the MPEG-4, the GOV header need not be contained in the coded bit stream. Thus, the encoder of the present embodiment 1 can selectively multiplex the GOV header using the GOV multiplex selector 27. It is obvious, however, the encoder can be configured such that it determines in advance as to whether the GOV header is to be multiplexed or not. In other words, the encoder can be configured such that it does not comprise the GOV header multiplexer selector 27, and supplies the output of the VOL header multiplexer 26 directly to the VOP header multiplexer 29 without passing through the GOV header multiplexer 28, or that it supplies the output of the VOL header multiplexer 26 to the VOP header multiplexer 29 through the GOV header multiplexer 28.

When the GOV multiplex information 6 indicates that the GOV header need not be multiplexed, the bit stream is supplied to the VOP header multiplexer 29 without passing through the GOV header multiplexer 28.

In contrast with this, when the GOV multiplex information 6 indicates that the GOV header must be multiplexed, the bit stream is supplied to the GOV header multiplexer 28. In response to this, the GOV header multiplexer 28 multiplexes the GOV header into the bit stream fed from the GOV header multiplexer selector 27, and supplies the output bit stream to the VOP header multiplexer 29.

Thus, the VOP header multiplexer 29 multiplexes the VOP header into the bit stream which is supplied directly from the GOV header multiplexer selector 27, or from the GOV header multiplexer selector 27 via the GOV header multiplexer 28, and provides the output bit stream 9 to the video signal multiplexer 10.

Figure 3:
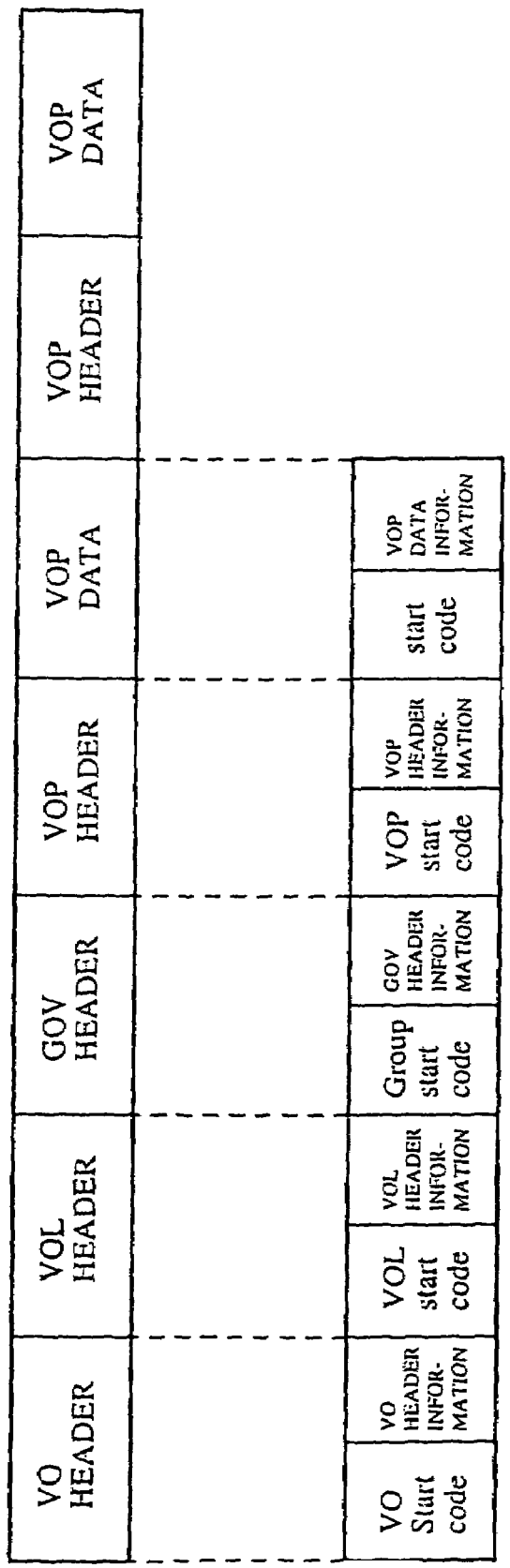
FIG. 3 is a diagram showing an example of a conventional coded bit stream.
Figure 8:
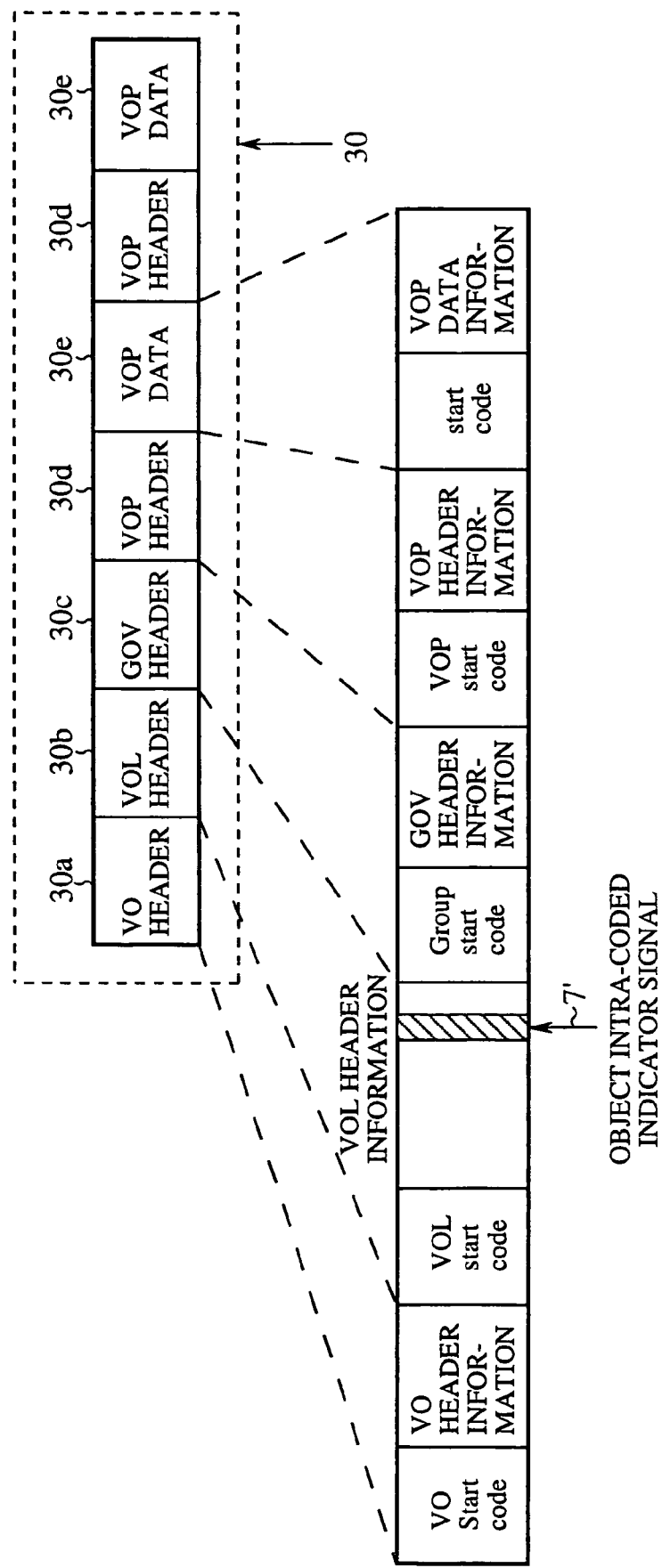
FIG. 8 is a diagram showing an example of a coded bit stream 30 output from the VOP encoder of the embodiment 1 in accordance with the present invention.

FIG. 8 shows an example of the coded bit stream 30 output from the VOP encoder of the present embodiment 1 in accordance with the present invention. It is an example of the coded bit stream 24 in FIG. 4. The coded bit stream 30, like the conventional coded bit stream as shown in FIG. 3, comprises a VO header 30a, a VOL header 30b, a GOV header 30c, a VOP header 30d and VOP data 30e, each of which consists of a start code and header information or data information. In the present embodiment 1, the VOL header 30b includes an object intra-coded indicator signal 7' multiplexed thereinto. Thus, the object intra-coded indicator signal 7' indicates that the entire VOP data 30e constituting the VOP associated with the VOL header 30b are intra coded.

Here, each VOP data 30e includes texture data (not shown) and geometric data (not shown) that are coded for each macroblock constituting a unit to be coded, and is multiplexed with the coding mode information 16 that indicates as overhead information whether the macroblock is intra coded or inter coded for each macroblock. However, when the object intra-coded indicator signal 7' is ON, that is, when the entire VOP data 30e of the VOL or GOV are intra coded, it is unnecessary to multiplex the coding mode information 16 of each macroblock constituting the VOP data, thereby reducing the amount of information of the coded bit stream. This holds true in all the following embodiments.

Figure 1:
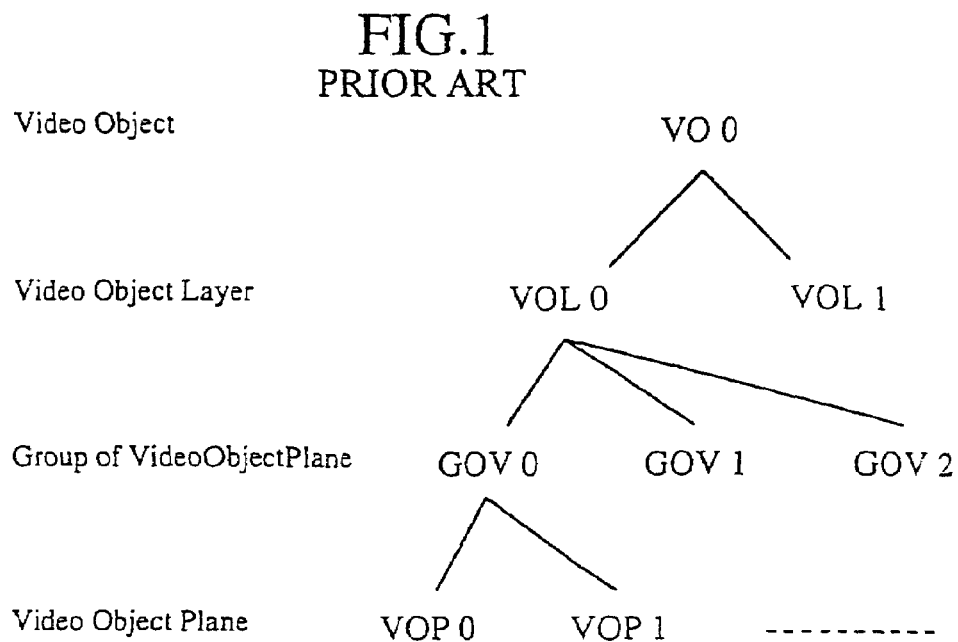
FIG. 1 is a diagram showing a video data structure according to the MPEG-4.

Incidentally, the VOL header 30b is set on the VOL (Video Object Layer) by VOL basis. Thus, when the VO consists of a plurality of VOL0 and VOL1 as shown in FIG. 1, the VOL header 30b is set for each VOL, and the object intra-coding instruction signal 7 is also set for each VOL.

In addition, when the GOV header multiplexer selector 27 decides that it is unnecessary for the GOV header multiplexer 28 to multiplex the GOV header, the coded bit stream 30 has a structure as shown in FIG. 8 except the GOV header 30c.

As described above, the present embodiment 1 has such a configuration that multiplexes into the VOL header the object intra-coded indicator signal 7' indicating that the entire VOP data, which constitutes the GOV subordinate to the VOL or constitutes the VOL without using the concept of the GOV, are intra coded. As a result, an image decoding apparatus can decide as to whether all the VOPs contained in the object are intra coded or not by only decoding and analyzing the object intra-coded indicator signal 7' without decoding the individual VOP headers. This makes it possible for the decoding apparatus side to carry out decoding with varying the display rate or decoding rate with ease, and to generate the coded bit stream that enables simple access to the VOPs at a desired time.

Figure 9:
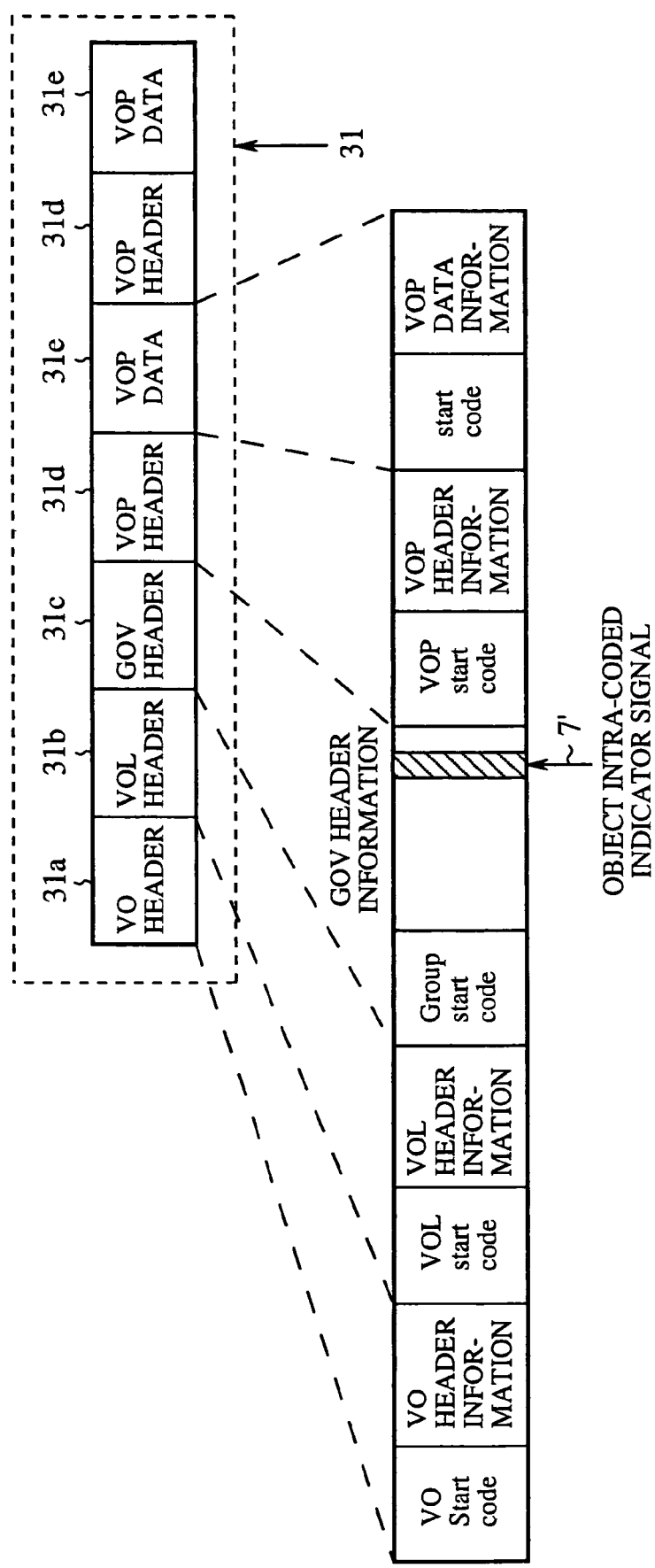
FIG. 9 is a diagram showing an example of a coded bit stream 31 output from the VOP encoder of the embodiment 1 in accordance with the present invention.

Although the object intra-coded indicator signal 7' is multiplexed into the VOL header 30b in the coded bit stream 30 as shown in FIG. 8 in the foregoing description, this is not essential to the present invention. For example, the object intra-coded indicator signal 7' can be multiplexed into the GOV header 31c in a coded bit stream 31 as shown in FIG. 9, so that the object intra-coded indicator signal is defined on the GOV basis lower in rank than the VOL. This enables the coding and the multiplexing of the object intra-coded indicator signal on the GOV basis.

Figure 10:
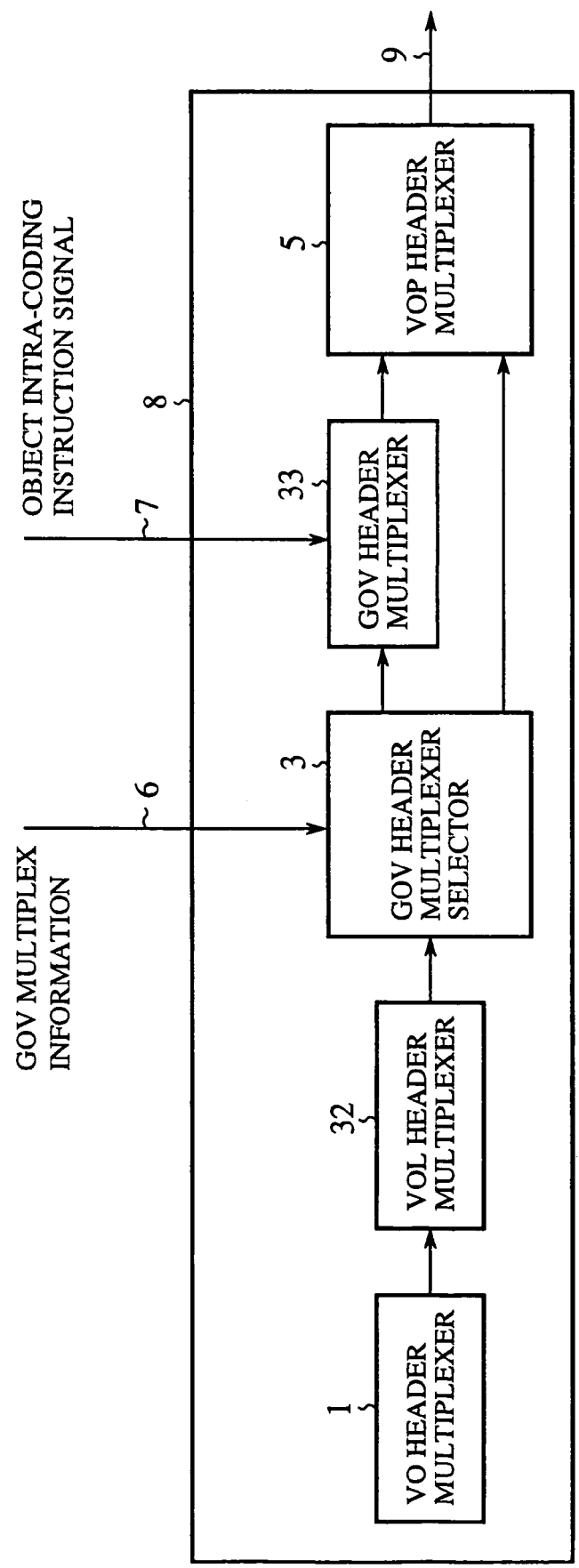
FIG. 10 is a block diagram showing a configuration of the header multiplexer 8 of the embodiment 1 for generating the coded bit stream 31 as shown in FIG. 9.

In this case, the header multiplexer 8 can be configured as shown in FIG. 10 in which the object intra-coded indicator signal 7' is not multiplexed by a VOL header multiplexer 32, but by a GOV header multiplexer 33. Thus, the object intra-coded indicator signal 7' functions as the information indicating whether the entire VOP data 31e contained in the GOV are intra coded or not, and is multiplexed together with the GOV header information into the GOV header 31c as shown in FIG. 9 by the GOV header multiplexer 33.

In addition, although the present embodiment 1 is configured such that the header multiplexer 8 generates the 1-bit object intra-coded indicator signal 7' from the object intra-coding instruction signal 7, it is not essential to the present invention. For example, the object intra-coded indicator signal 7' can have more than one bit. Alternatively, when the object intra-coding instruction signal 7 indicating whether the entire VOP data constituting the VOL or GOV are to be intra coded or not is represented in the form of bit information, the object intra-coding instruction signal 7 itself can be multiplexed as the object intra-coded indicator signal 7'.

Furthermore, although the coding apparatus of the present embodiment 1 is implemented in the form of hardware as shown in FIG. 4 and so on, this is not essential to the present invention. For example, the coding apparatus can be implemented in software. In other words, the functions of the present embodiment 1 can be implemented by means of a CPU or MPU that executes the program as shown in FIGS. 5 and 6. This also applies to all the following embodiments.

Embodiment 2

In the present embodiment 2 in accordance with the present invention, a VOP encoder will be described that comprises the following coding means and multiplexing means in a video coding system according to the MPEG-4 disclosed in the ISO/IEC JTC1/SC29/WG11/N1796. The coding means carries out coding of all the VOPs contained in the unit such as a VOL or GOV in response to the object intra-coding instruction signal 7, the information indicating whether only intra coding is to be carried out or not. The multiplexing means multiplexes into the coded bit stream the object intra-coded indicator signal 7' and display time multiplex identification information 34. The object intra-coded indicator signal 7' is the information indicating whether all the VOPs contained in the unit such as a VOL or GOV undergo only the intra coding or not. The display time multiplex identification information 34 indicates whether the absolute display time information of all the VOPs contained in the unit such as a VOL or GOV is to be collectively multiplexed or not.

Figure 11:
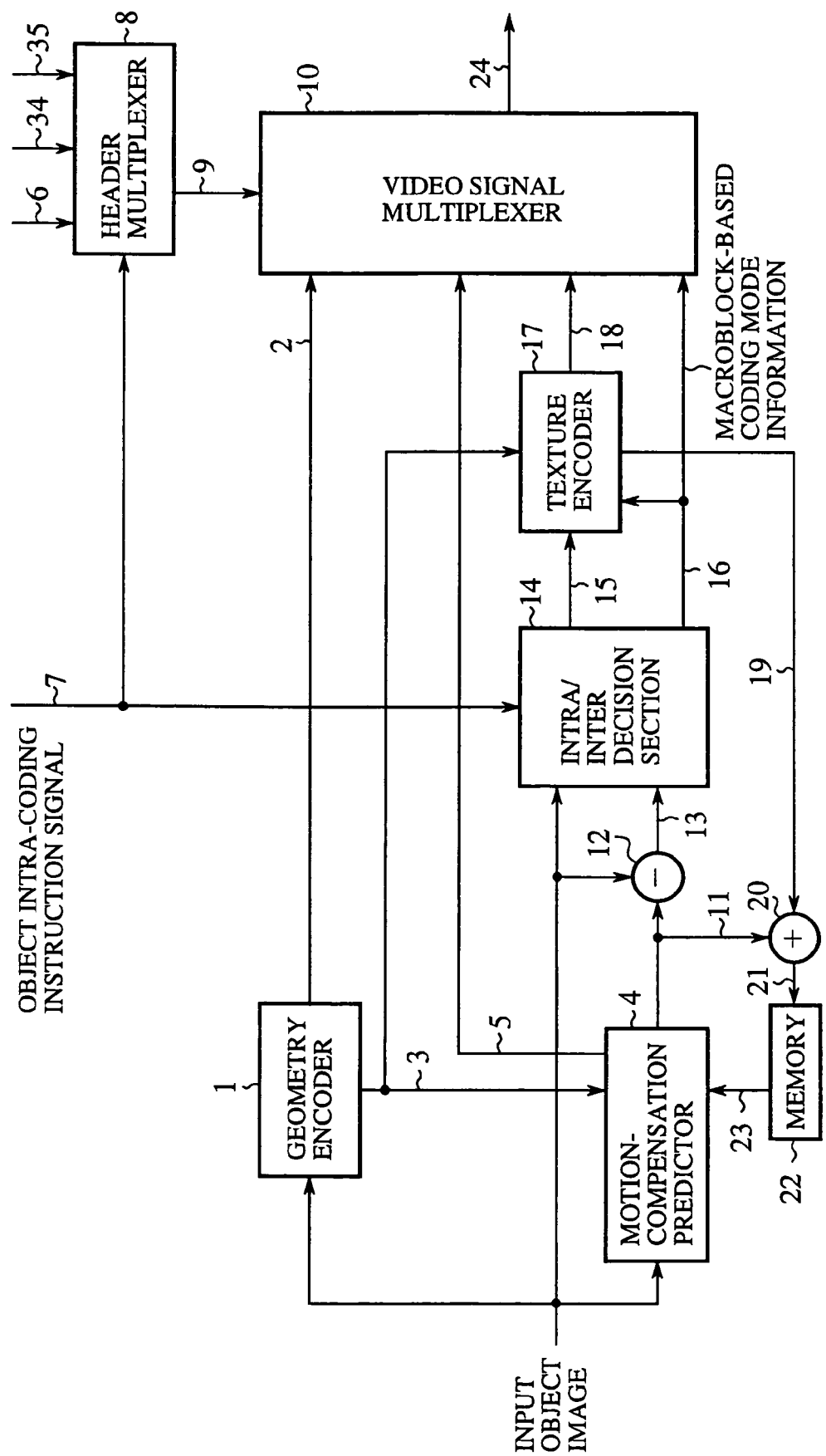
FIG. 11 is a block diagram showing a configuration of a VOP encoder in an embodiment 2 in accordance with the present invention.

FIG. 11 shows a configuration of the VOP encoder in the present embodiment 2. The VOP encoder as shown in FIG. 11 has a configuration very close to the VOP encoder of the embodiment 1 as shown in FIG. 4. The basic operation of the encoder is also similar to that of the embodiment 1. The present embodiment 2 differs from the foregoing embodiment 1 in the structure of the header multiplexer 8. In FIG. 11, the reference numeral 34 designates the display time multiplex identification information; and 35 designates a time code representing the absolute display time of the individual VOPs. The remaining members are identical to the corresponding members of FIG. 4 designated by the same reference numerals. Here, only the header multiplexer 8 with different structure from that of the embodiment 1 will be described.

Figure 12:
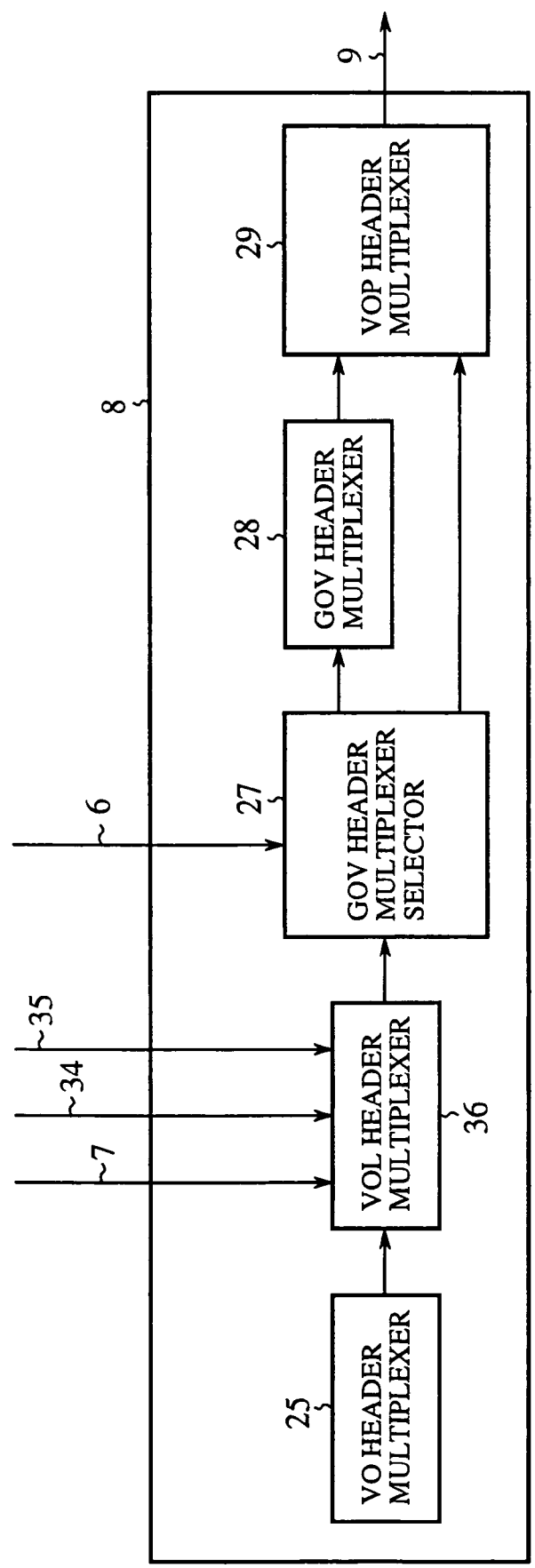
FIG. 12 is a block diagram showing a configuration of the header multiplexer 8 as shown in FIG. 11.

FIG. 12 shows a configuration of the header multiplexer 8 as shown in FIG. 11. In FIG. 12, the reference numeral 36 designates a VOL header multiplexer.

The header multiplexer 8 as shown in FIG. 11 carries out in its VOL header multiplexer 36 the following multiplexing. Specifically, the VOL header multiplexer 36 multiplexes the 1-bit object intra-coded indicator signal 7' into the VOL header information; multiplexes the 1-bit display time multiplex identification information 34 into the VOL header information when the object intra-coded indicator signal 7' is ON, that is, when it indicates that all the VOPs contained in the unit such as a VOL or GOV are intra coded; and multiplexes into the VOL header information collectively the time code 35 indicating the absolute display time of all the VOPs constituting the VOL in accordance with the display time multiplex identification information 34.

Here, the time code 35 is time information disclosed in the IEC standard publication 461 for "time and control codes for video tape recorders". It is the information for defining in hours, minutes and seconds the display time of the images (such as frames in MPEG-2 and VOPs in MPEG-4) constituting a moving picture. This offers an advantage of being able to access a desired frame only by designating the value of the time code 35 by adding this information to each frame when carrying out frame based edition in a video editor for business use.

Since the remaining configuration is the same as the header multiplexer 8 as shown in FIG. 7, only the operation of the VOL header multiplexer 36 in FIG. 12 different from that of the embodiment 1 will be described.

The VOL header multiplexer 36 multiplexes information required into the bit stream supplied from the VO header multiplexer 25 in accordance with the following rules 1)-5).

1) Multiplexing various VOL header information such as data needed for decoding and decompressing the individual VOPs.

2) Multiplexing the object intra-coded indicator signal 7'.

3) Multiplexing the display time multiplex identification information 34 when the object intra-coded indicator signal 7' is ON, that is, when it indicates that all the VOPs contained in the unit such as a VOL or GOV are subjected to the intra coding only.

The display time multiplex identification information 34 is 1-bit information indicating whether to multiplex the time codes 35 in all the VOPs in the VOL into the VOL header information area. When the time codes 35 in all the VOPs in the VOL are to be multiplexed into the VOL header information, it is set to "1" representing ON, arid otherwise it is set at "0" representing OFF. When the object intra-coded indicator signal 7' represents OFF, the display time multiplex identification information 34 is not multiplexed.

Figure 15:
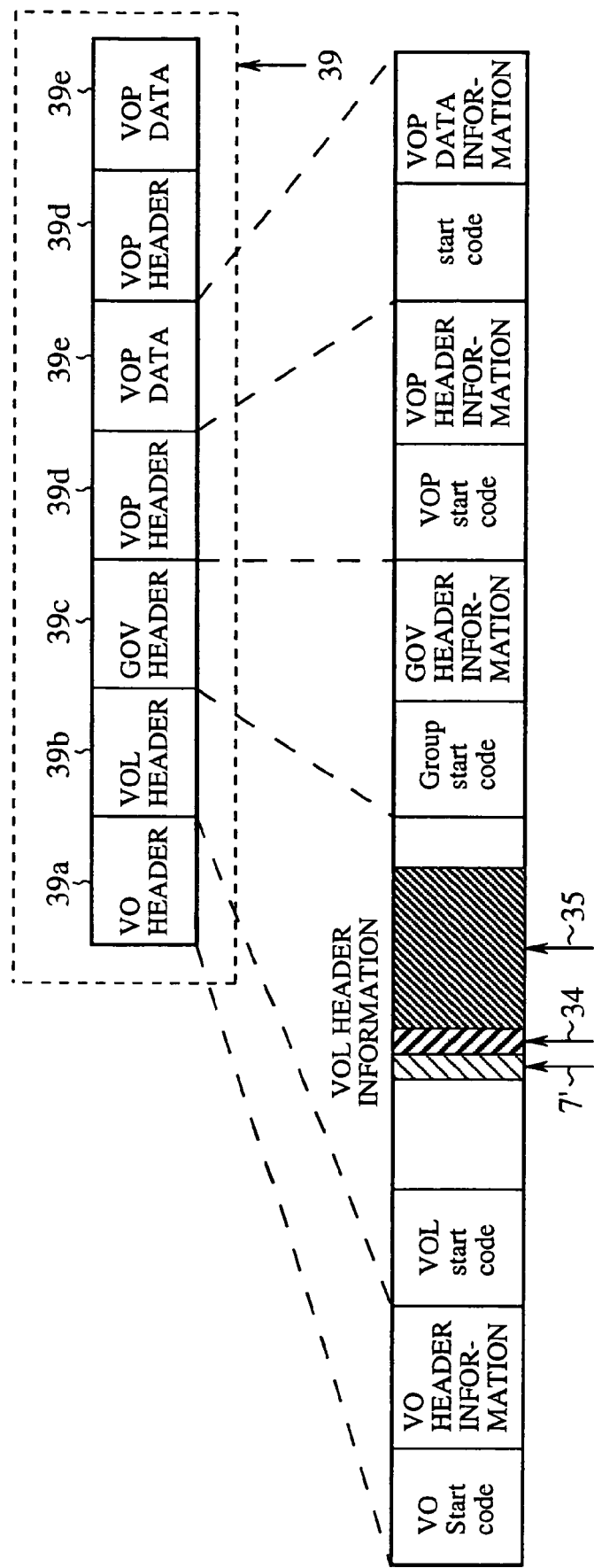
FIG. 15 is a diagram showing an example of a coded bit stream 39 output from the VOP encoder of the embodiment 2 in accordance with the present invention.

4) Multiplexing, when both the object intra-coded indicator signal 7' and the display time multiplex identification information 34 are ON, the time codes 35 in all the VOPs in the VOL into the VOL header information section as shown in FIG. 15 which will be described later. For example, when a certain VOL includes 30 pieces of the VOPs, 30 time codes 35 are multiplexed into the VOL header information section.

5) Supplying the GOV header multiplexer selector 27 with the bit stream passing through the foregoing multiplexing processings.

Figure 13:
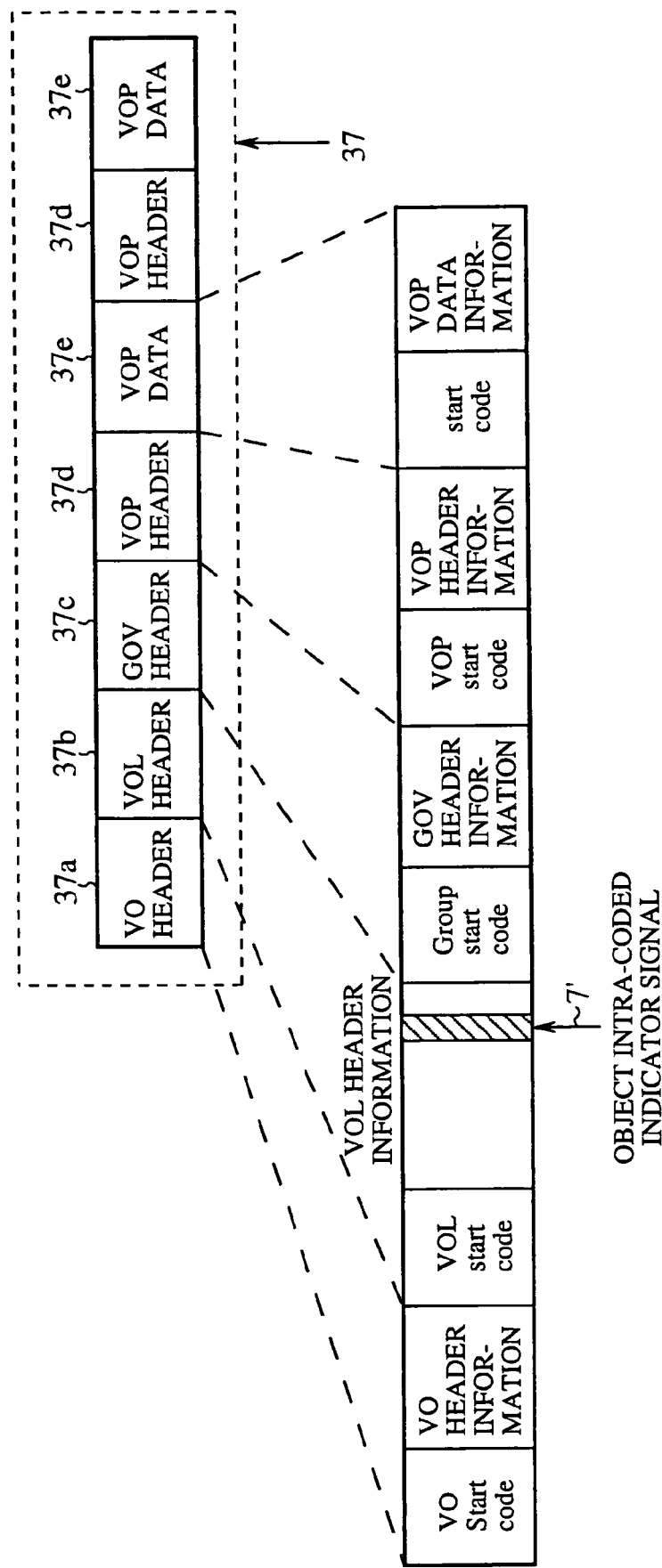
FIG. 13 is a diagram showing an example of a coded bit stream 37 output from the VOP encoder of the embodiment 2 in accordance with the present invention.
Figure 14:
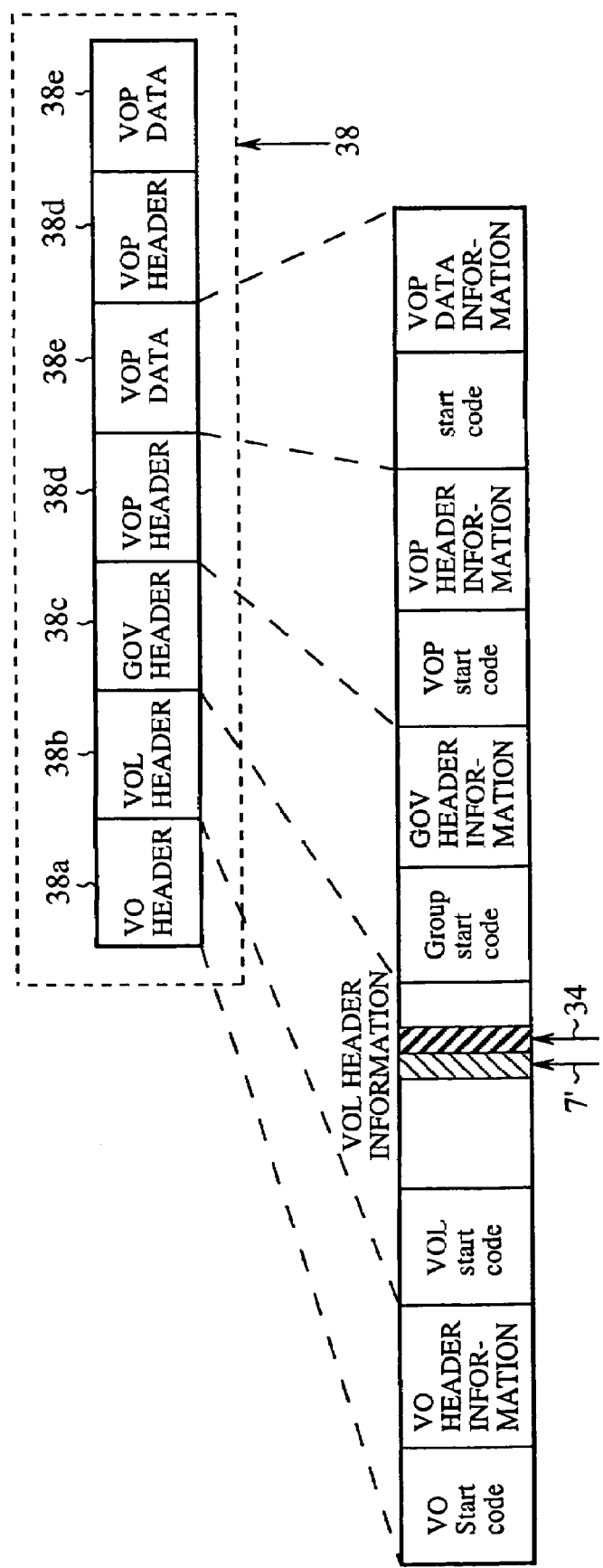
FIG. 14 is a diagram showing an example of a coded bit stream 38 output from the VOP encoder of the embodiment 2 in accordance with the present invention.

FIGS. 13, 14 and 15 each illustrate a coded bit stream output from the VOP encoder of the present embodiment 2.

The coded bit stream 37 as shown in FIG. 13 illustrates a case when the object intra-coded indicator signal 7' is OFF, in which neither the display time multiplex identification information 34 nor the time code 35 is multiplexed into the VOL header information 37b. In this case, relative time information, which indicates the relative time from the reference time code 35, that is, from the absolute display time that is multiplexed into the GOV header 37c to the time the VOP is displayed, is multiplexed into the VOP header information 37d of the individual VOPs (the relative time information is either modulo-time based or VOP time incremented, though not shown here). The decoding side decides the display time of the VOPs according to the relative time information.

The coded bit stream 38 as illustrated in FIG. 14 represents the case when the object intra-coded indicator signal 7' is ON, but the display time multiplex identification information 34 is OFF, in which case the time code 35 is not multiplexed into the VOL header information 38b. As in FIG. 13, the relative time information is multiplexed into the VOP header information 38d of the individual VOPs. It indicates the relative time from the reference time code 35 or the absolute display time that is multiplexed into the GOV header 38c to the time the VOP is displayed.

The coded bit stream 39 as illustrated in FIG. 15 represents the case in which both the object intra-coded indicator signal 7' and the display time multiplex identification information 34 are ON. In this case, the time codes 35 in all the VOPs in the VOL are multiplexed into the header information section 39b. In this case, the relative time information in the VOP header information section 39d can be multiplexed without change, or multiplexing of the relative time information into the VOP header information can be skipped to avoid the duplication with the time codes in the VOL header information 39b.

As described above, the present embodiment 2 is configured such that it multiplexes into the VOL header the object intra-coded indicator signal 7' which indicates that all the VOP data constituting the VOL undergo the intra coding, the display time multiplex identification information 34, and the time codes indicating the absolute display time of all the VOPs in the VOL. This makes it possible for the image decoding apparatus that decodes the VOPs by receiving the bit stream generated by the present coding apparatus to decide as to whether all the VOPs contained in the VOL are intra coded or not, and whether the time codes of all the VOPs are collectively multiplexed or not, without decoding and analyzing the individual VOP headers. This makes it possible for the decoding apparatus to readily identify the VOP to be decoded before starting decoding of the VOP, and to carry out decoding with varying the display rate and decoding rate, and to access the VOP at a desired time with ease.

Although the foregoing example multiplexes into the VOL header the object intra-coded indicator signal 7', display time multiplex identification information 34 and time codes 35 as in the coded bit streams 37–39 illustrated in FIGS. 13, 14 and 15, this is not essential to the present invention. For example, the coded bit stream can be configured as in the following examples 1 and 2.

EXAMPLE 1

Figure 16:
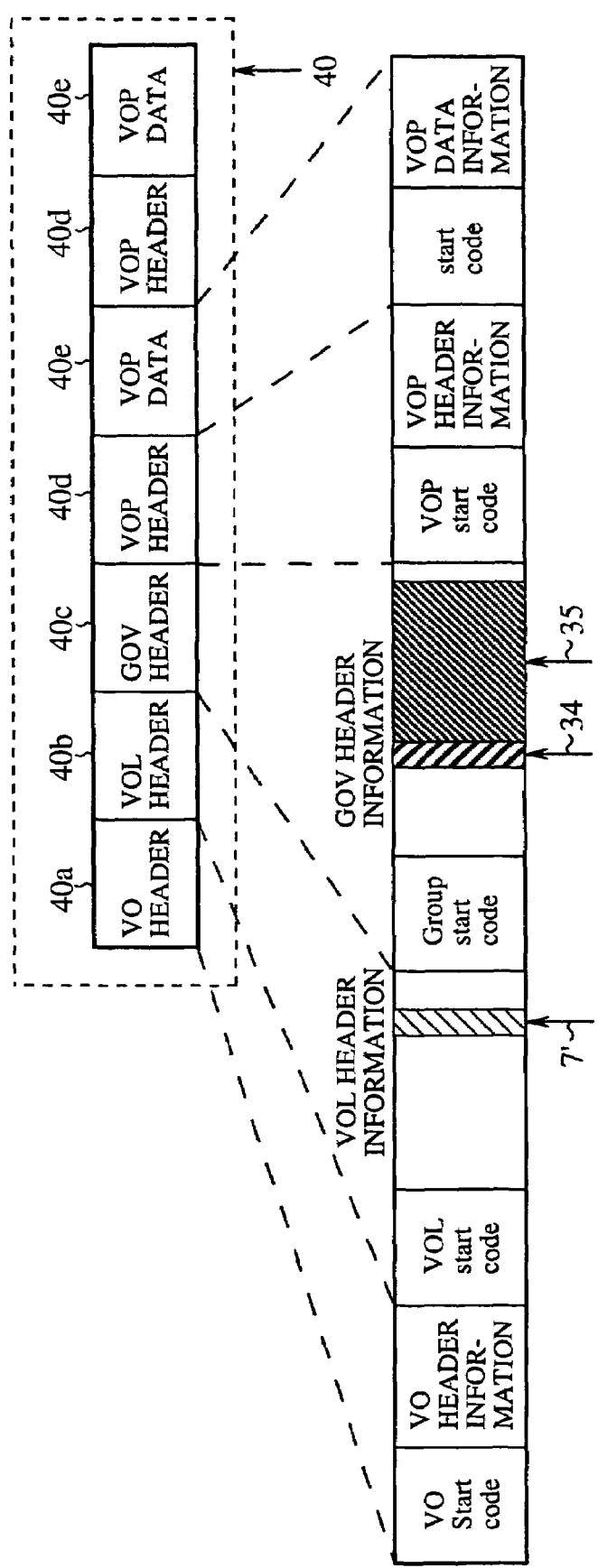
FIG. 16 is a diagram showing an example of a coded bit stream 40 output from the VOP encoder of the embodiment 2 in accordance with the present invention.

As shown in the coded bit stream 40 of FIG. 16, the object intra-coded indicator signal 7' can be multiplexed into the VOL header 40b, whereas the display time multiplex identification information 34 can be multiplexed into the GOV header 40c when the object intra-coded indicator signal 7' of the VOL belonging to this GOV is ON, and the time codes 35 of all the VOPs contained in the GOV layer can also be multiplexed into the GOV header 40c when the display time multiplex identification information 34 is ON. In this case, the display time multiplex identification information 34 indicates whether the time codes 35 of all the VOPs contained in the GOV are multiplexed collectively into the GOV header or not.

EXAMPLE 2

Figure 17:
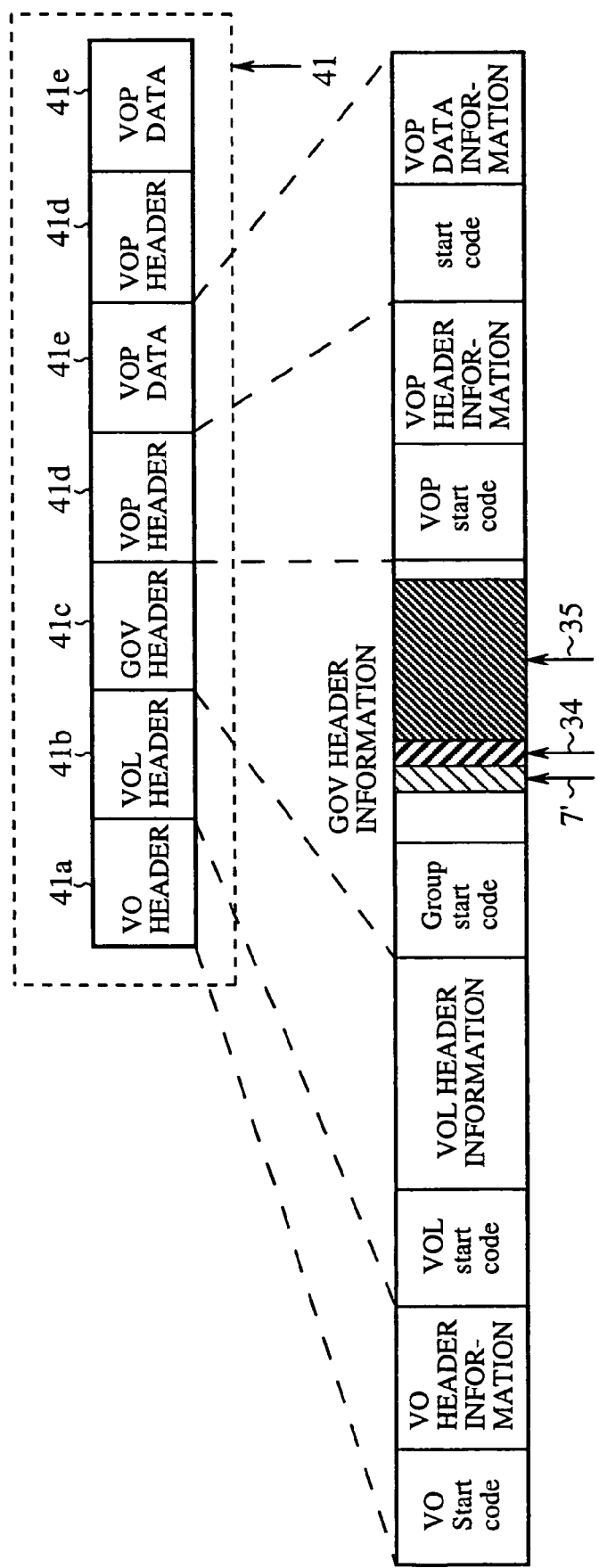
FIG. 17 is a diagram showing an example of a coded bit stream 41 output from the VOP encoder of the embodiment 2 in accordance with the present invention.

As shown in the coded bit stream 41 of FIG. 17, all the object intra-coded indicator signal 7', the display time multiplex identification information 34 and the time codes 35 can be multiplexed into the GOV header 41c. In this case, the object intra-coded indicator signal 7' indicates whether all the VOPs contained in the GOV are intra coded or not, and the display time multiplex identification information 34 indicates whether the time codes 35 of all the VOPs contained in the GOV are multiplexed collectively into the GOV header or not.

Thus generating the coded bit stream makes it possible for the decoding side to readily identify the VOP to be decoded on the GOV basis, to carry out decoding with varying the display rate and/or decoding rate, and to make simple access to the VOP at a desired time.

Embodiment 3

In the embodiment 3 in accordance with the present invention, a VOP decoder will be described for regenerating VOP images by decoding the coded bit stream generated by the VOP encoder described in the foregoing embodiment 1. More specifically, an image decoding apparatus will be described for decoding the object intra-coded indicator signal 7' described in the foregoing embodiment 1 from the coded bit stream, and for controlling the display of the decoded VOPS in accordance with the value of the signal 7'.

First, a configuration and operation of the image decoding apparatus (VOP decoder) in the present embodiment 3 will be described. Because the operation of the existing VOP decoder is disclosed in the ISO/IEC JTC1/SC29/WG11/N1796 and so forth, the operation of the VOP decoder itself will be only outlined here. In the following description, the function characterizing the VOP decoder of the present embodiment 3, that is, the function to decode the object intra-coded indicator signal, and to selectively decode the VOP images based on the value of the signal will be mainly described. In the following description, it is assumed that the coded bit stream 30 as shown in FIG. 8 is input to the VOP decoder.

Figure 18:
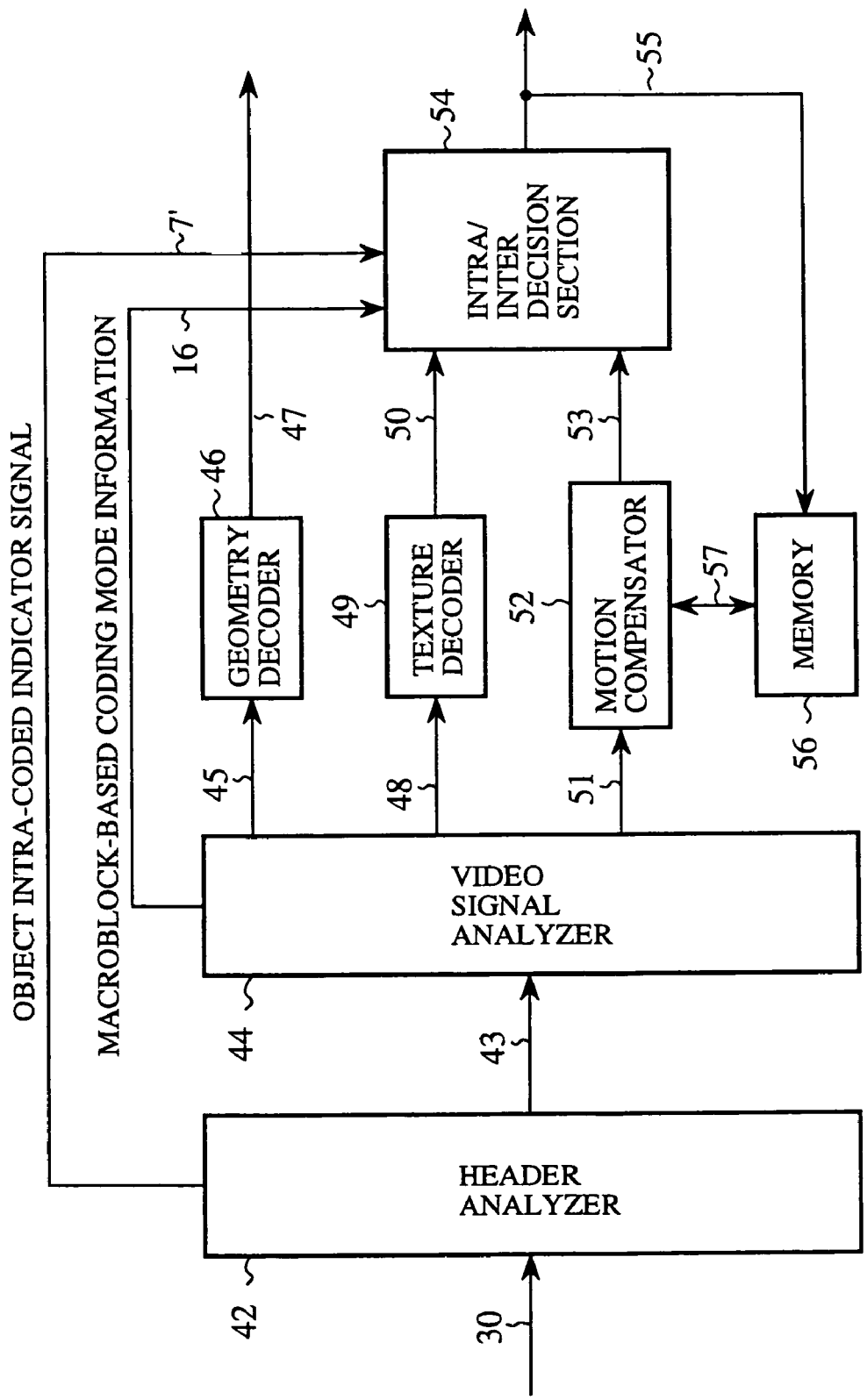
FIG. 18 is a block diagram showing an internal configuration of a VOP decoder in an embodiment 3 in accordance with the present invention.

FIG. 18 shows an internal configuration of the VOP decoder of the embodiment 3 in accordance with the present invention 3. It is assumed here that the VOP data consists of the texture data and geometric data as in the embodiment 1, and that the decoder has the function to decode these data from their compression data received.

In FIG. 18, the reference numeral 42 designates a header analyzer; 43 designates a bit stream whose header information has been analyzed; 44 designates a video signal analyzer; 45 designates geometry coded data; 46 designates a geometry decoder; 47 designates decoded geometric data; 48 designates texture coded data; 49 designates a texture decoder; 50 designates decoded texture data; 51 designates motion information; 52 designates a motion compensator; 53 designates decoded prediction texture data; 54 designates an INTRA/INTER decision section; 55 designates output texture data; 56 designates a memory; and 57 designates reference texture data.

Figure 19:
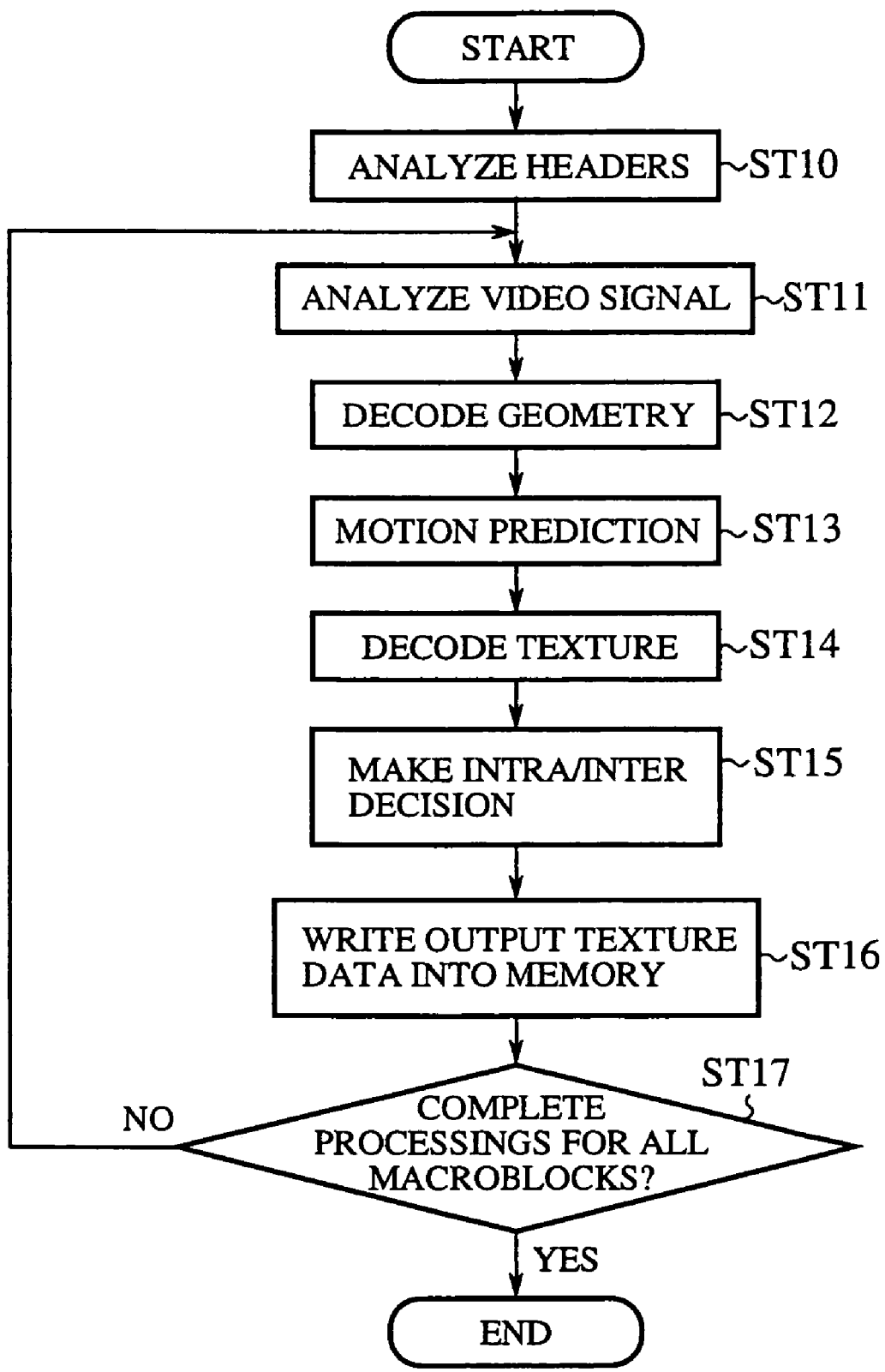
FIG. 19 is a flowchart illustrating the operation of the image decoding apparatus as shown in FIG. 18.

FIG. 19 is a flowchart illustrating the operation of the image decoding apparatus as shown in FIG. 18. The operation will now be described with reference to FIGS. 18 and 19.

First, the coded bit stream 30 is supplied to the header analyzer 42, which analyzes the VO header, VOL header, GOV header and VOP header in accordance with prescribed syntax as will be described later (step ST10).

In the course of this, the object intra-coded indicator signal 7' multiplexed into the VOL header 30b is also analyzed, and is supplied to the INTRA/INTER decision section 54.

Subsequently, the bit stream 43, the header information of which is analyzed by the header analyzer 42, is supplied to the video signal analyzer 44. The video signal analyzer 44 analyzes the VOP data, divides the data into the geometry coded data 45, texture coded data 48 and motion information 51, and supplies their to the geometry decoder 46, texture decoder 49 and motion compensator 52, respectively (step ST11).

The geometry decoder 46 decodes the geometry coded data 45 supplied, and outputs the decoded geometric data 47 (step ST12).

The motion compensator 52 produces the decoded prediction texture data 53 on the basis of the reference texture data 57 read from the memory 56 and the motion information 51 supplied from the video signal analyzer 44 (step ST13).

The texture decoder 49 restores the image data from the texture coded data 48 in accordance with the prescribed scheme defined in the MPEG-4 such as ISO/IEC JTC1/SC29/WG11/N1796, and generates the decoded texture data 50 (step ST14). The decoded texture data 50 is supplied to the INTRA/INTER decision section 54.

The INTRA/INTER decision section 54 first makes a decision of the final output texture data 55 in accordance with the object intra-coded indicator signal 7' (step ST15).

Figure 20:
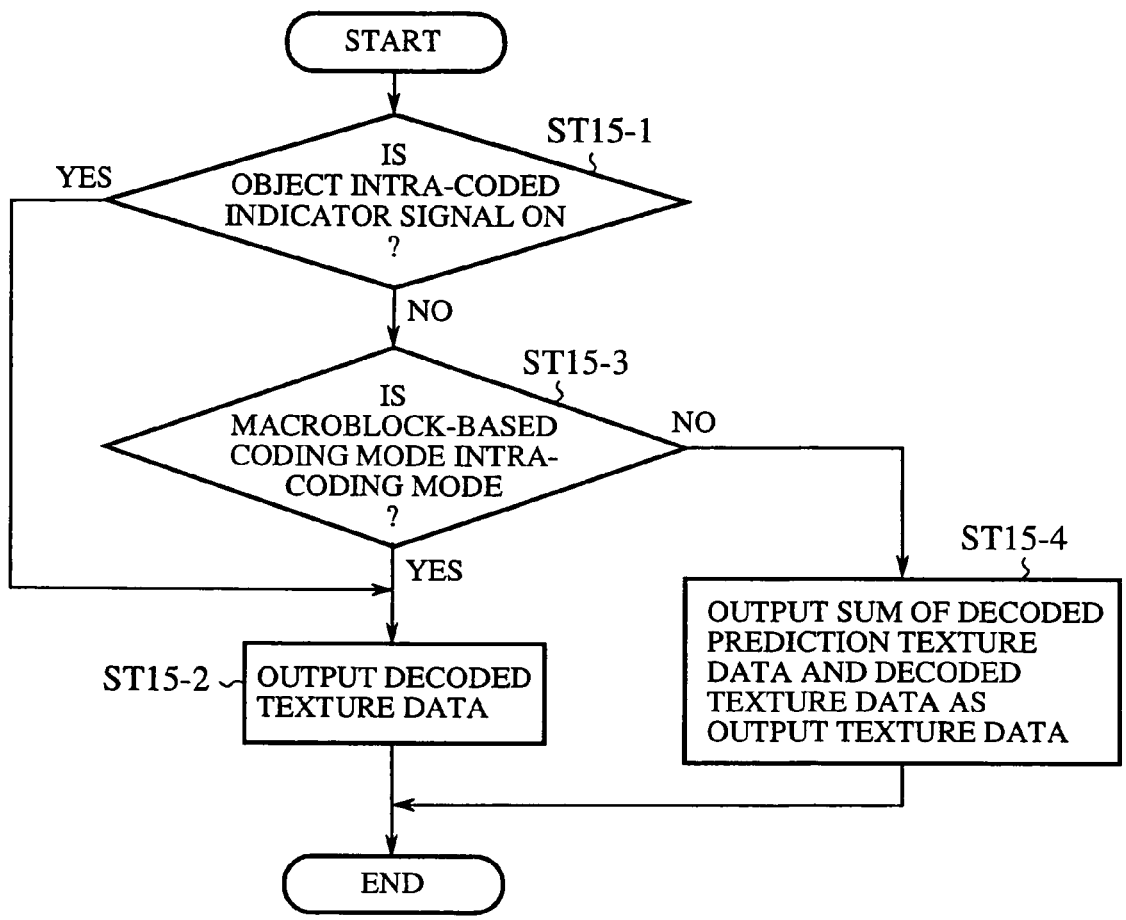
FIG. 20 is a flowchart illustrating the operation of the INTRA/INTER decision section 54 as shown in FIG. 18.

FIG. 20 is a flowchart illustrating the INTRA/INTER decision operation at step ST15 by the INTRA/INTER decision section 54 in the present embodiment 3.

First, in response to the value of the object intra-coded indicator signal 7', the operation mode is switched (step ST15-1).

When the object intra-coded indicator signal 7' is ON ("YES" at step ST15-1), the INTRA/INTER decision section 54 immediately outputs the texture data 50 as the texture data 55 (step ST15-2).

In contrast with this, when the object intra-coded indicator signal 7' is OFF ("NO" at step ST15-1), the INTRA/INTER decision section 54 selects its processing in response to the macroblock-based coding mode information 16 decoded by the video signal analyzer 44 (step ST15-3). Specifically, when the macroblock-based coding mode is the intra-coding mode ("YES" at step ST15-3), the INTRA/INTER decision section 54 outputs the decoded texture data 50 as texture data 55 (step ST15-2), and when it is the inter-coding mode ("NO" at step ST15-3), the INTRA/INTER decision section 54 sums up the decoded prediction texture data 53 fed from the motion compensator 52 and the decoded texture data 50, and outputs the sum data as the output texture data 55 (step ST15-4).

Returning to the flowchart of FIG. 19, because the output texture data 55 is used in the subsequent VOP decoding, it is written into the memory 56 (step ST16). The foregoing processing is carried out on the macroblock basis, which defines the coded (decoded) region predetermined in the coding side and decoding side. In response to the detection of the start code of the next VOP, the decoding of the current VOP is completed, and if the start code of the next VOP is not detected, the processing returns to step ST11 to carry out the video signal analysis and onward, thus continuing the decoding of the macroblocks associated with the current VOP (step ST17).

To achieve this, the VOP decoder of the present embodiment 3 operates as follows. First it decides as to whether the object intra-coded indicator signal 7' is ON or not as illustrated in the INTRA/INTER processing of FIG. 20. When the object intra-coded indicator signal 7' is ON, that is, when all the VOP data 30e constituting the VOL are intra coded, the VOP decoder outputs the decoded texture data 50 as the output texture data 55 without making the decision at step ST15-3 as to whether the coding mode is the intra-coding mode or not on the macroblock basis. This makes it possible to reduce the INTRA/INTER processing by the amount needed for the processing of step ST15-3.

Figure 21:
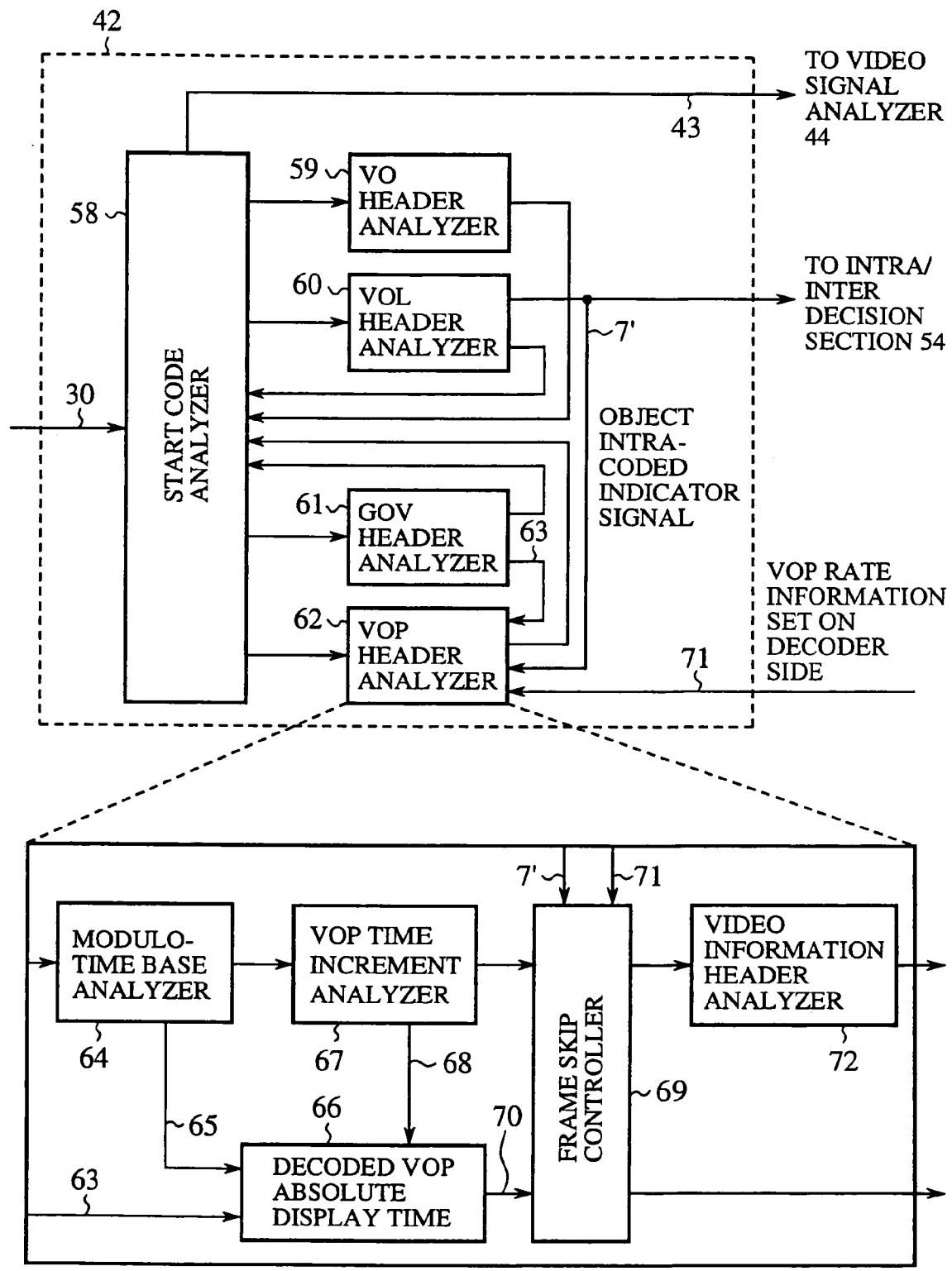
FIG. 21 is a block diagram showing the details of the internal configuration of the header analyzer 42 in the embodiment 3 as shown in FIG. 18.

FIG. 21 shows an internal configuration of the header analyzer 42 of the present embodiment 3 as shown in FIG.

18, and particularly a configuration of the VOP header analyzer 55 in detail. In FIG. 21, the reference numeral 58 designates a start code analyzer; 59 designates a VO header analyzer; 60 designates a VOL header analyzer; 61 designates a GOV header analyzer; 62 designates a VOP header analyzer; 63 designates a time code; 64 designates a modulo-time base analyzer; 65 designates a modulo-time base; 66 designates a decoded VOP absolute display time generator; 67 designates a VOP time increment analyzer; 68 designates a VOP time increment; 69 designates a frame skip controller; 70 designates decoded VOP absolute display time; 71 designates VOP rate information as the display rate information set on the decoder side; and 72 designates a video information header analyzer.

Figure 22:
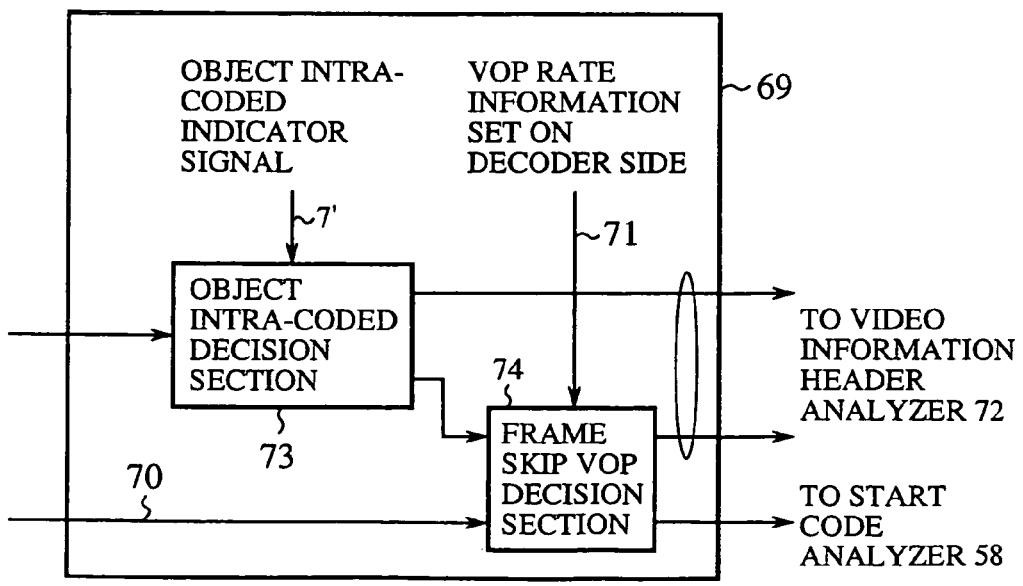
FIG. 22 is a block diagram showing an internal configuration of the frame skip controller 69 as shown in FIG. 21.

FIG. 22 is a block diagram showing an internal configuration of the frame skip controller 69 as shown in FIG. 21. In FIG. 22, the reference numeral 73 designates an object intra-coded decision section; and 74 designates a frame skip VOP decision section.

Next, the operation of the header analyzer 42 will be described in detail.

Figure 23:
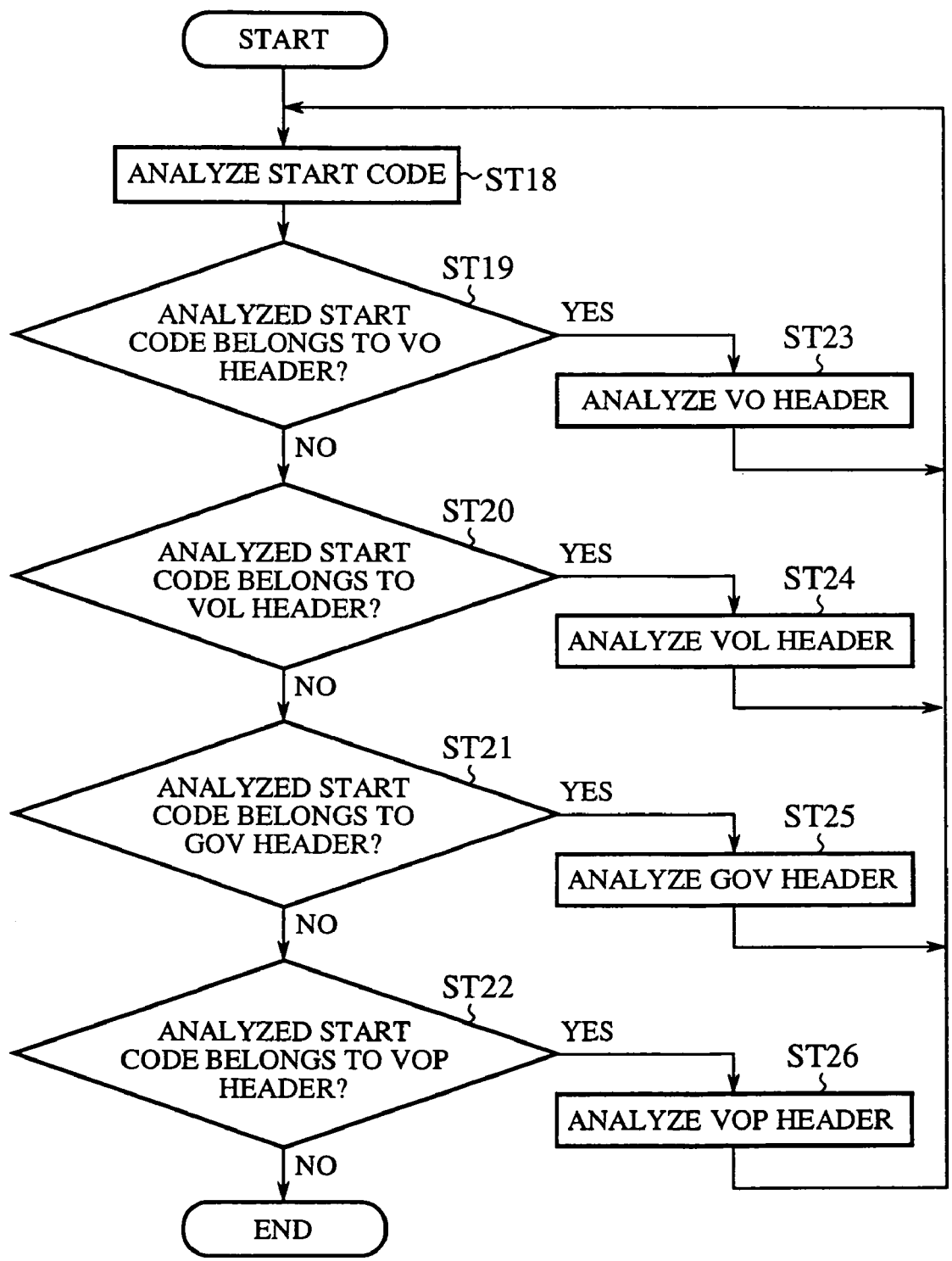
FIG. 23 is a flowchart illustrating the operation of the header analyzer 42 as shown in FIG. 21.

FIG. 23 is a flowchart illustrating the operation of the header analyzer 42 as shown in FIG. 21, which illustrates the header analysis at step ST10 as shown in FIG. 19 in more detail.

The header analyzer 42 of the present embodiment 3 decodes the object intra-coded indicator signal 7' from the bit stream, and carries out the frame skip control based on the information provided by the signal.

Here, "frame skip control" refers to the following operation. When carrying out the image decoding using a software decoder in such an environment as only limited resources are available like a CPU and memory in a PC (personal computer) and WS (workstation), and hence all the coded VOPs cannot be decoded, the "frame skip control" restricts the VOPs to be decoded by skipping reading of the remaining VOPs. A method of using the object intra-coded indicator signal 7' will be described later.

In the header analysis by the header analyzer 42, the start code analyzer 58 first analyzes the start code contained in the coded bit stream 30 supplied (step ST18). The start code analyzer 58 supplies the bit stream to the VO header analyzer 59 when the analyzed start code indicates a VO (step ST19), to the VOL header analyzer 60 when the analyzed start code indicates a VOL (step ST20), to the GOV header analyzer 61 when the analyzed start code indicates a GOV (step ST21), and to the VOP header analyzer 62 when the analyzed start code indicates a VOP (step ST22). Incidentally, the bit stream is supplied to the video signal analyzer 44 when the VOP header analyzer 62 completes its analysis.

The VO header analyzer 59 analyzes the VO header information in the bit stream fed from the start code analyzer 58, and supplies the bit stream after the analysis to the start code analyzer 58 (step ST23).

The VOL header analyzer 60 analyzes the VOL header information and the object intra-coding indicator signal 7' in the bit stream fed from the start code analyzer 58, and supplies the bit stream after the analysis to the start code analyzer 58, and the object intra-coded indicator signal 7' analyzed to the VOP header analyzer 62 and INTRA/INTER decision section 54 (step ST24).

The GOV header analyzer 61 analyzes the GOV header information in the bit stream fed from the start code analyzer 58, and supplies the bit stream after the analysis to the start code analyzer 58 (step ST25). In the course of this, the time code 63 contained in the analyzed GOV header information is supplied to the VOP header analyzer 62. The definition of the time code 63 was given in the description of the embodiment 2.

Next, the operation of the VOP header analyzer 62 which corresponds to step ST26 will be described.

Figure 24:
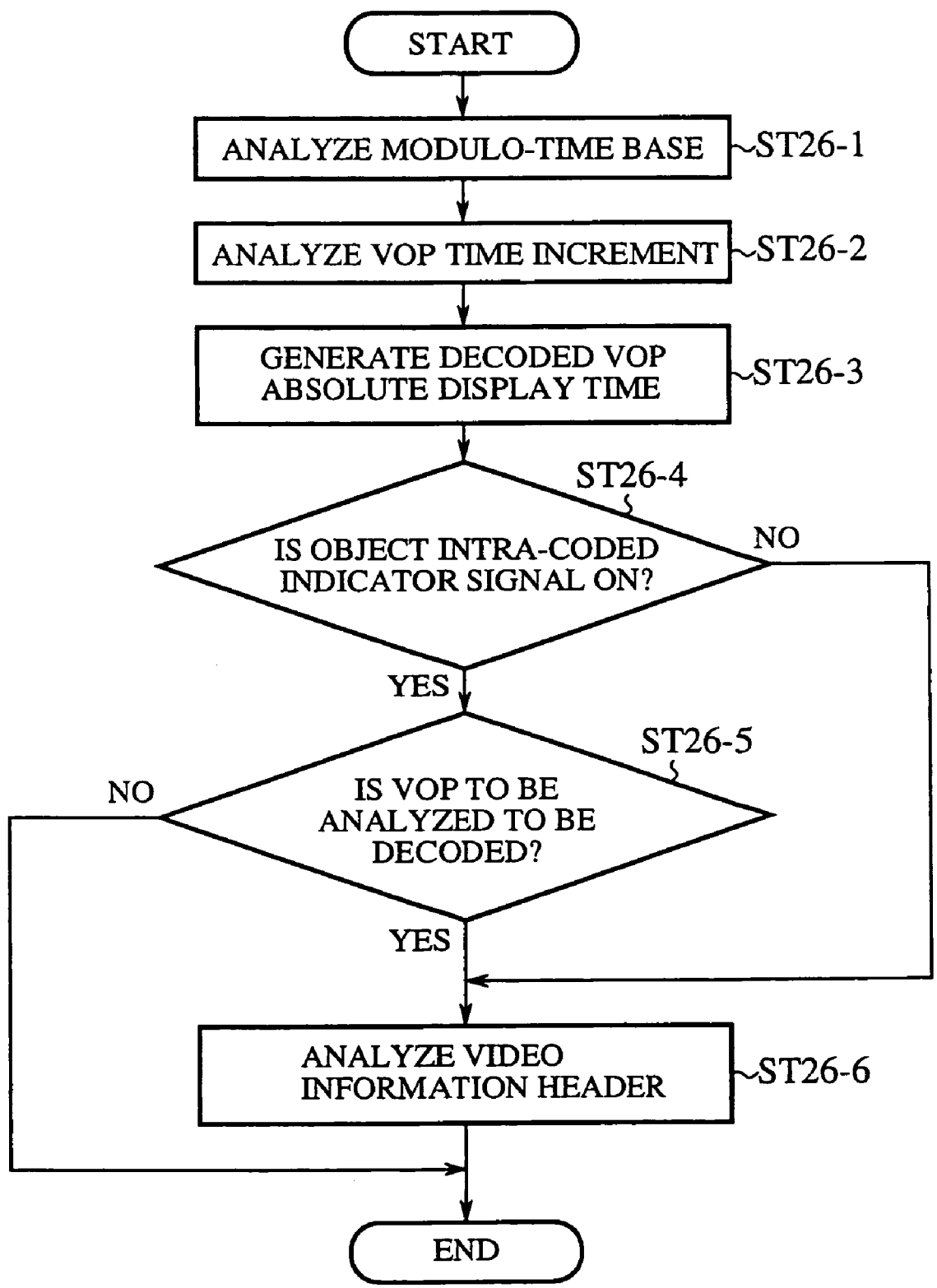
FIG. 24 is a flowchart illustrating the operation of the VOP header analyzer 62.

FIG. 24 is a flowchart illustrating the operation of the VOP header analyzer 62.

First, the bit stream input to the VOP header analyzer 62 is supplied to the modulo-time base analyzer 64, which analyzes the modulo-time base (step ST26-1), and supplies the modulo-time base 65 analyzed to the decoded VOP absolute display time generator 66, and the bit stream after the analysis to the VOP time increment analyzer 67.

The VOP time increment analyzer 67 analyzes the VOP time increment in the bit stream supplied (step ST26-2), and supplies the VOP time increment 68 analyzed to the decoded VOP absolute display time generator 66, and the bit stream after the analysis to the frame skip controller 69.

The decoded VOP absolute display time generator 66 generates the decoded VOP absolute time 70 from the modulo-time base 65, VOP time increment 68 and time code 63, and supplies it to the frame skip controller 69 (step ST26-3).

Figure 25:
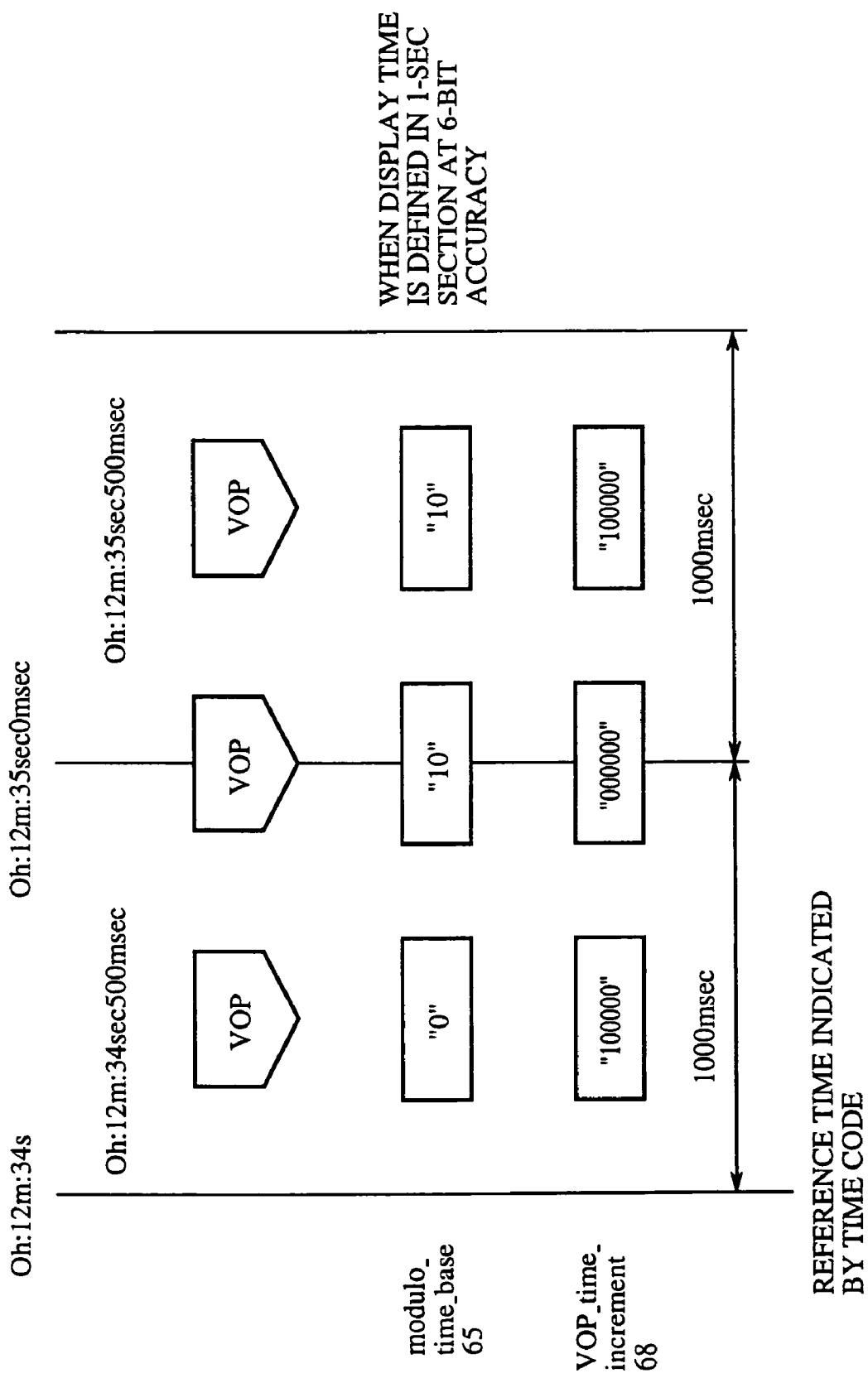
FIG. 25 is a diagram for illustrating modulo-time base 65 and VOP time increment 68.

Here, the modulo-time base 65 is the information indicating the time in seconds at which the VOP is to be displayed from a particular reference time defined by the time code 63 as shown in FIG. 25. The amount of seconds is represented by the number of "1s" with the additional "0" indicating the end of the data.

The VOP time increment 68 is the information for fine adjusting the display time with an accuracy of $1/1000$ second within one second from the time determined by the modulo-time base 65 as shown in FIG. 25. Thus, the MPEG-4 can determine the VOP display time at an accuracy of $1/1000$ second. For example, the decoded VOP absolute display time (time code) is generated as follows. When the modulo-time base 65 of the VOP to be decoded is "10", the VOP time increment 68 is "000000" (when the VOP time increment is 6-bit accurate), and the reference time defined by the time code 63 is "00 hour 12 minutes 34 seconds", the absolute display time of the decoded VOP becomes "00 hour 12 minutes 35 seconds".

Subsequently, in the frame skip controller 69 as shown in FIG. 22, the object intra-coded decision section 73 first determines the destination of the input bit stream in accordance with the object intra-coded indicator signal 7' (step ST26-4). More specifically, it decides as to whether the object intra-coded indicator signal 7' is ON or not, and when it is ON, that is, when a decision is made that all the VOPs in the VOL are intra coded ("YES" at step ST26-4), the destination of the input bit stream is switched to the frame skip VOP decision section 74. In contrast, when the object intra-coded indicator signal is OFF ("NO" at step ST26-4), the input bit stream is directed to the video information header analyzer 72.

The frame skip VOP decision section 74 makes a decision as to whether the VOP to be analyzed is the VOP to be decoded or not in response to the decoded VOP absolute display time 70 fed from the decoded VOP absolute display time generator 66, and to the VOP rate information 71 that is set on the decoder side at a value lower than that of the encoder side for frame skipping (step ST26-5). When the frame skip VOP decision section 74 decides that the decoding is necessary ("YES" at step ST26-5), it supplies the input bit stream fed from the object intra-coded decision section 73 to the video information header analyzer 72. On the contrary, when it decides that the analysis is unnecessary ("NO" at step ST26-5), it supplies the bit stream to the start code analyzer 58.

Here, the VOP rate information refers to display rate information indicative of the number of VOPs to be displayed per second, which VOPs are included in the prescribed unit such as the VOL and GOV. For example, when the VOP rate information is 2 pieces/second, two VOPs are displayed per second, which is equivalent to display each VOP for ½ second. Accordingly, when the decoded VOP absolute time 65 of the first VOP is "00 hour 01 minute 00 second" and the VOP rate information is 1 piece/second, a decision is made that such VOPs are to be decoded that have the absolute display time "00 hour 01 minute 01 second", "00 hour 01 minute 02 second", and so on, which are obtained by successively adding one second to "00 hour 01 minute 00 second". Thus, the decoding side can implement the VOP frame skipping by varying the VOP rate information 71 set on the decoder side and the VOP rate information set on the encoder side from 10 pieces/second to 2 pieces/second, for example.

When the object intra-coded decision section 73 decides that the object intra-coded indicator signal 7' is OFF ("NO" at step ST26-4), or when it decides that the object intra-coded indicator signal 7' is ON ("YES" at step ST26-4) and the frame skip VOP decision section 74 decides that the VOP to be analyzed has to be decoded ("YES" at step ST26-5), the video information header analyzer 72 analyzes the video information headers in the bit stream fed from the frame skip controller 69, and then supplies the bit stream to the start code analyzer 58 (step ST26-6). Thus, the start code analyzer 58 supplies the video signal analyzer 44 with the coded bit stream 43 whose headers are analyzed.

As a result, when the object intra-coded decision section 73 decides at step ST26-4 that the object intra-coded indicator signal 7' is OFF, it supplies the bit stream fed to the VOP header analyzer 62 to the video information header analyzer 72 without passing through the frame skip VOP decision section 74, thereby preventing the VOP frame skipping.

This is because it is not ensured in this case that all the VOPs in the VOL are intra coded, and hence all the VOPs must be analyzed over to obtain correct decoded images, because it is probable that the predictive coding is carried out between the VOPs.

On the other hand, when the object intra-coded decision section 73 decides at step ST26-4 that the object intra-coded indicator signal 7' is ON, the frame skip VOP decision section 74 decides at the next step ST26-5 as to whether the current VOP to be analyzed has to be decoded or not in response to the VOP rate information 62 and the like, and supplies the video information header analyzer 72 with only the input bit stream with which a decision is made that the VOP decoding is required, thus enabling the VOP frame skipping.

This is because when the object intra-coded indicator signal 7' is ON, it is ensured that all the VOPs in the VOL are intra coded, and hence the decoder can immediately select a desired VOP to be decoded. This makes it possible to carry out the frame skip control freely.

As described above, the present embodiment 3 is configured such that it analyzes, when decoding the coded bit stream including the object intra-coded indicator signal 7' multiplexed into the VOL header, the object intra-coded indicator signal 7'. This makes it possible for the decoder side to carry out, when the object intra-coded indicator signal 7' is ON, frame skipping of any VOPs in accordance with the VOP rate information 71 set on the decoder side so that the VOPs selected are subjected to a processing such as display.

Figure 26:
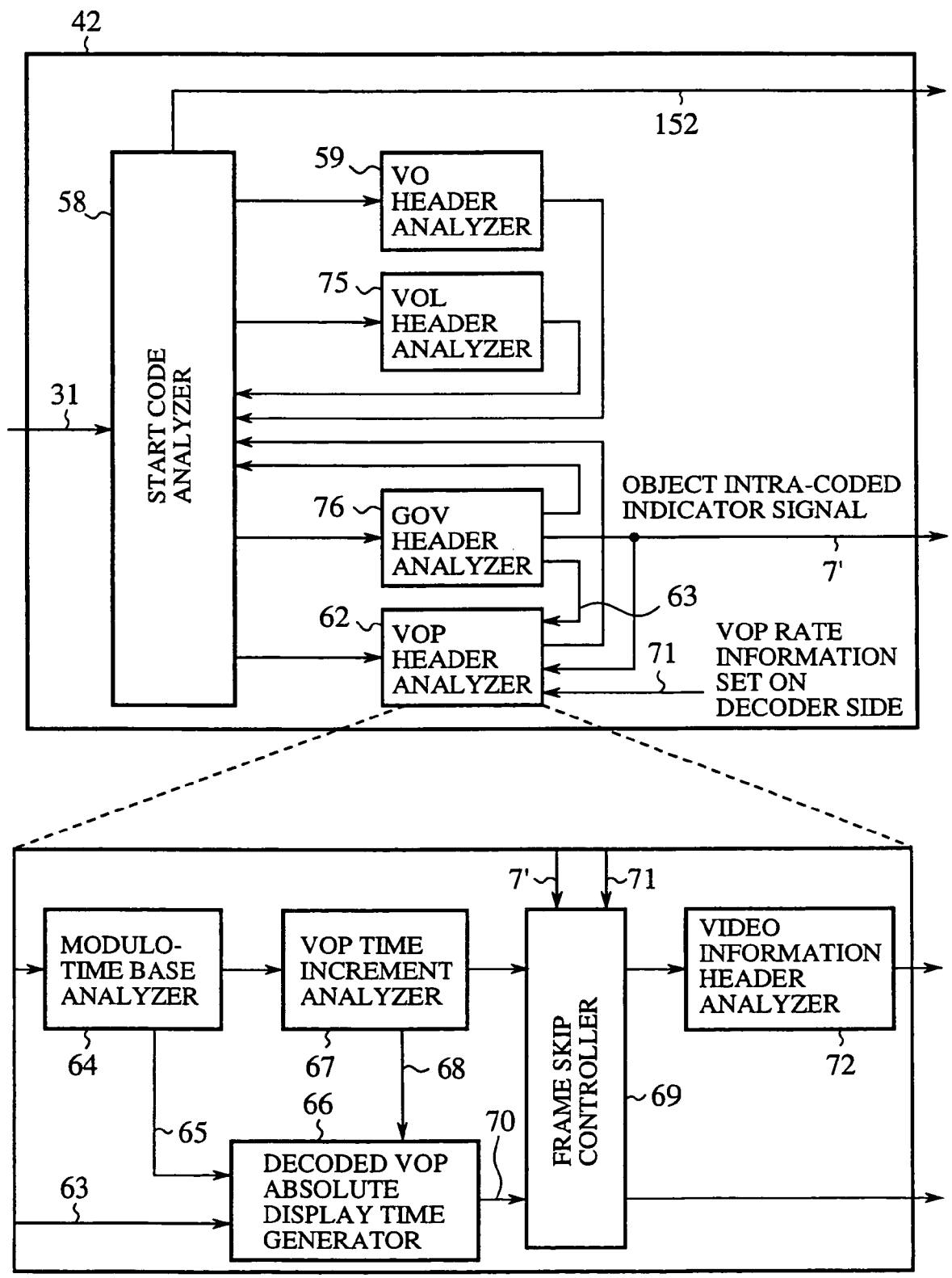
FIG. 26 is a block diagram showing another internal configuration of the header analyzer 42 of the embodiment 3 in accordance with the present invention.

Although the foregoing description is made by way of example that employs the coded bit stream 30 as shown in FIG. 8 as a coded bit stream, in which the VOL is used as a unit, and the object intra-coded indicator signal 7' is multiplexed into the VOL header 30b, the present invention is not limited to this. For example, the coded bit stream 31 as shown in FIG. 9 can be decoded in which the object intra-coded indicator signal 7' is multiplexed into the GOV header 31c. To achieve this, the header analyzer 42 can be configured as shown in FIG. 26 so that not the VOL header analyzer 75 but the GOV header analyzer 76 analyzes and decodes the object intra-coded indicator signal 7' multiplexed into the GOV header 31c. This enables the frame skipping display control on the GOV basis.

Figure 27:
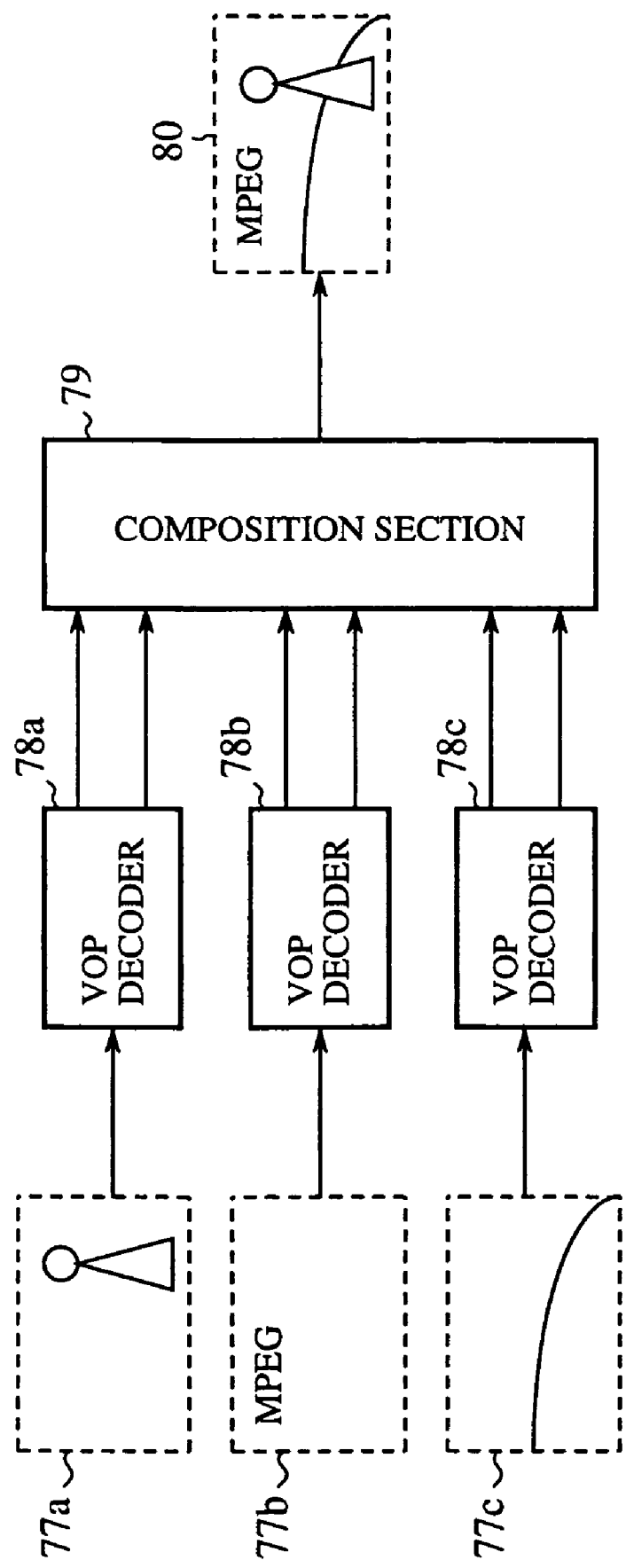
FIG. 27 is a block diagram showing an example of the image decoding apparatus of the embodiment 3 in accordance with the present invention applied to a system for regenerating a single image by combining decoded image signals of a plurality of objects.

Furthermore, a system as shown in FIG. 27 can be configured. It comprises in correspondence with objects 77a–77c a plurality of VOP decoders 78a–78c, each of which consists of the decoding apparatus of the present embodiment 3, and a composition section 79 that combines the decoded image signals of the plurality of objects 77a–77c to reconstruct a single image 80. The system can perform such display control as reducing the display rate of a particular object by the VOP decoders 78a–78c. This enables such control as reducing the display rate in the ascending order of importance, when a plurality of objects with the order of importance are combined into a picture.

Moreover, although it is assumed that the VOP decoder of the present embodiment 3 is capable of decoding the coded bit stream generated by the VOP encoder of foregoing embodiment 1, and receives and decodes the coded VOP bit stream 30 or 31 as illustrated in FIG. 8 or 9, this is not essential to the present invention. For example, the present invention can include not only the system that receives the bit stream directly from a coding apparatus and decodes it, but also a system that decodes a coded bit stream that is once encoded by the coding apparatus and then stored in a recording medium like DVD. This also applies to the decoding apparatus of the other embodiments.

Embodiment 4

The present embodiment 4 in accordance with the present invention relates to another example of the VOP decoder described in the foregoing embodiment 3. Specifically, the VOP decoder of the present embodiment 4 has a function to decode the bit stream including VOP rate information multiplexed into the VOL header together with the VOL header information on the encoder side, and to carry out the display control based on the decoded result.

Because the VOP decoder of the present embodiment 4 differs from the VOP decoder of the embodiment 3 only in the structure of the header analyzer 42, only this component will be described.

Figure 28:
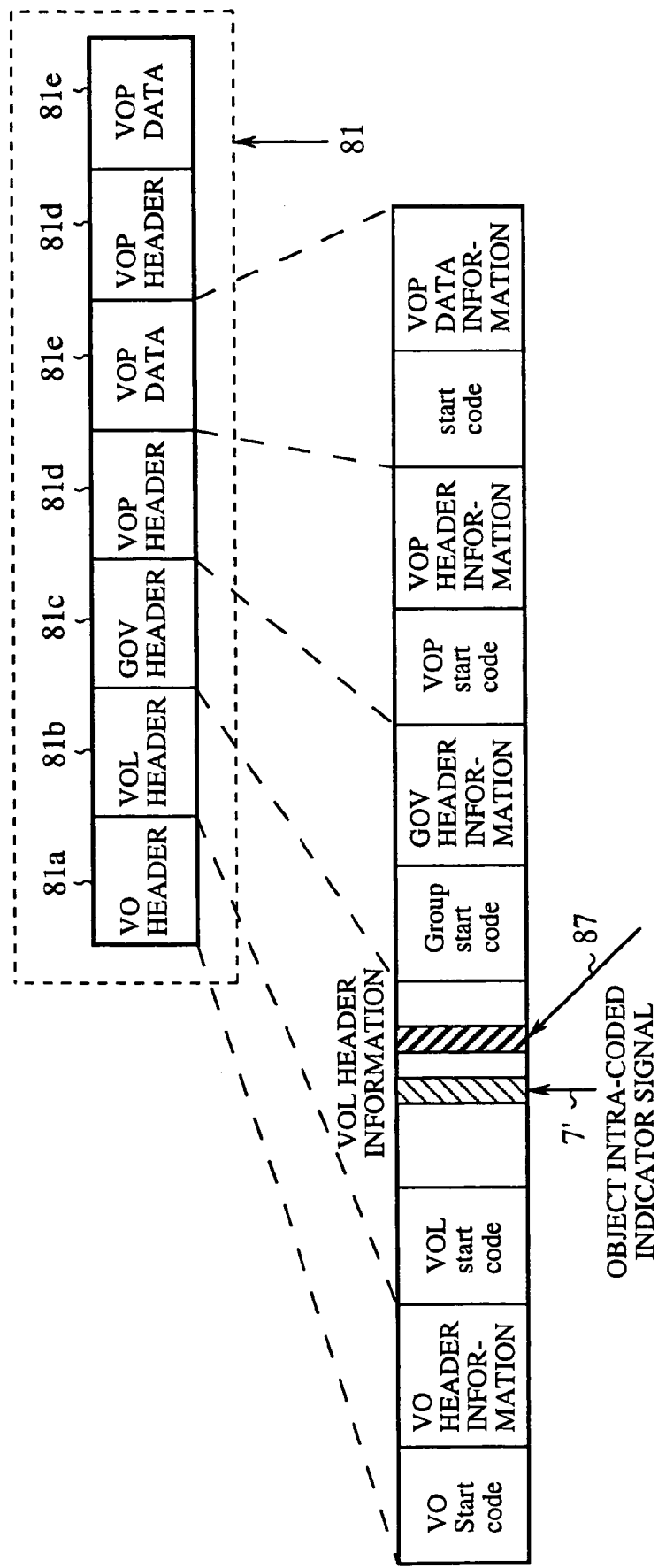
FIG. 28 is a diagram showing a coded bit stream including VOP rate information in the VOL header.

FIG. 28 shows an example of a coded bit stream 81 decoded by the VOP decoder of the present embodiment 4. The coded bit stream 81 as shown in FIG. 28 corresponds to a bit stream including VOP rate information 87 multiplexed into the VOL header 30b of the coded bit stream 30 as shown in FIG. 8, which is set on the encoder side. Thus, the VOP rate information 87 is multiplexed into a VOL header 81b in FIG. 28. The VOP rate information is such information as 30 VOPs/second when the encoder side encodes 30 VOPs per second, for example.

Figure 29:
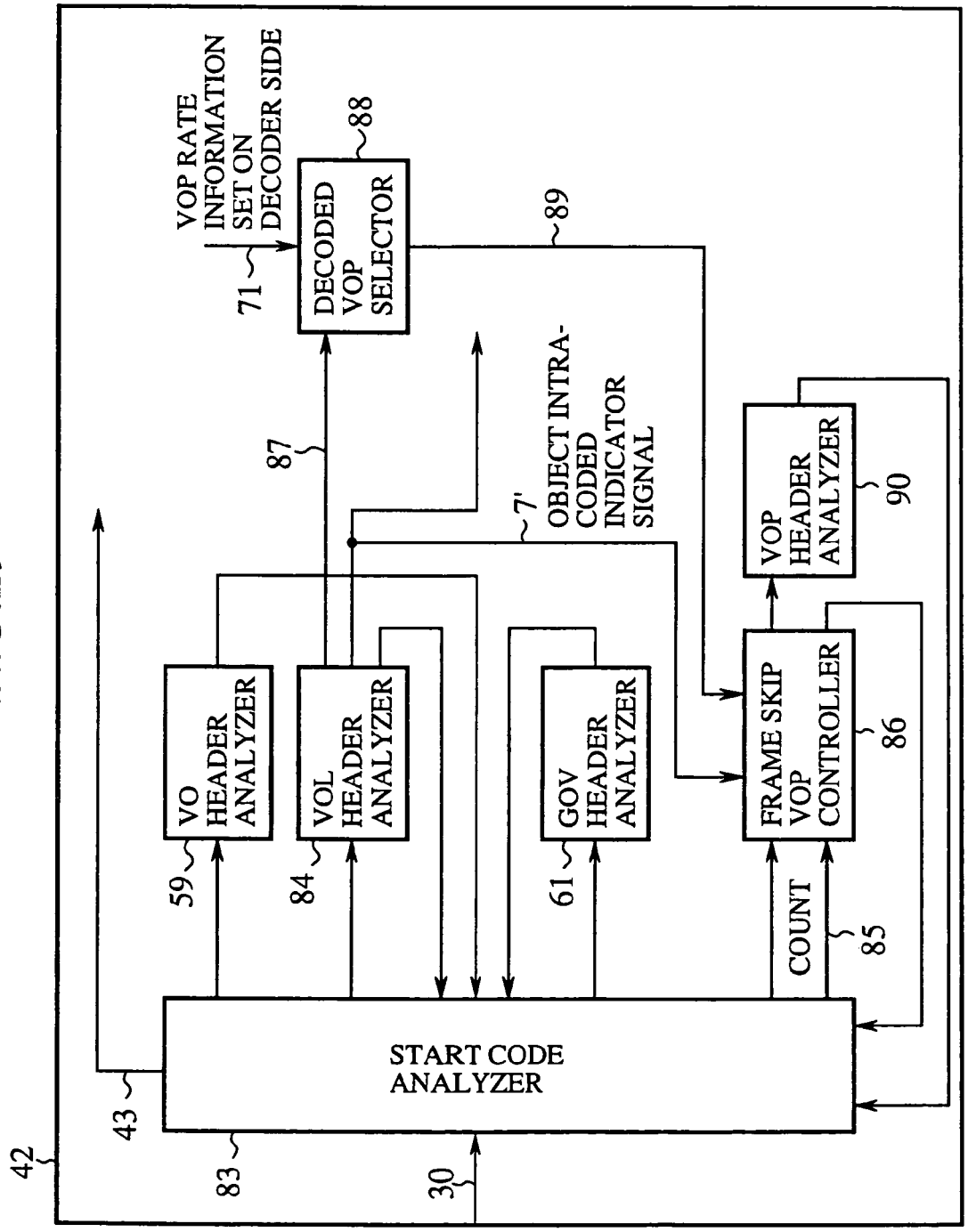
FIG. 29 is a block diagram showing an internal configuration of the header analyzer 42 of an embodiment 4 in accordance with the present invention.

FIG. 29 is a block diagram showing an internal configuration of the header analyzer 42 characterizing the present embodiment 4. In FIG. 29, the reference numeral 83 designates a start code analyzer; 84 designates a VOL header analyzer; 85 designates a count obtained by counting the number of analyzed VOPs with which the start code is analyzed; 86 designates a frame skip VOP controller; 87 designates VOP rate information set by the encoder; 88 designates decoded VOP selector; 89 designates VOP select information; and 90 designates a VOP header analyzer.

Figure 30:
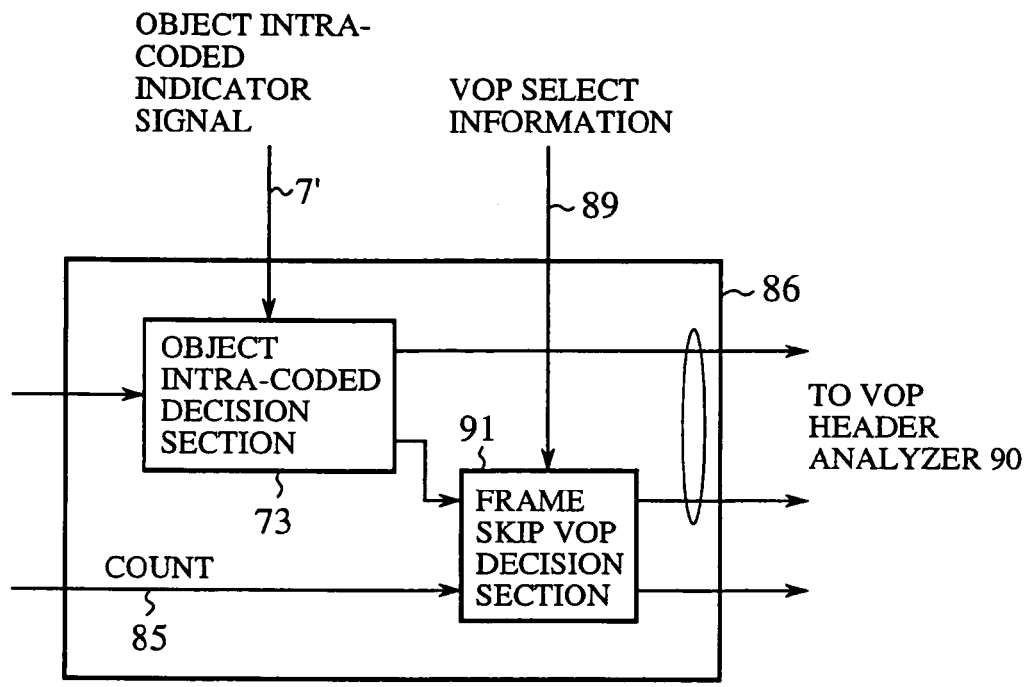
FIG. 30 is a block diagram showing the frame skip VOP controller 86 of the embodiment 4 as shown in FIG. 29.

FIG. 30 shows a configuration of the frame skip VOP controller 86 of the present embodiment 4 as shown in FIG. 29. In FIG. 30, the reference numeral 73 designates an object intra-coded decision section; and 91 designates a frame skip VOP decision section.

Next, the operation of the header analyzer 42 of the present embodiment 4 will be described.

Figure 31:
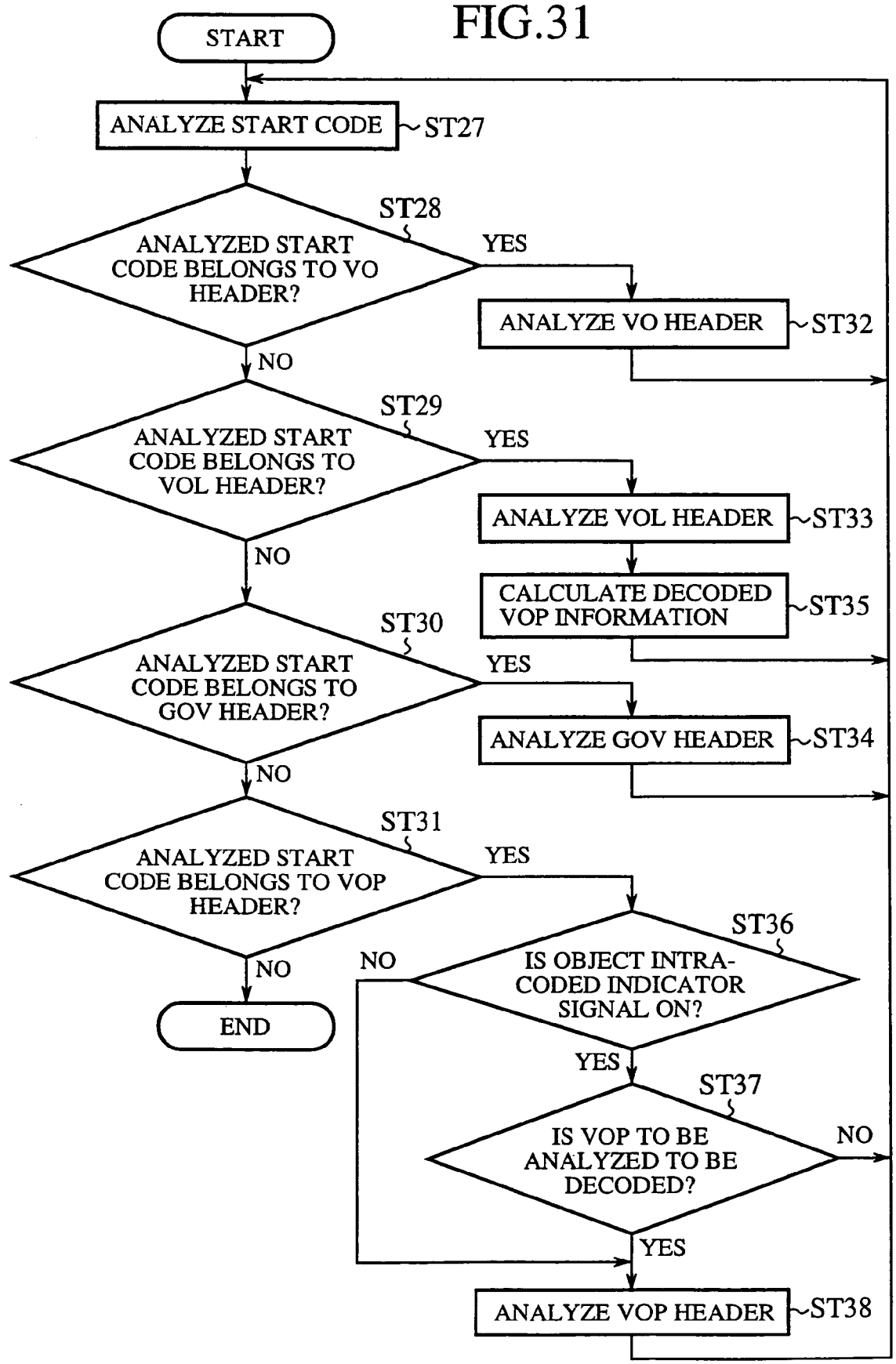
FIG. 31 is a flowchart illustrating the operation of the header analyzer 42 of the embodiment 4 in accordance with the present invention.

FIG. 31 is a flowchart illustrating the operation of the header analyzer 42 of the present embodiment 4.

First, in the header analyzer 42 of the present embodiment 4, the start code analyzer 83 analyzes the start code contained in the input coded bit stream 81 (step ST27). As a result, the start code analyzer 83 supplies the bit stream to the VO header analyzer 59 when the analyzed start code indicates the VO (step ST28), to the VOL header analyzer 84 when the analyzed start code indicates the VOL (step ST29), to the GOV header analyzer 61 when the analyzed start code indicates the GOV (step ST30), and to the frame skip VOP controller 86 when the analyzed start code indicates the VOP, in which case, every time the start code analyzer 83 detects the VOP start code, it increments its counter and supplies its count 85 to the frame skip VOP controller 86 (step ST31). Here, the count 85 is reset every time the VOL start code is detected.

The VO header analyzer 59 analyzes the VO header information in the input bit stream, and supplies the bit stream passing through the analysis back to the start code analyzer 83 (step ST32).

The VOL header analyzer 84 analyzes in the bit stream the VOL header information, the object intra-coded indicator signal 7' and the VOP rate information 87, and supplies the bit stream passing through the analysis back to the start code analyzer 83, the analyzed object intra-coded indicator signal 7' to the frame skip VOP controller 86, and the analyzed VOP rate information 87 to the decoded VOP selector 88 (step ST33).

The GOV header analyzer 61 analyzes the GOV header information in the input bit stream, and supplies the bit stream passing through the analysis back to the start code analyzer 83 (step ST34).

Then, the decoded VOP selector 88 compares the coding side VOP rate information 87 fed from the VOL header analyzer 84 with the VOP rate information 71 set on the decoder side by a user or the like, and supplies the frame skip VOP controller 86 with the VOP select information 89 indicating the information on the VOP to be decoded in accordance with the compared result (step ST35).

The VOP select information 89 will be described in more detail. Assume here that the VOP rate information 87 fed from the VOL header analyzer 84 indicates 30 pieces/second, and the VOP rate information 71 set on the decoder side is 15 pieces/second. In this case, the VOP select information 89 indicates that every other VOPs are to be analyzed. This corresponds to the fact that the decoder side decodes the VOPs alternately when decoding the bit stream encoded by the encoder side at a rate of 30 pieces per second.

Next, the frame skip controller 86 carries out the processing shown at steps ST36 and ST37. The frame skip control processing will now be described together with the VOP header analysis at step ST38.

First, as shown in FIG. 30, the object intra-coded decision section 73 in the frame skip VOP controller 86 decides the output destination of the bit stream in response to the object intra-coded indicator signal 7' fed from the VOL header analyzer 84 (step ST36). More specifically, the object intra-coded decision section 73 decides, as the output destination of the input bit stream, the frame skip VOP decision section 91 when the object intra-coded indicator signal 7' is ON, and the VOP header analyzer 90 when the object intra-coded indicator signal is OFF.

When the object intra-coded indicator signal 7' is ON, the frame skip VOP decision section 91 in the frame skip VOP controller 86 makes a decision corresponding to step ST37. Specifically, the frame skip VOP decision section 91 makes a decision as to whether the VOP to be analyzed is to be decoded or not in response to the VOP select information 89 and count 85. When the frame skip VOP decision section 91 decides that the VOP is to be decoded ("YES" at step ST37), it supplies the input bit stream to the VOP header analyzer 90. In contrast, when it decides that further analysis is unnecessary ("NO" at step ST37), it supplies the input bit stream back to the start code analyzer 83. For example, when the VOP select information 89 indicates that the VOPs to be analyzed take place at every other VOP, the frame skip VOP decision section 91 makes a decision that the decoding is necessary when the count 86 is an even number, and unnecessary when the count is an odd number.

The VOP header analyzer 90 analyzes the VOP header in the input bit stream, and supplies the bit stream after the analysis back to the start code analyzer 83 (step ST38). The start code analyzer 83 supplies the bit stream 43 after the analysis to the video signal analyzer 44 (see, FIG. 18) when the analysis by the VOP header analyzer 90 has been completed.

Thus, when the object intra-coded decision section 73 of the frame skip VOP controller 86 decides that the object intra-coded indicator signal 7' is OFF at step ST36, it supplies the input bit stream to the VOP header analyzer 90 without passing through the frame skip VOP decision section 91, which prevents the VOP from undergoing the frame skipping. This principle is the same as that of the foregoing embodiment 3. In contrast, when the object intra-coded decision section 73 decides that the object intra-coded indicator signal 7' is ON at step ST36, the frame skip VOP decision section 91 makes a decision as to whether the VOP to be analyzed at present has to be decoded or not in response to the VOP select information 89 and count 85. Then, it supplies the VOP header analyzer 90 with only the input bit stream to be decoded, thereby carrying out the VOP frame skipping.

As described above, the present embodiment 4 operates just as the foregoing embodiment 3 except that it has a function to carry out the display control based on the result of decoding the bit stream including the encoder side VOP rate information 87 multiplexed into the VOL header information on the encoder side. In addition, the present embodiment 4 is configured such that it analyzes the object intra-coded indicator signal 7' when decoding the coded bit stream including the object intra-coded indicator signal 7' multiplexed into the VOL header. This makes it possible, when the object intra-coded indicator signal 7' is ON, that is, when a decision is made that all the VOP data are intra coded, to carry out such processing as displaying the objects associated with these VOP data with frame skipping any desired VOPs in response to both the VOP rate information 87 set one the encoder side and the VOP rate information 71 set on the decoder side.

Furthermore, the present embodiment 4 is configured such that it decodes the coded bit stream 81 including the object intra-coded indicator signal 7' and VOP rate information 87 in the VOL header. This enables simpler frame skip control in addition to the advantage of the foregoing embodiment 3 of being able to perform display with frame skipping any desired VOPs. This is because it is unnecessary for the present embodiment 4 to analyze the individual VOP headers to decode the relative time information (modulo-time base and VOP time increment) about the display times which are set individually.

Figure 32:
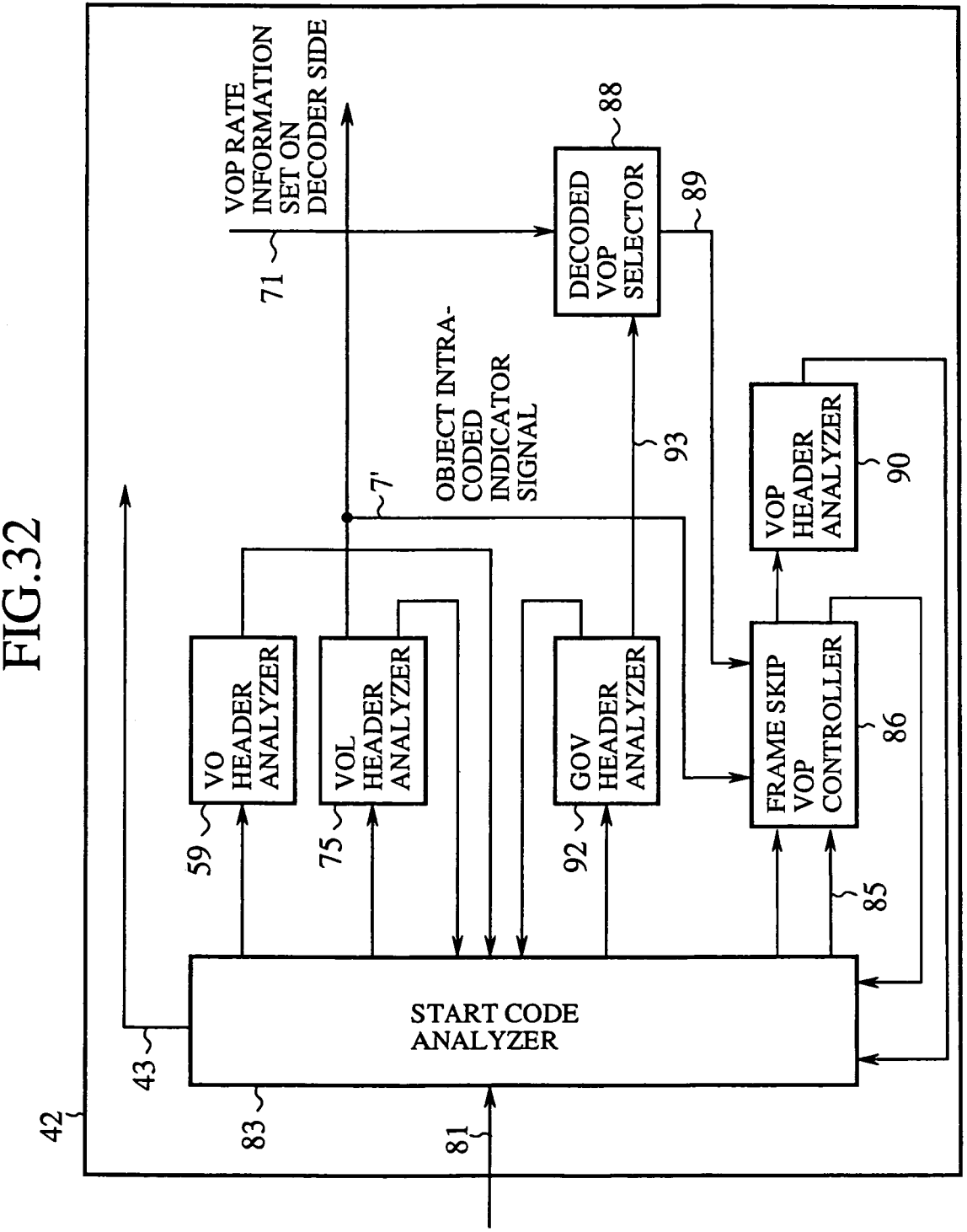
FIG. 32 is a block diagram showing another configuration of the header analyzer 42 of the embodiment 4 in accordance with the present invention.

Although it is assumed in the foregoing explanation that the decoding side receives and decodes the coded bit stream including the encoder side VOP rate information multiplexed into the VOL header, the present invention is not limited to this. For example, a coded bit stream can be decoded that has the encoder side VOP rate information multiplexed into the GOV header. This is implemented by providing a GOV header analyzer 92 in the header analyzer 42 with the function to decode encoder side VOP rate information 93 as shown in FIG. 32. Thus, the VOP rate information 93 becomes the information indicating the VOP display rate in the GOV.

Furthermore, as the foregoing embodiment 3, the present embodiment 4 can be configured such that it handles a bit stream including the object intra-coded indicator signal 7' encoded on every GOV basis, with offering a similar effect. In this case, in FIG. 29, not the VOL header analyzer 84 but the GOV header analyzer 61 has a function to analyze the object intra-coded indicator signal 7', and in FIG. 32, not the VOL header analyzer 75 but the GOV header analyzer 92 has the function to analyze the object intra-coded indicator signal 7', for example.

Moreover, the present embodiment 4 can achieve an advantage similar to that of the foregoing embodiment 3 by applying the VOP decoder of the present embodiment 4 to the system for decoding and combining a plurality of objects as shown in FIG. 27 described in connection with the embodiment 3. This holds true for the VOP decoders of other embodiments which will be described later. Thus, the following embodiments can also be applied to configure the system for decoding and combining a plurality of objects as shown in FIG. 27.

Embodiment 5

The embodiment 5 in accordance with the present invention relates to an image decoding apparatus capable of carrying out decoding and displaying VOPs at random at any desired time by receiving a coded bit stream that includes in a VOL layer the object intra-coded indicator signal, and includes in a GOV layer the time code information representing the absolute display time of the VOP at the initial position of the GOV. Since the present embodiment 5 differs from the decoding apparatus of the embodiment 3 in only the configuration of the header analyzer 42, only the configuration and operation of the header analyzer 42 will be described. Besides, in the present embodiment 5, the decoder will be described that receives and decodes the coded bit stream 30 as shown in FIG. 8.

Figure 33:
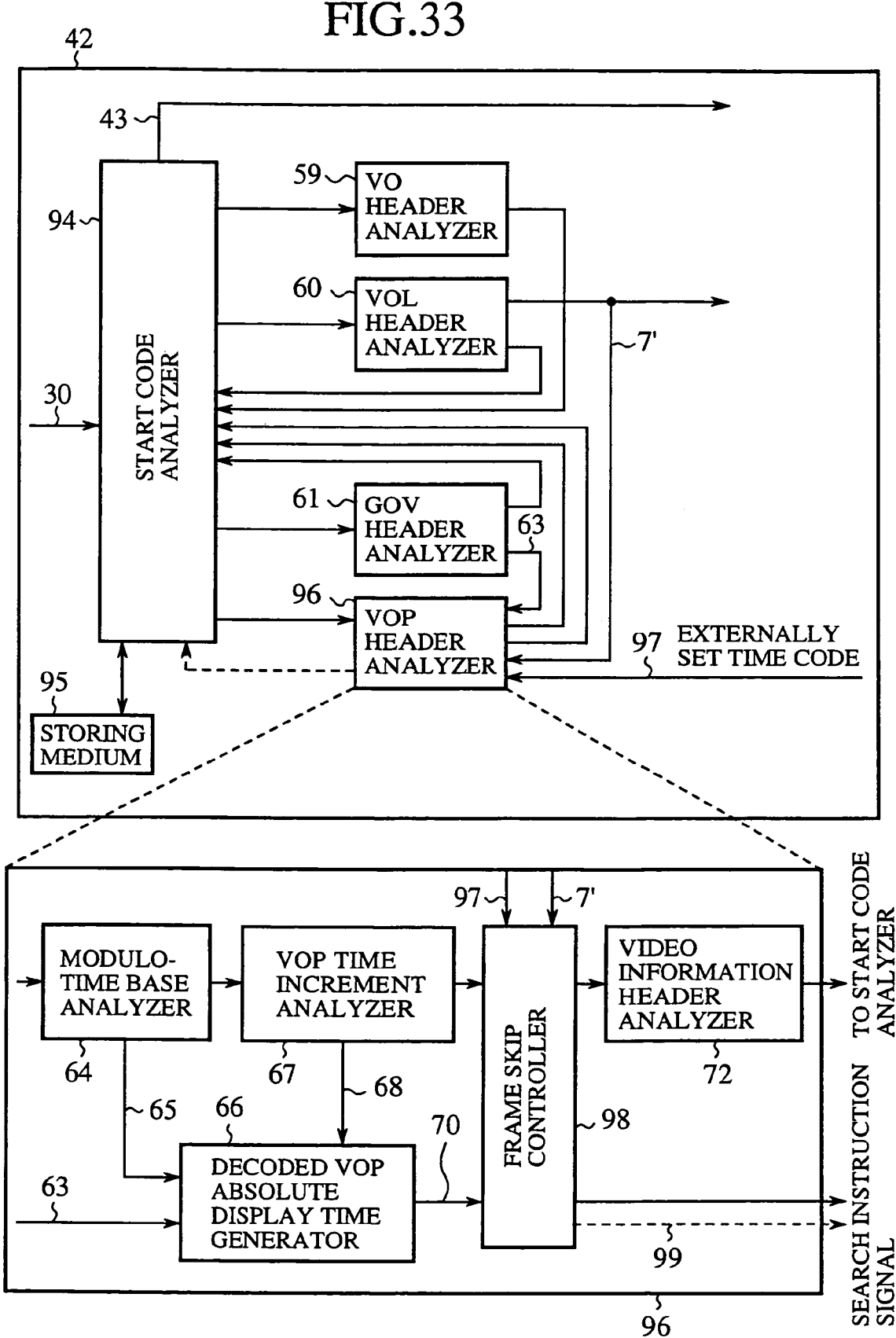
FIG. 33 is a block diagram showing an internal configuration of the header analyzer 42 of an embodiment 5 in accordance with the present invention.

FIG. 33 shows a configuration of the header analyzer 42 in the embodiment 5 in accordance with the present invention. In FIG. 33, the reference numeral 94 designates a start code analyzer; 95 designates a storing medium for storing the coded bit stream 30 transmitted from the coding side, such as a memory like a DRAM or SRAM, or a disk drive connected to a PC; 96 designates a VOP header analyzer; 97 designates an externally set time code; 98 designates a frame skip controller; and 99 designates a search instruction signal.

Figure 34:
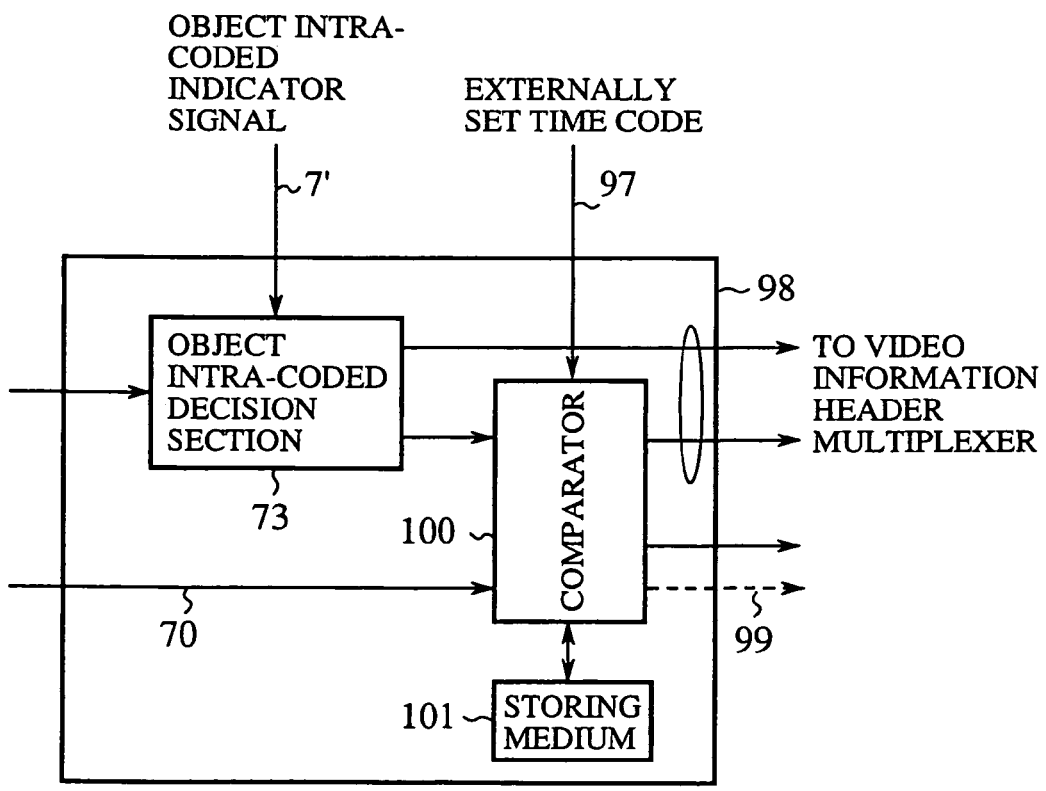
FIG. 34 is a block diagram showing the frame skip controller 98 of the embodiment 5 in accordance with the present invention.

FIG. 34 shows a configuration of the frame skip controller 98 as shown in FIG. 33. In FIG. 34, the reference numeral 73 designates the object intra-coded decision section; 100 designates a comparator; and 101 designates a storing medium.

Next, the operation of the header analyzer 42 of the present embodiment 5 will be described.

Figure 35:
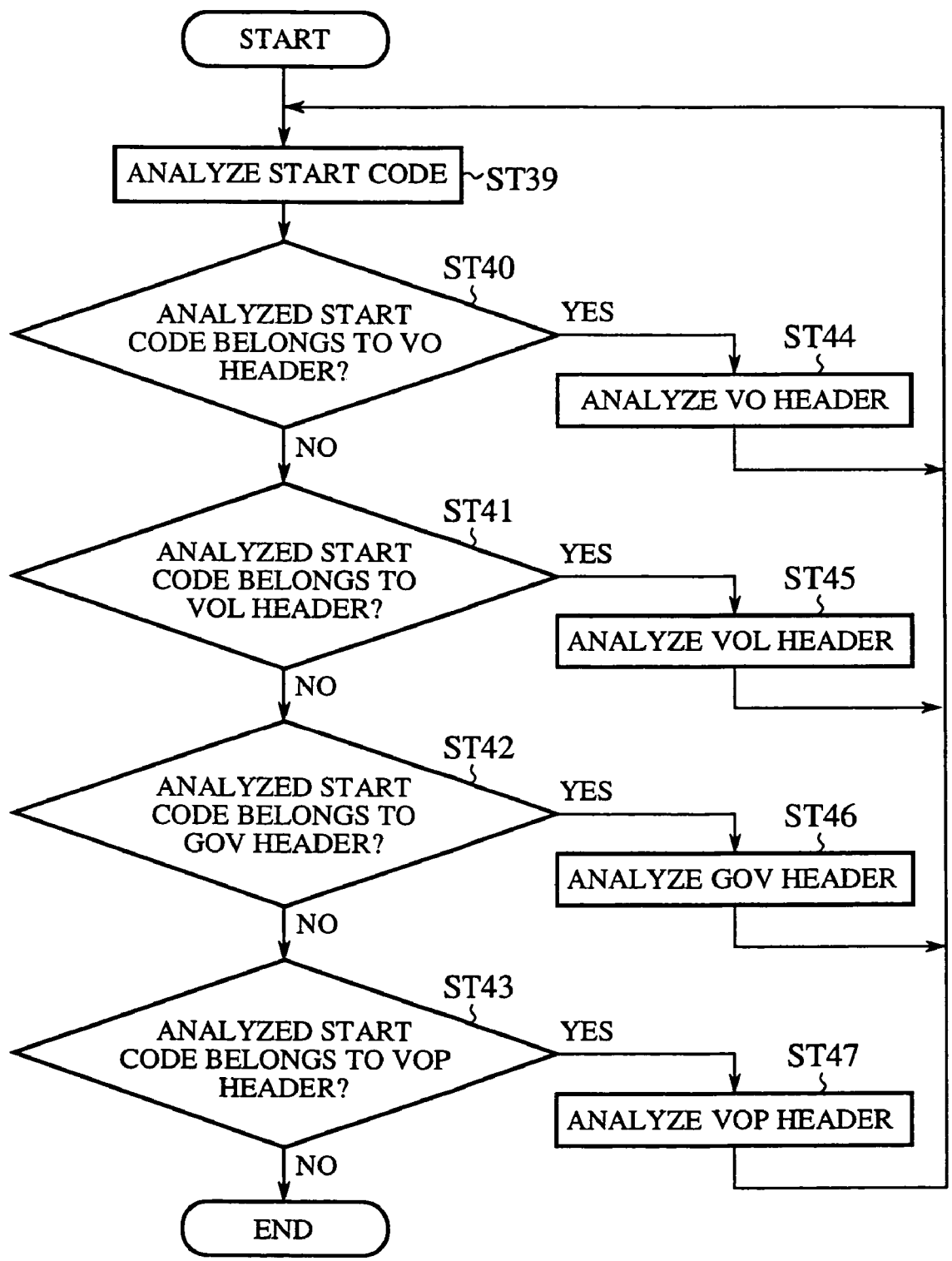
FIG. 35 is a flowchart illustrating the operation of the header analyzer 42 of the embodiment 5 in accordance with the present invention.

FIG. 35 is a flowchart illustrating the operation of the header analyzer 42 of the present embodiment 5.

In the header analyzer 42 of the present embodiment 5, the start code analyzer 94 analyzes the start code included in the input coded bit stream 30 (step ST39). The start code analyzer 94 supplies the bit stream to the VO header analyzer 59 when the analyzed start code indicates a VO (step ST40), to the VOL header analyzer 60 when the analyzed start code indicates a VOL (step ST41), to the GOV header analyzer 61 when the analyzed start code indicates a GOV (step ST42), and to the VOP header analyzer 96 when the analyzed start code indicates a VOP (step ST43). Incidentally, after completing the analysis by the VOP header analyzer 96, the bit stream is supplied to the video signal analyzer 44, and the processing is returned to the start code analysis again when the video signal analyzer completes the analysis and decoding of the video signal of the current VOP.

The VO header analyzer 59 analyzes the VO header information in the input bit stream, and supplies the start code analyzer 94 with the bit stream after the analysis (step ST44).

The VOL header analyzer 60 analyzes the VOL header information in the input bit stream, and supplies the start code analyzer 94 with the bit stream after the analysis (step ST45). In the course of this, the VOL header analyzer 60 decodes the object intra-coded indicator signal 7' contained in the VOL header, and supplies it to the VOP header analyzer 96.

The GOV header analyzer 61 analyzes the GOV header information in the input bit stream, and supplies the start code analyzer 94 with the bit stream after the analysis (step ST46). In the course of this, GOV header analyzer 61 decodes the time code 63 in the GOV header information, and supplies it to the VOP header analyzer 96.

The VOP header analyzer 96, which carries out the VOP header analysis at step ST47, comprises a structure for achieving high rate, simple random access of the VOP disclosed in the present embodiment 5. The structure is implemented by the frame skip controller 98.

Figure 36:
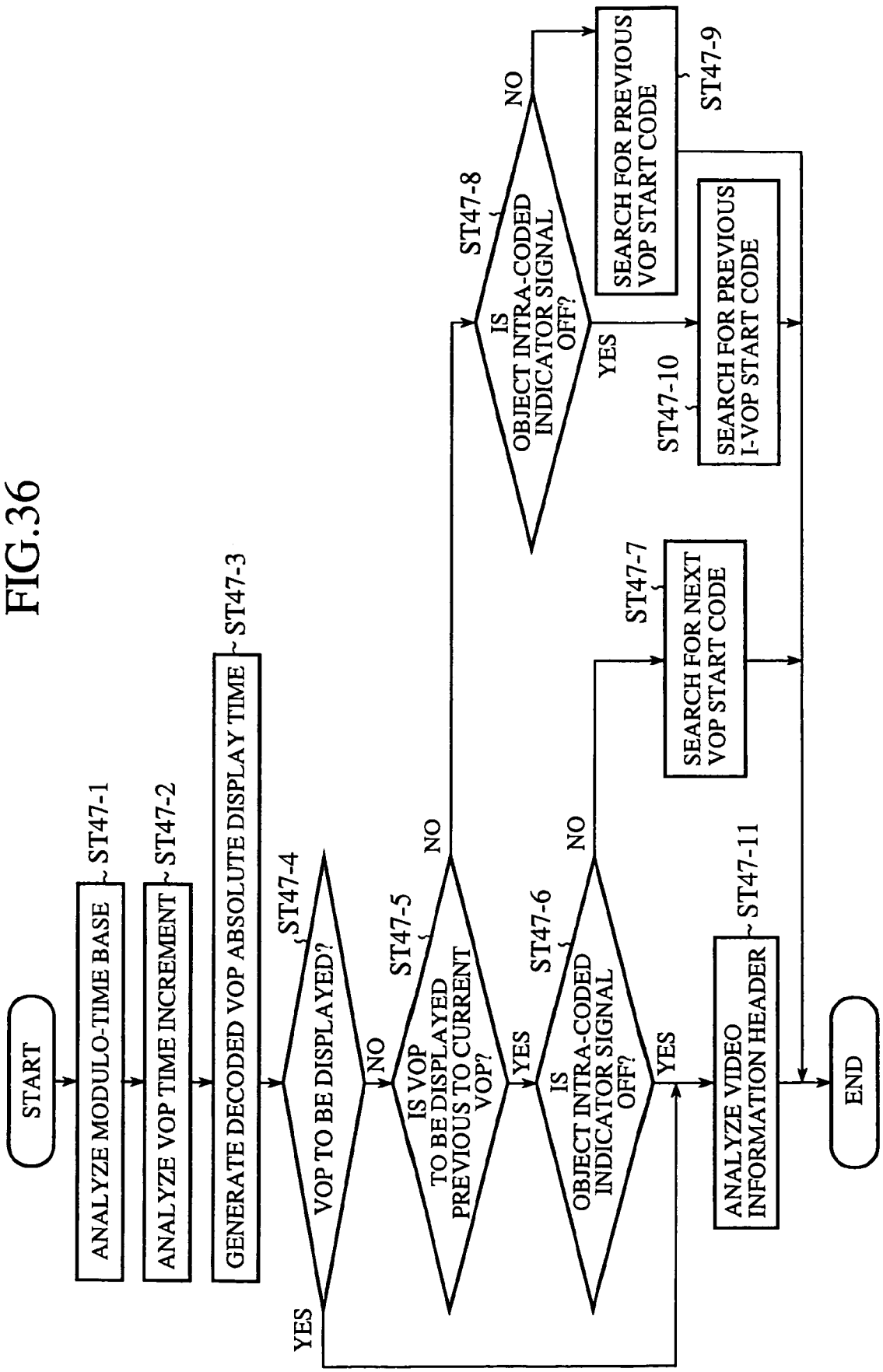
FIG. 36 is a flowchart illustrating the operation of the frame skip controller 98 of the embodiment 5 in accordance with the present invention.

FIG. 36 is a flowchart illustrating the processing in the VOP header analysis at step ST47 by the frame skip controller 98. Referring to FIG. 33 showing the details of the VOP header analyzer together with FIGS. 34 and 36, the VOP random access processing will be described.

First, as operation environments, the following conditions (1)–(4) are assumed.

(1) The decoding and display of objects is carried out by reading and loading the coded bit stream stored in the storing medium 95 (such as a storage like a CD-ROM and DVD, a memory like a DRAM and SDRAM, and a hard disk drive connected to a PC). In this case, the time codes are each displayed on the display screen in synchronism with the VOP display to notify the user of the absolute display time of respective VOPs. The coded bit stream can be transferred from the decoder to the readable storing medium 95 through a network or broadcasting network.

(2) The user stops the decoding at any desired position. At the same time, the tine code also halts at the corresponding VOP. The display continues showing the last VOP image displayed just before halting the decoding. It is assumed that the user wishes to extract from the bit stream a VOP image at a position before or after the stopped position as a still picture.

(3) The user inputs the time code of the VOP image he or she wished to extract by such a means as a command designating the time code or the like. The input time code thus entered becomes the externally set time code 97.

(4) Comparing the externally set time code 97 input by the user at the foregoing stage (3) with the time code of the currently stopped VOP image. If they differ from each other, the VOP image with the time code matching the externally set time code 97 is searched for and is decoded and displayed.

Incidentally, since each VOP usually undergoes predictive coding using VOP images before and after its position, all the VOPs having predictive relevance must be decoded before reaching the VOP with the desired time code to achieve the foregoing operation.

In the present embodiment 5, however, using the object intra-coded indicator signal 7' and the frame skip controller 98 makes it possible to immediately infer the VOL that is intra coded, that is, undergone coding without prediction, and as for such a VOL header, to decode and regenerate the desired VOP picture by directly searching for it.

First, in the foregoing condition (1), the decoding apparatus carries out the normal decoding operation. Assume that the decoding apparatus is in transition from the foregoing condition (1) to (2). In this state, the time code of the VOP image to be stopped is calculated. The calculation consists of three steps (step ST47-1–S47-3).

The first step analyzes the modulo-time base in the bit stream (step ST47-1), which is carried out by the modulo-time base analyzer 64.

The second step analyzes the VOP time increment in the bit stream (step ST47-2), which is carried out by the VOP time increment analyzer 67.

The third step calculates the VOP time code 70 indicating the decoded VOP absolute display time from the modulo-time base, VOP time increment and the GOV time code 63 fed from the GOV header analyzer 61 (step ST47-3). This is carried out by the decoded VOP absolute display time generator 66, and its calculation method was described in the foregoing embodiment 3. The VOP time code at the halt state of the foregoing condition (2) is exhibited to the user.

Subsequently, the user carries out the operation (3). This will provides the externally set time code 97, enabling the random access mechanism by the frame skip controller 98.

More specifically, the comparator 100 makes a decision as to whether the current VOP is the VOP a user wishes to display or not (step ST47-4) by comparing the time code of the VOP the user wishes to display, that is, the externally set time code 97 with the VOP time code 70 of the currently displayed VOP.

If they agree with each other, a decision is made that it is the "VOP to be displayed" ("YES" at step ST47-4), enabling the video information header analysis (step ST47-11). If not ("NO" at step ST47-4), a decision is made as to whether the VOP to be displayed is previous to the current VOP or not by comparing the externally set time code 97 with the VOP time code 70 of the current VOP (step ST47-5). Thus, one of the following two cases 1 and 2 is decided. In the course of this, the storing medium 101 temporarily stores the VOP time codes 70 previously used during the comparison by the comparator 100 so that the comparator 100 can select the VOP time code 70 close to the externally set time code 97.

Case 1

The case 1 takes place when the externally set time code 97 indicates a time subsequent to the VOP time code 70 in the foregoing condition (2) such as the externally set time code 97 is 01:00:30, and the VOP time code 70 in the condition (2) is 01:00:10 ("YES" at step ST47-5). The action is switched in response to the value of the object intra-coded indicator signal 7' (step ST47-6).

More specifically, when the object intra-coded indicator signal 7' is ON ("NO" at step ST47-6), that is, when it indicates that "all the VOPs in the VOL are intra coded", the comparator 100 sets the search instruction signal 99 to "forward search", and sends it with the bit stream to the start code analyzer 94 (step ST47-7). Thus, the start code analyzer 94 searches for the VOP start code ahead of, that is, after the VOP time code 70 in the condition (2).

In contrast, when the object intra-coded indicator signal 7' is OFF ("YES" at step ST47-6), that is, when it indicates that "the VOPs in the VOL are subject to the predictive coding", the individual VOPs cannot be directly decoded because they undergo the predictive coding. In this case, the VOP time code 70 is calculated by decoding the modulo-tine base 65 and VOP time increment 68 of the individual VOPs through the foregoing steps ST47-1–47-3 and ST47-11, so that the individual VOP images are decoded sequentially. Thus, the subsequent VOPs are successively decoded in this case.

Case 2

The case 2 takes place when the externally set time code 97 indicates a time before the VOP time code 70 in the foregoing condition (2) such as the externally set time code 97 is 01:00:00, and the VOP time code in the foregoing condition (2) is 01:00:10 ("NO" at step ST47-5). The action is switched in response to the value of the object intra-coded indicator signal 7' (step ST47-8).

More specifically, when the object intra-coded indicator signal 7' is ON ("NO" at step ST47-8), that is, when "all the VOPs in the VOL are intra coded", the comparator 100 sets the search instruction signal 99 at "backward search", and sends it together with the bit stream to the start code analyzer 94 (step ST47-9). This makes it possible for the start code analyzer 94 to analyze the bit stream in the backward direction, thereby enabling searching for the start code of the VOPs before the foregoing condition (2).

In contrast, when the object intra-coded indicator signal 7' is OFF ("YES" at step ST47-8), that is, when it indicates that "the VOPs in the VOL are subject to the predictive coding", the individual VOPs cannot be directly decoded because they undergo the predictive coding. In this case, the VOP time code 70 must be calculated by decoding the modulo-time base 65 and VOP time increment 68 of the individual VOPs, and the image data twist be decoded by ascending to the VOP images that are not subjected to the prediction, that is, to the previous I-VOP (intra-coded VOP), and by restarting the decoding therefrom. This is handled by instructing to perform backward search by ascending to the previous I-VOP according to the search instruction signal 99 (step ST47-10).

Thus, in the present embodiment 5, when the object intra-coded indicator signal 7' is ON in the cases 1 and 2, the start code detection of the VOPs is continued according to the search instruction signal 99, and the VOP image data is skipped without carrying out the video information header analysis at step ST47-11.

Specifically, every time the VOP start code is detected, the following processings are iterated until the externally set time code 97 agrees with the VOP time code 70 obtained as a result of the search. These processings comprise the analysis of the modulo-time base and VOP time increment of the individual VOPs; the calculation of the VOP time code 70 indicating the absolute display time of the currently decoded VOP (step ST47-1–S47-3); and a decision making as to whether the current VOP is a VOP to be displayed or not by comparing the current VOP time code 70 with the externally set time code 97 (step ST47-4). These processings are iterated until the externally set time code 97 agrees with the VOP time code 70 obtained as a result of the search. When the externally set time code 97 agrees with the VOP time code 70 as a result of the search, which means that the decoding is stopped at the exact position of the VOP to be displayed, the operation of the random access is completed.

As described above, according to the present embodiment 5, when the object intra-coded indicator signal 7' that indicates whether all the VOPs in the VOL are intra coded or not is ON, that is, when all the VOPs in the VOL are intra coded, the VOP image data is skipped without performing the sequential decoding of individual VOPs based on the video information header analysis at step ST47-11 so that the desired VOP image data is directly searched for and decoded.

As a result, considering a home video according to the MPEG-4 compression standard, which intra codes all VOPs and stores them on the storing medium 95, and edits a desired scene by combining them with other object videos provided through the Internet or by means of a CD-ROM or DVD-ROM, the decoding apparatus with the configuration of the present embodiment 5 can make a high speed access to a picture at a desired time in the video pictures acquired, thereby enabling the video edition without stress.

Furthermore, the video contents can be stored in a large capacity recording medium such as a DVD-RAM with their VOPs being intra coded using the compression standard according to the MPEG-4, so that desired edition can be achieved by exploiting high speed access when producing a television program.

Although the present embodiment 5 is described by way of example of the coded bit stream 30 including the object intra-coded indicator signal 7' multiplexed into the VOL header as shown in FIG. 8, in which the bit stream containing the GOV layer including the time code is decoded, the present invention is not limited to this. For example, as for the coded bit stream 31 as shown in FIG. 9 that includes the object intra-coded indicator signal 7' multiplexed into the GOV header 31c, random access to a desired VOP can be made smoothly using the configuration that analyzes the object intra-coded indicator signal 7' by the GOV header analyzer 61 when all the VOP in the GOV are intra coded.

Embodiment 6

In the present embodiment 6 in accordance with the present invention, an image decoding apparatus will be described which receives a coded bit stream, and can perform decoding and display by randomly designating the VOP at a desired time. The coded bit stream includes in the VOL layer the object intra-coded indicator signal 7' and the VOP rate information as the display rate information indicating the display rate of the VOPs in the VOL, and includes in the GOV layer the time code information representing the absolute display time of the VOP at the initial position of the GOV. In the present embodiment 6, since only the configuration of the header analyzer of the decoding apparatus differs from that of the embodiment 4, only the operation of the header analyzer will be described below. Besides, it is assumed in the following description of the present embodiment 6 that the coded bit stream 81 as shown in FIG. 28 is input and decoded.

Figure 37:
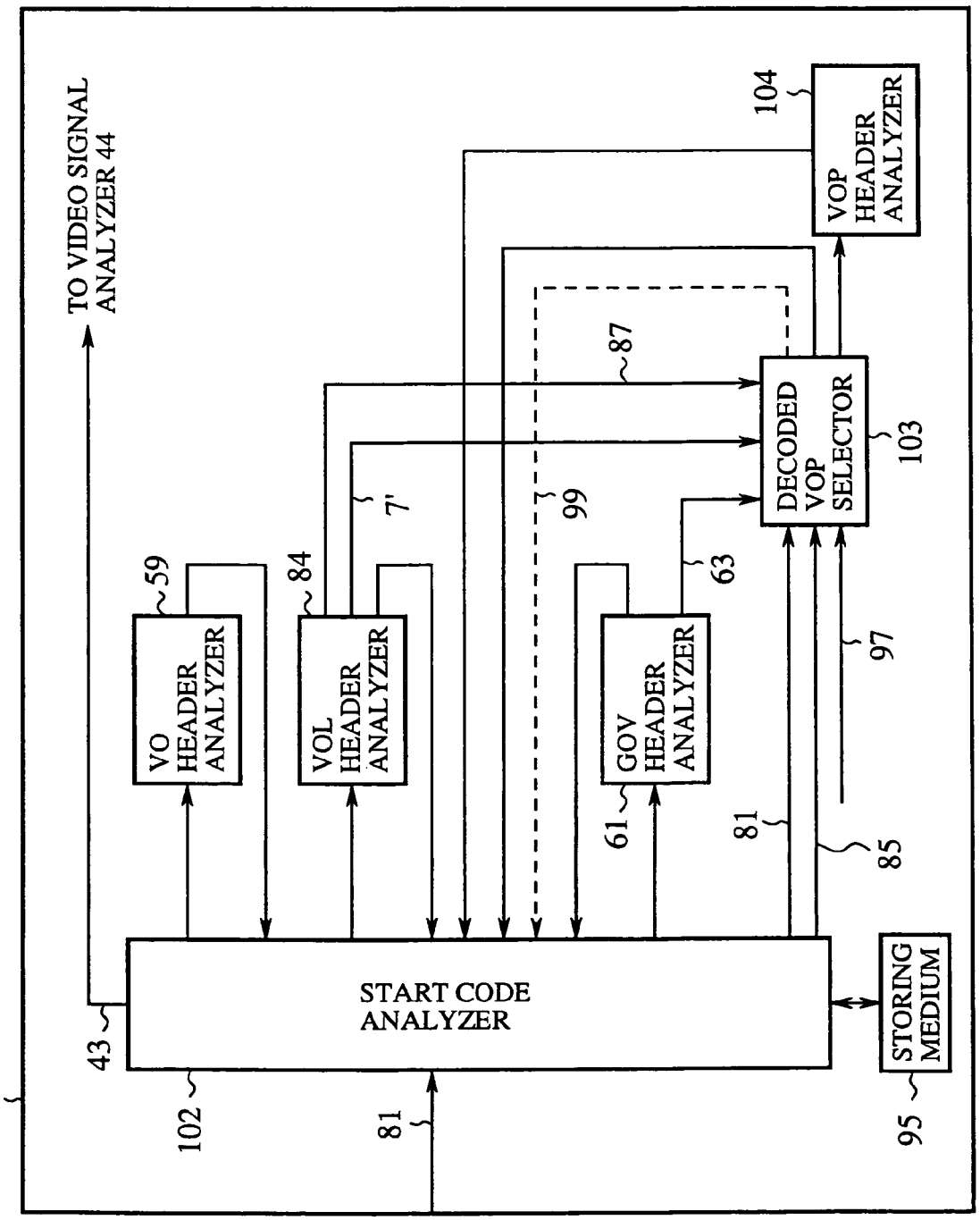
FIG. 37 is a block diagram showing an internal configuration of the header analyzer 42 of an embodiment 6 in accordance with the present invention.

FIG. 37 is a block diagram showing a configuration of the header analyzer 42 in the embodiment 6 in accordance with the present invention. In FIG. 6, the reference numeral 102 designates a start code analyzer; 103 designates a decoded VOP selector; and 104 designates a VOP header analyzer. Since the remaining configuration is the same as that of the header analyzer as shown in FIG. 29 of the embodiment 4, the description thereof is omitted here by assigning the same reference numerals.

Figure 38:
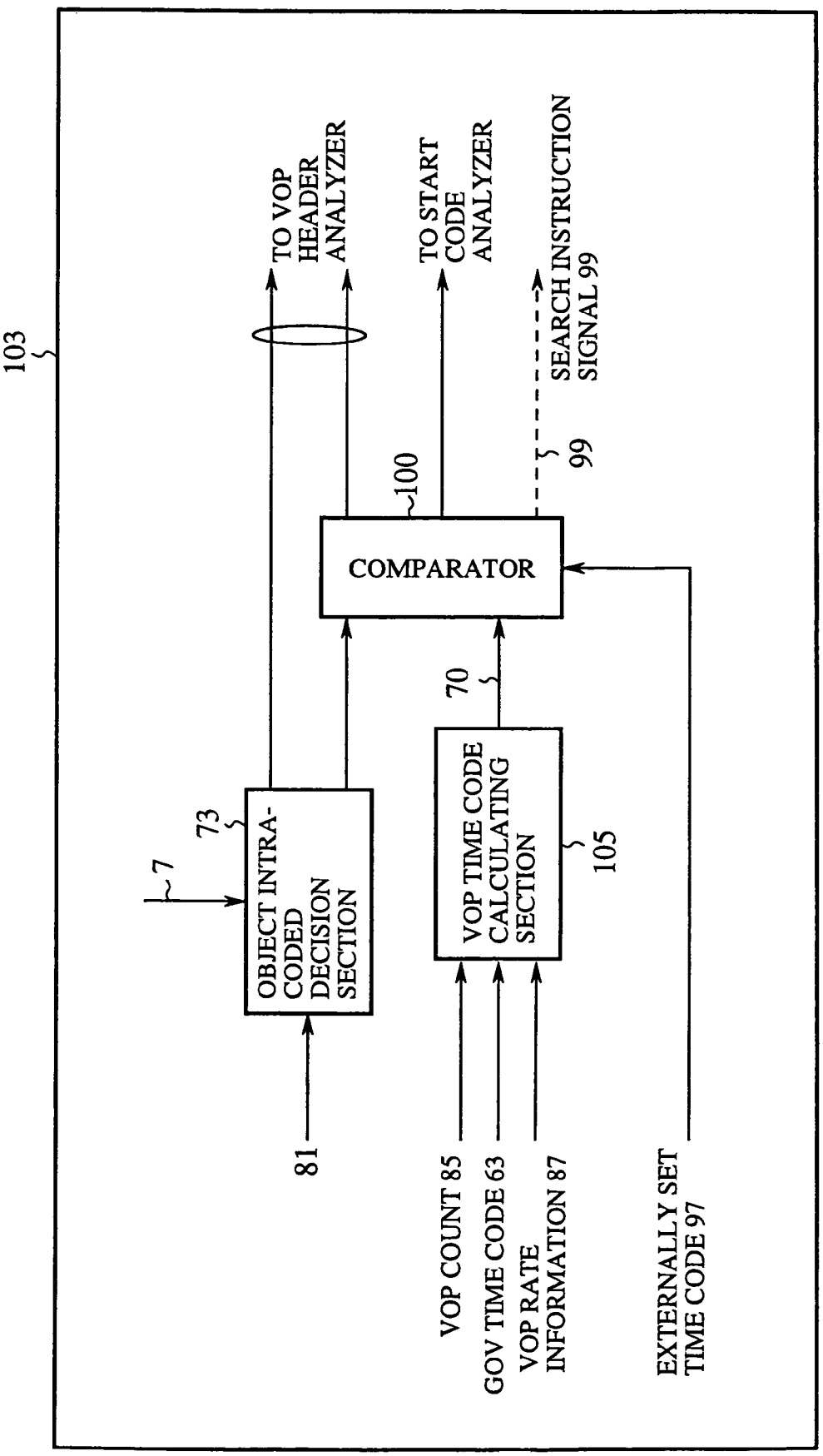
FIG. 38 is a block diagram showing the decoded VOP selector 103 as shown in FIG. 37.

FIG. 38 shows an internal configuration of the decoded VOP selector 103 as shown in FIG. 37. In FIG. 38, the reference numeral 73 designates an object intra-coded decision section; 100 designates a comparator; and 105 designates a VOP time code calculating section.

Next, the operation of the header analyzer 42 of the present embodiment 6 will be described.

Figure 39:
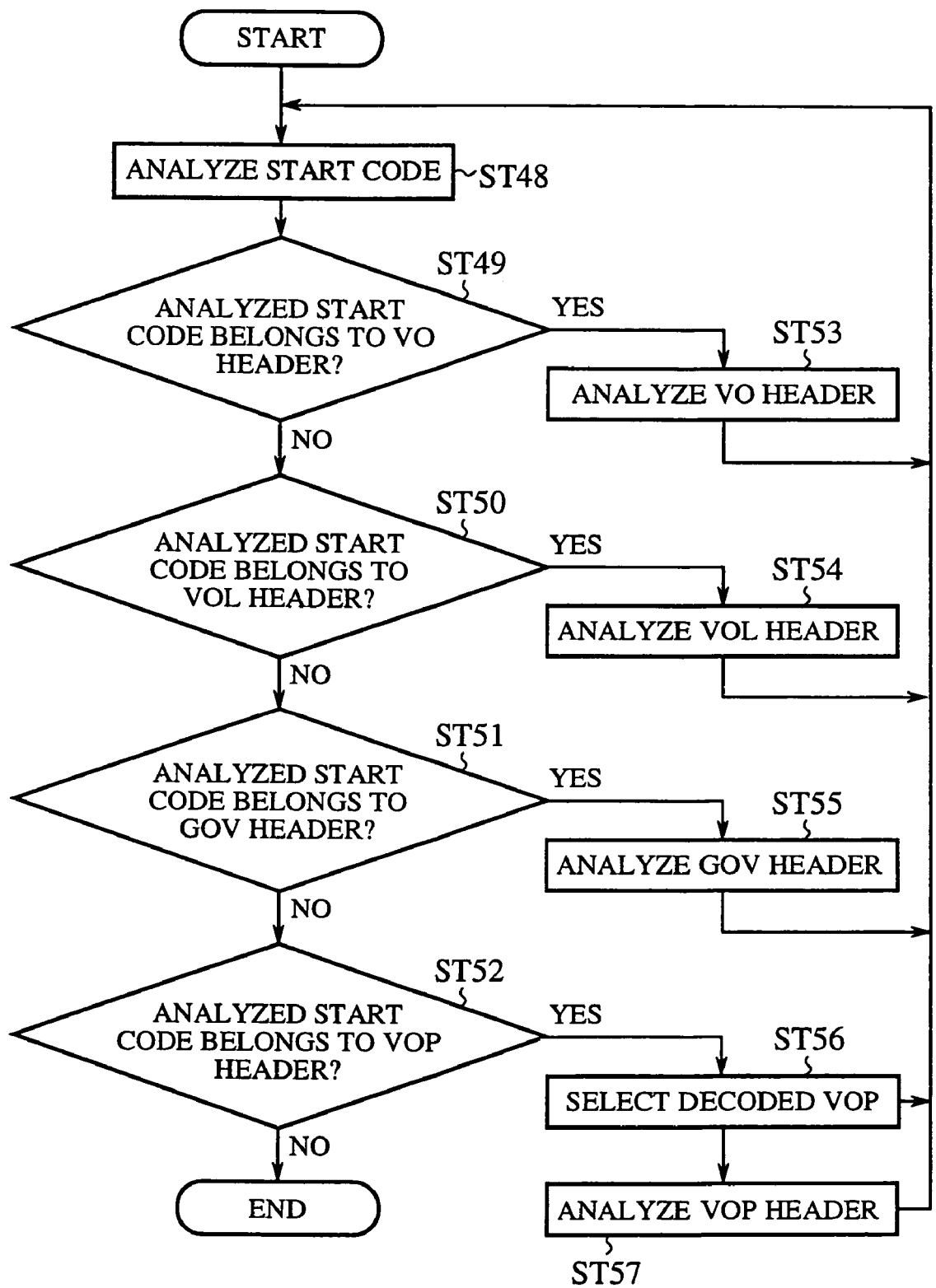
FIG. 39 is a flowchart illustrating the operation of the header analyzer 42 of the embodiment 6 in accordance with the present invention.

FIG. 39 is a flowchart illustrating the operation of header analyzer 42 of the present embodiment 6.

In the header analyzer 42 of the present embodiment 6, the start code analyzer 102 analyzes the start code contained in the input coded bit stream 81 (step ST48), first. The start code analyzer 102 supplies the bit stream to the VO header analyzer 59 when the analyzed start code represents the VO (step ST49), to the VOL header analyzer 84 when the analyzed start code represents the VOL (step ST50), to the GOV header analyzer 61 when the analyzed start code indicates the GOV (step ST51), and to the decoded VOP selector 103 when the analyzed start code indicates the yap (step ST52).

After completing the analysis, the VOP header analyzer 104 supplies the bit stream 43 passing through the header analysis to the video signal analyzer 44 which analyzes and decodes the video signal of the current VOP, and the processing returns to the start code analysis, again. The start code analyzer 102 has a VOP counter in its inside, which increments the VOP count every time the VOP start code is detected, and outputs the count 85. The count 85 is supplied to the decoded VOP selector 103. It is assumed here that the count 85 is reset every time the GOV start code or VOL start code is detected.

The VO header analyzer 59 analyzes VO header information in the input bit stream, and supplies the bit stream after the analysis to the start code analyzer 102 (step ST53).

The VOL header analyzer 84 analyzes the VOL header information in the input bit stream, and supplies the bit stream after the analysis to the start code analyzer 102 (step ST54). In the course of this, the VOL header analyzer 84 decodes the object intra-coded indicator signal 7' and VOP rate information 87 contained in the VOL header information, and supplies them to the decoded VOP selector 103.

The GOV header analyzer 61 analyzes the GOV header information in the input bit stream, and supplies the bit stream after the analysis to the start code analyzer 102 (step ST55).

In the course of this, the GOV header analyzer 61 decodes the GOV time code 63 contained in the GOV header information, and supplies it to the decoded VOP selector 103.

Thus, the decoded VOP selector 103 can implement the high speed, simple VOP random access structure disclosed by the present embodiment 6 (step ST56).

According to the present embodiment 6, using the object intra-coded indicator signal 7' and the decoded VOP selector 103 makes it possible to immediately infer the VOL intra coded, that is, the VOL undergone coding without prediction, and as for such a VOL header, to decode and regenerate the desired VOP picture by directly searching for it.

In particular, in the present embodiment 6, the VOL layer contains the VOP rate information, and the time codes 70 of the individual VOPs can be identified without decoding the modulo-time base and VOP time increment.

Figure 40:
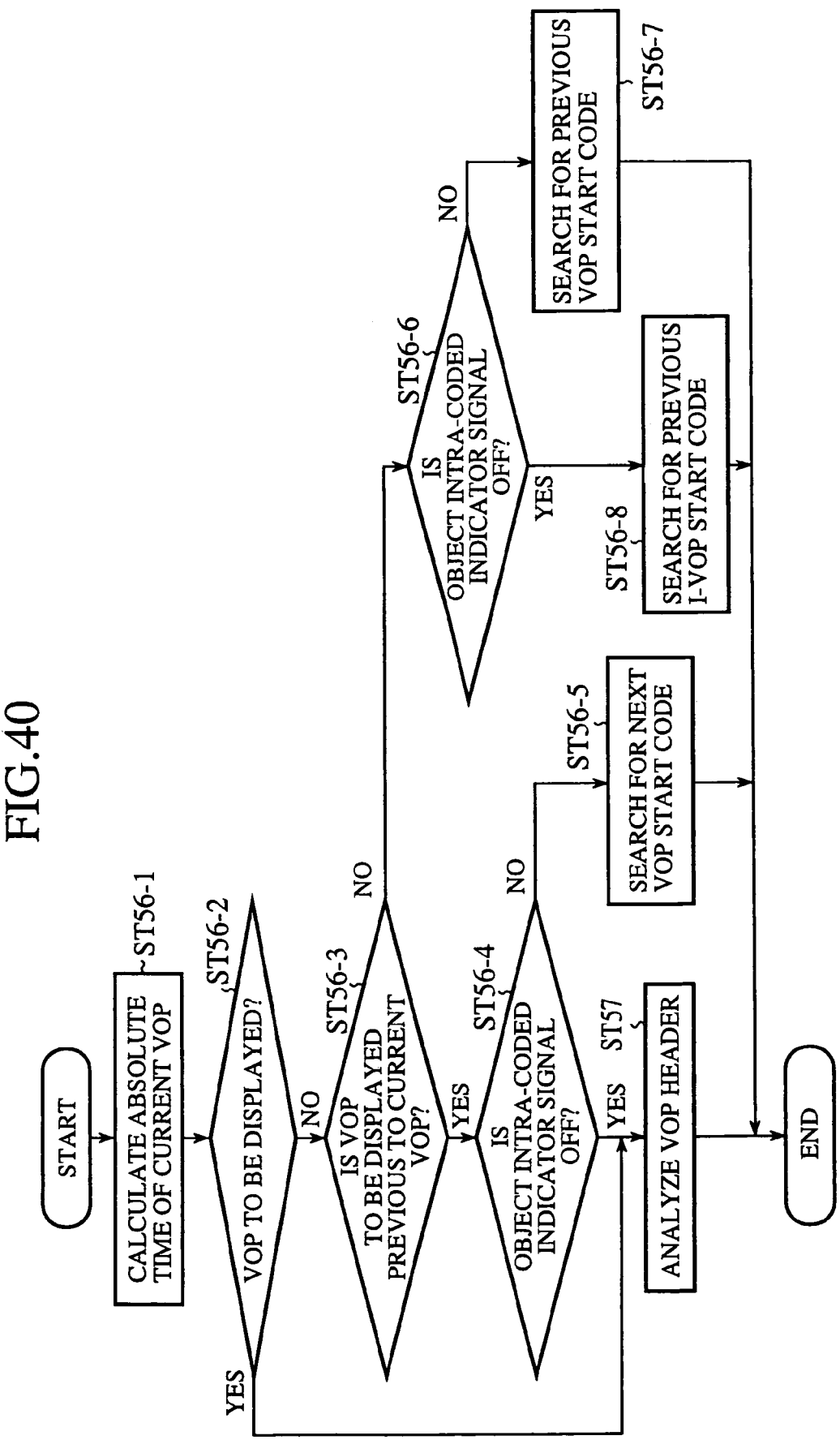
FIG. 40 is a flowchart illustrating the detail processing of a VOP random access mechanism at step ST56 by the decoded VOP selector 103 of the embodiment 6 in accordance with the present invention.

FIG. 40 is a flowchart illustrating the detail processing of the VOP random access by the decoded VOP selector 103 at step ST56.

Referring mainly to FIGS. 38 and 40, the operation of the VOP random access processing will be described. Here, assume the conditions (1)–(4) described in the foregoing embodiment 5 as the operation conditions.

More specifically, the decoding apparatus carries out the normal decoding operation in the condition (1) in the present embodiment 6. Assumed that the decoding apparatus is in a transition from the condition (1) to the condition (2). In this case, the VOP time code calculating section 105 first calculates the time code 70 of the VOP image whose decoding is to be halted in response to the user action in the condition (2) (step ST56-1). It is obtained by the following expression.

$$\text{VOP time code 70} = \text{GOV time code 63} + (\text{count 85}) \div (\text{VOP rate information 87})$$

In other words, the VOP time code calculating section 105 divides the count 85 by the VOP rate information 87 on the coding side, and adds the quotient to the GOV time code 63 to obtain the time code 70 of the VOP image whose decoding is to be halted.

For example, when the GOV time code 63 is 01 hour 00 minute 00 second, the count 85 is 60, and the coding side VOP rate information 87 is 30 pieces/second, the VOP time code is calculated as 01 hour 00 minutes 02 seconds by adding 60/30 (=2) seconds to the GOV time code 63.

According to the present embodiment 6, it is unnecessary to obtain the VOP time code 70 of the VOP image for halting the decoding through the three steps (step ST47-1–ST47-3) as in the foregoing embodiment 5. Instead of this, the start code analyzer 102 detects the start code of each VOP, and increments the VOP counter so that it can decide, using the count 85, the VOP rate information 87 on the coding side and the GOV time code 63, the VOP time code 70 for halting the decoding more quickly than the embodiment 5 can do. Thus, it can presents the user with the VOP time code at the halt state in the foregoing condition (2).

Subsequently, the user carries out the operation in the foregoing condition (3), which will provide the externally set time code 97 the user wishes to extract. This will activate the random access structure by the decoded VOP selector 103.

More specifically, the comparator 100 decides first on whether the VOP at which the decoding is halted is the VOP the user wishes to display or not (step ST56-2) by comparing the externally set time code 97 with the VOP time code 70 fed from the VOP time code calculating section 105.

When they agree ("YES" at step ST56-2), the comparator 100 decides that the VOP is the "VOP to be displayed", and carries out the analysis of the VOP header (step ST57). Otherwise ("NO" at step ST56-2), comparing the externally set time code 97 with the VOP time code 70 of the current VOP, it decides as to whether the VOP to be displayed is before or after the current VOP (step ST56-3), and then makes a decision on which one of the following cases 1 and 2 applies.

Case 1

The case 1 applies when the externally set time code 97 indicates that it follows the VOP time code 70 in the foregoing condition (2) such as when the externally set time code 97 is 01:00:30, and the VOP time code 70 in the foregoing condition (2) is 01:00:10 ("YES" at step ST56-3). In this case, the action to be taken is switched in response to the value of the object intra-coded indicator signal 7' (step ST56-4).

Thus, when the object intra-coded indicator signal 7' is ON ("NO" at step ST56-4), that is, when it indicates that "all the VOPs in the VOL are intra coded", the comparator 100 places the search instruction signal 99 at "forward search", and supplies it together with the bit stream to the start code analyzer 102 (step ST56-5).

This enables the start code analyzer 102 to search for the VOP start code forward, that is, the VOP start code subsequent to the VOP time code 70 at which the decoding is halted in the foregoing condition (2).

On the contrary, when the object intra-coded indicator signal 7' is OFF ("YES" step ST56-4), that is, when it indicates that the "VOPs in the VOL undergo the predictive coding", the individual VOPs cannot be directly decoded because the VOPs in the VOL are predictively coded.

Accordingly, the VOP header analyzer 104 must carry out in the normal VOP header analysis at the next step ST57 substantially the same processing as that of steps ST47-1–ST47-3 and ST47-11 as shown in FIG. 36 to analyze and decode the individual VOP modulo-time base and VOP time increment, and to calculate the VOP time code 70 of the current VOP at which the decoding is halted in order to successively decode the VOP images. Thus, the next VOP is sequentially decoded in this case.

Case 2

The case 2 applies when the externally set time code 97 indicates that it precedes the VOP time code 70 in the foregoing condition (2) such as when the externally set time code 97 is 01:00:00 and the VOP time code 70 in the foregoing condition (2) is 01:00:10 ("NO" at step ST56-3). In this case, the action to be taken is switched in response to the value of the object intra-coded indicator signal 7' (step ST56-6).

Thus, when the object intra-coded indicator signal 7' is ON ("NO" at step ST56-6), the comparator 100 places the search instruction signal 99 at "backward search", and supplies it together with the bit stream to the start code analyzer 102 (step ST56-7).

This enables the start code analyzer 102 to start analyzing the bit stream in the reverse direction, and to search the VOP start code previous to the foregoing condition (2).

On the contrary, when the object intra-coded indicator signal 7' is OFF ("YES" step ST56-6), that is, when it indicates that the "VOPs in the VOL undergo the predictive coding", the individual VOPs cannot be directly decoded because the VOPs in the VOL undergo the predictive coding. In this case, the individual VOP image data must be decoded by tracing back to the VOP image that does not undergo the predictive coding, that is, to the previous I-VOP, and the decoding must be restarted therefrom. This is achieved by the search instruction signal 99 that instructs to trace back to the previous I-VOP with carrying out the reverse search (step ST56-8).

Thus, in the present embodiment 6, when the object intra-coded indicator signal 7' is ON in the cases 1 and 2, the start code detection of the VOPs is continued according to the search instruction signal 99, and the VOP image data is skipped without the video information header analysis at step ST57.

Specifically, every time the VOP start code is detected, the following processings are iterated until the externally set time code 97 agrees with the VOP time code 70 obtained as a result of the search. These processings comprise the calculation of the VOP time code 70 indicating the absolute display time of the current VOP (step ST56-1); and a decision making as to whether the current VOP is a VOP to be displayed or not by comparing the current VOP time code 70 with the externally set time code 97 (step ST56-2) Then, when the externally set time code 97 agrees with the VOP time code 70 as a result of the search, which means that the decoding is stopped at the exact position of the VOP to be displayed, the operation of the random access is completed.

As described above, according to the present embodiment 6, when the object intra-coded indicator signal 7' that indicates whether all the VOPs in the VOL are intra coded or not is ON, that is, when all the VOPs in the VOL are intra coded, the sequential VOP decoding is skipped without performing the VOP header analysis for individual VOPs at step ST57. This enables the desired VOP image data to be directly searched for and decoded.

Furthermore, in the present embodiment 6, the VOP time code 70 is determined using the GOV time code 63 which is the time code of the initial VOP of the GOV, the count 85 fed from the start code analyzer 102 and the VOP rate information 87 on the coding side. This obviates the need for decoding the modulo-time base or VOP time increment information for each VOP, which means that random access can be achieved by calculating in advance the number of VOPs to be skipped from the externally set time code 97. Thus, the present embodiment 6 can dispense with the need for successively calculating the display time of each VOP to make the decision at steps ST47-1–ST47-3 of FIG. 36 as in the foregoing embodiment 5. This enables the random access faster than that of the embodiment 5. In brief, high-speed random access is implemented because the individual VOP time code can be identified from the VOP rate information without calculating the display time of each VOP with performing the successive VOP header analysis.

For example, considering a home video according to the MPEG-4 compression standard, which intra codes all VOPs and stores them on the storing medium 95 and edits a desired scene by combining them with other object videos provided through the Internet or by means of a CD-ROM or DVD-ROM, the decoding apparatus with the configuration of the present embodiment can make a high speed access to a picture at a desired time in the video pictures acquired, thereby enabling the video edition without stress. Furthermore, the video contents can be stored in a large capacity recording medium such as DVD-RAM with their VOPs being intra coded by the compression standard according to the MPEG-4, so that desired edition can be achieved by making high speed access when producing a television program.

Although the present embodiment 6 is described by way of example of the coded bit stream 81 as shown in FIG. 28, which not only includes the object intra-coded indicator signal 7' and VOP rate information 87 multiplexed into the VOL header 81*b*, but also includes in the GOV header 81*c* the GOV tine code 63 indicating the absolute display time of the initial VOP in the GOV, the present invention is not limited to this. For example, a coded bit stream (not shown) can be decoded which includes in the GOV header not only the GOV time code 63, but also the object intra-coded indicator signal 7' and VOP rate information 87. This is implemented by providing the GOV header analyzer 61 as shown in FIG. 37 with the decoding function of the object intra-coded indicator signal 7' and VOP rate information 87, in addition to the decoding function of the GOV time code 63.

Embodiment 7

In the present embodiment 7 in accordance with the present invention, a VOP decoder will be described for decoding the coded bit stream generated by the VOP encoder of the foregoing embodiment 2.

Thus, the VOP decoder of the present embodiment 7 is characterized in that it receives the coded bit stream 39 as shown in FIG. 15, decodes from the coded bit stream 39 the object intra-coded indicator signal 7', the display time multiplex identification information 34 and the time codes 35 of individual VOPs described in the embodiment 2, and controls the decoding and display of the VOPs in accordance with these values.

The VOP decoder in the present embodiment 7 has substantially the same configuration as the VOP decoder described in the embodiment 6, except for the header analyzer 42. Accordingly, only the header analyzer 42 of the present embodiment 7 will be described below.

Figure 41:
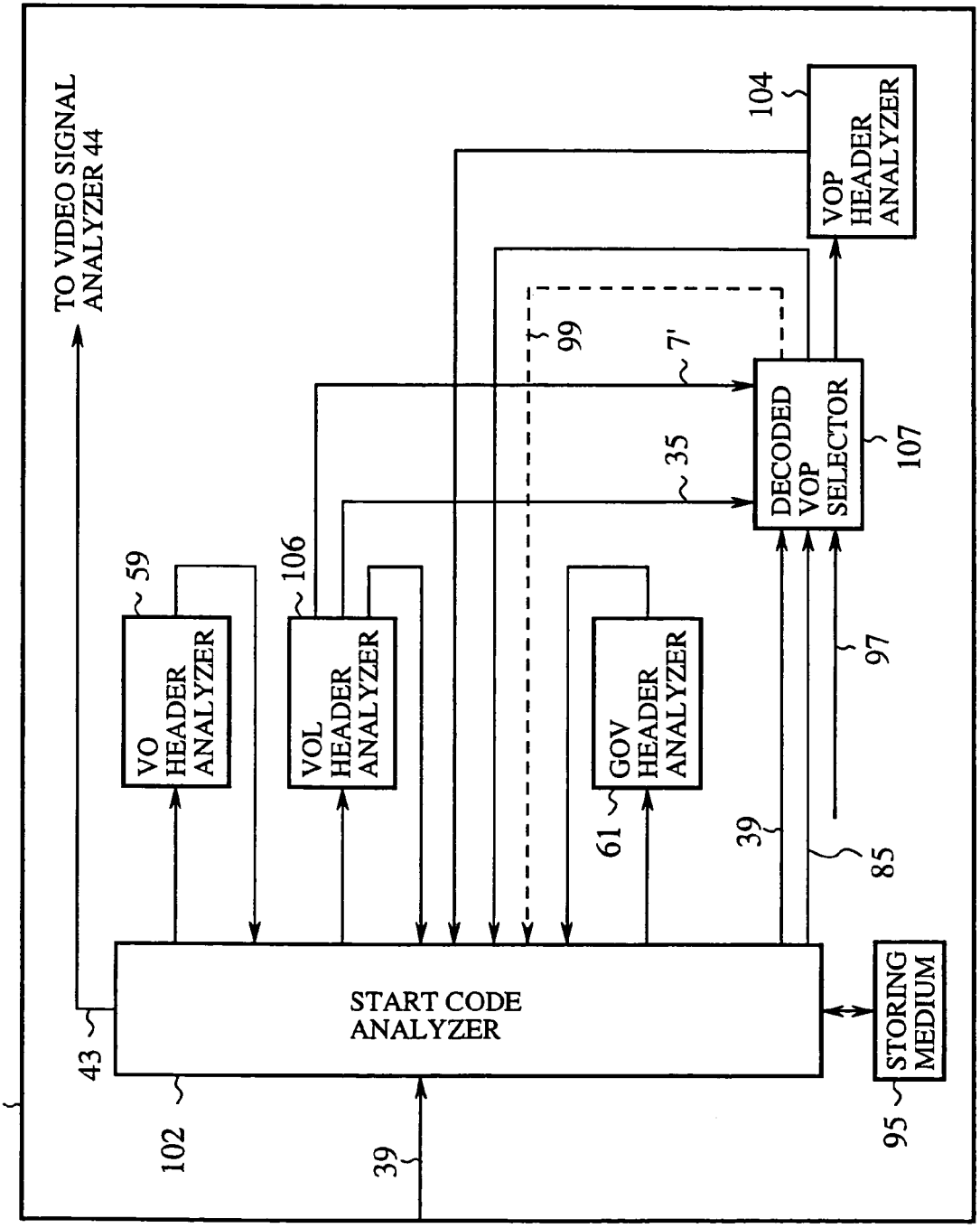
FIG. 41 is a block diagram showing an internal configuration of the header analyzer 42 of an embodiment 7 in accordance with the present invention.

FIG. 41 is a block diagram showing an internal configuration of the header analyzer 42 in the present embodiment 7. In FIG. 41, the reference numeral 106 designates a VOL header analyzer; and 107 designates a decoded VOP selector. Since the remaining configuration is the same as that of the header analyzer 42 of the embodiment 6 as shown in FIG. 37, the description thereof is omitted here by assigning the same reference numerals.

Figure 42:
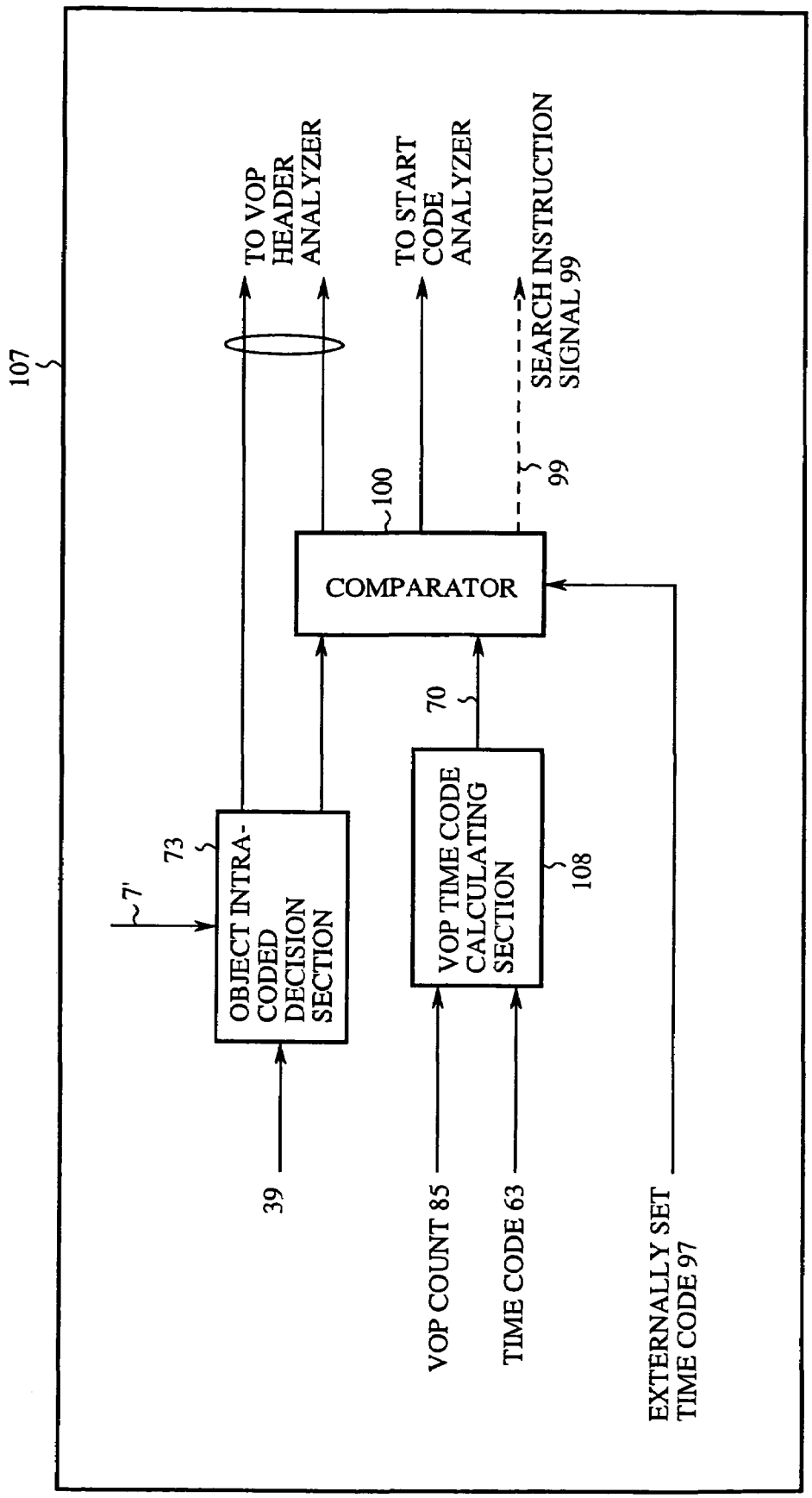
FIG. 42 is a block diagram showing the decoded VOP selector 107 as shown in FIG. 41.

FIG. 42 is a block diagram showing an internal configuration of the decoded VOP selector 107 of the present embodiment 7 as shown in FIG. 41. In FIG. 42, the reference numeral 73 designates an object intra-coded decision section; 100 designates a comparator; and 108 designates a VOP time code holder.

The operation of the header analyzer 42 of the present embodiment 7 will now be described.

Figure 43:
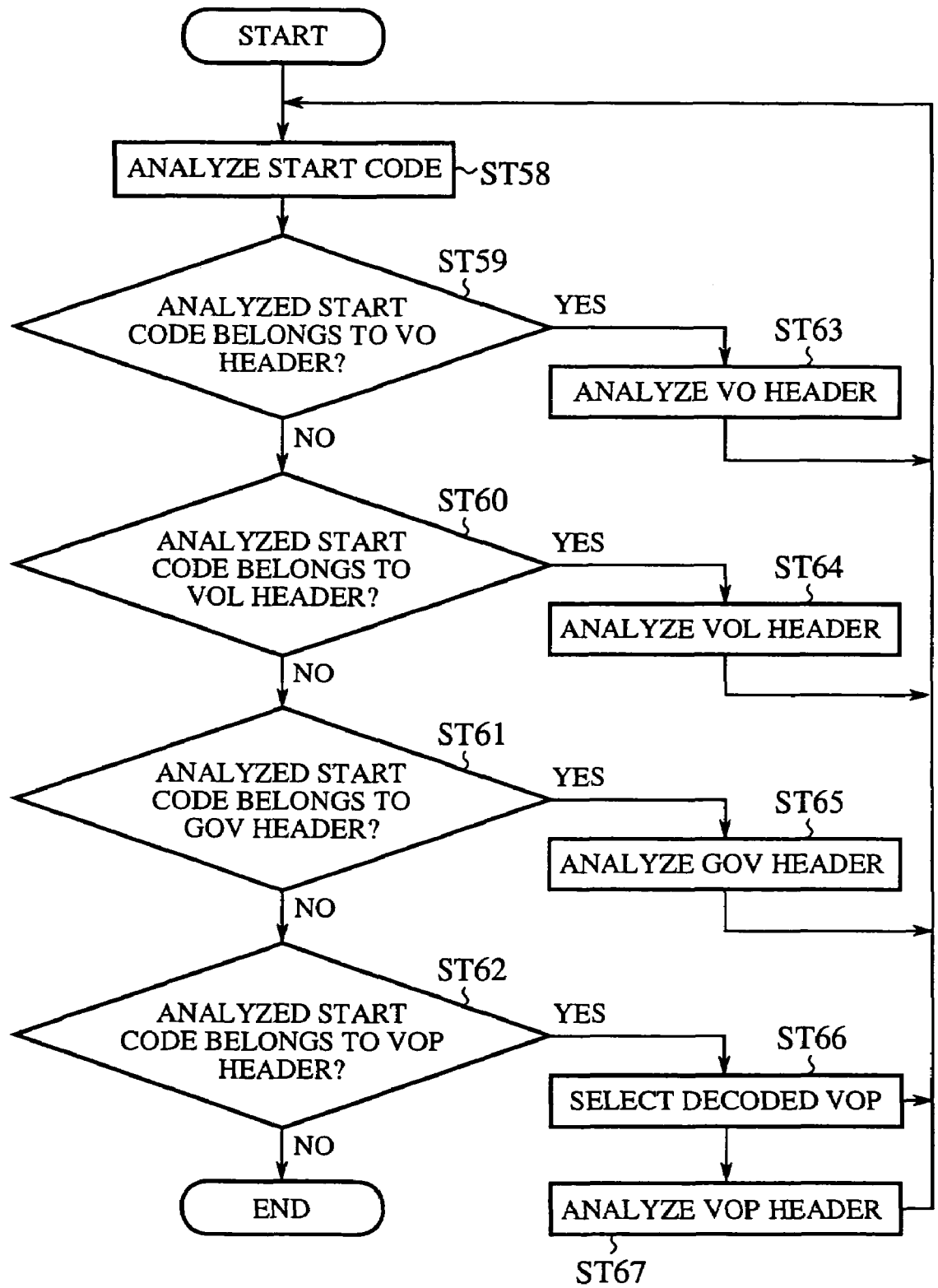
FIG. 43 is a flowchart illustrating the operation of the header analyzer 42 of the embodiment 7 in accordance with the present invention.

FIG. 43 is a flowchart illustrating the operation of the header analyzer 42 of the present embodiment 7.

In the header analyzer 42 of the present embodiment 7, the start code analyzer 102 analyzes the start code contained in the input coded bit stream 39, first (step ST58). The start code analyzer 102 supplies the bit stream to the VO header analyzer 59 when the analyzed start code indicates a VO (step ST59); to the VOL header analyzer 106 when the analyzed start code indicates a VOL (step ST60); to the GOV header analyzer 61 when the analyzed start code indicates the GOV (step ST61); and to the decoded VOP selector 107 when the analyzed start code indicates the VOP (step ST62).

Incidentally, when the VOP header analyzer 104 completes its analysis, the start code analyzer 102 supplies the bit stream 43 to the video signal analyzer 44, so that the video signal analyzer 44 carries out the analysis and decoding of the video signal of the current VOP, and returns the processing to the start code analysis, again. The start code analyzer 102 includes a VOP counter that increments the VOP count every time the VOP start code is detected, and supplies the count 85 to the decoded VOP selector 107. It is assumed here that the VOP counter is reset every time the VOL start code is detected.

The VO header analyzer 59 analyzes VO header information in the input bit stream, and supplies the bit stream after the analysis back to the start code analyzer 102 (step ST63).

The VOL header analyzer 106 analyzes the VOL header information in the input bit stream, and supplies the bit stream after the analysis back to the start code analyzer 102 (step ST64).

In the course of this, the VOL header analyzer 106 decodes the object intra-coded indicator signal 7', the display time multiplex identification information 34 and the time codes 35, which are contained in the VOL header information as shown in FIG. 15, and supplies them to the decoded VOP selector 107.

As described in the foregoing embodiment 2, the display time multiplex identification information 34 is decoded only when the object intra-coded indicator signal 7' is ON, that is, only when it indicates that all the VOPs contained in the VOL unit is intra-coded, and the time codes 35 are decoded only when the display time multiplex identification information 34 is also ON. Assume here that both the object intra-coded indicator signal 7' and display time multiplex identification information 34 are ON, and the time codes 35 of all the VOPs in the VOL are decoded by the VOL header analyzer 106.

The GOV header analyzer 61 analyzes the GOV header information in the input bit stream, and supplies the bit stream after the analysis back to the start code analyzer 102 (step ST65).

In the course of this, although the GOV header analyzer 61 decodes the GOV time code 63 contained in the GOV header information, the present embodiment 7 does not use the GOV time code information.

The decoded VOP selector 107, which has the high speed, simple and random access structure of the VOP disclosed in the present embodiment 7, selects the VOP to be decoded (step ST66). The random access mechanism of the present embodiment 7 is characterized in that it can obtain the VOP time codes to be compared with the externally set time code 97 by the comparator 100 without any calculation.

Figure 44:
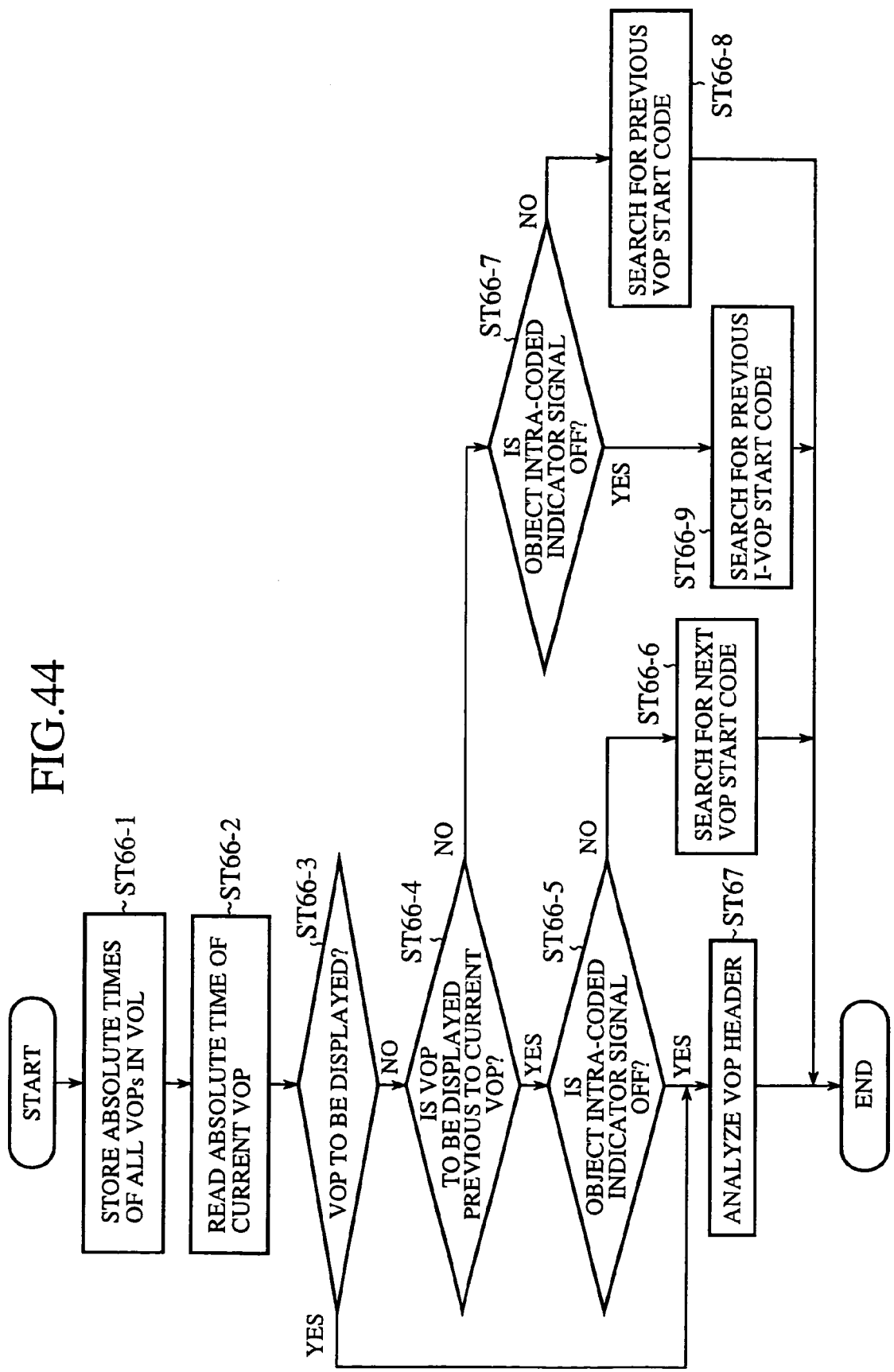
FIG. 44 is a flowchart illustrating the detail processing of a VOP random access mechanism at step ST66 by the decoded VOP selector 107 of the embodiment 7 in accordance with the present invention.

FIG. 44 is a flowchart illustrating the processing in detail of the VOP random access structure based on the decoded VOP selection at step ST66 by the decoded VOP selector 107.

With reference to FIGS. 42 and 44 mainly, the operation of the VOP random access processing will be described, in which the foregoing conditions (1)–(4) described in the embodiment 5 are also assumed as the operation conditions.

First, the time codes 35 of all the VOPs in the VOL decoded by the VOL header analyzer 106 are stored in the VOP time code holder 108 in the VOP selector 107 to be retained until the decoding of the VOL is completed (step ST66-1). In the condition (1), the decoding apparatus carries out normal decoding operation, here.

Assume the instant at which the decoding apparatus makes a transition from the condition (1) to condition (2).

In response to the transition from the condition (1) to condition (2) by the user operation, the VOP time code holder 108 in the decoded VOP selector 107 receives or generates a read command (not shown) for reading the time code 35 of the VOP image pointed by the count 85 at the transition.

In response to this, the VOP time code holder 108 reads as the VOP time code 70 the VOP pointed by the count 85 fed from the start code analyzer 102 at the instant of the transition from the condition (1) to condition (2), that is, the time code 35 of the VOP image at the time the decoding is to be halted in accordance with the condition (2), and supplies the VOP time code 70 to the comparator 100 (step ST66-2).

In this way, the foregoing structure can identify the VOP time code 70 at the time the decoding is to be halted in the condition (2) only from the count 85 fed from the start code analyzer 102 without carrying out any analysis of the VOP header or any calculation. Thus, the VOP time code 70 in the stop condition (2) is presented to the user.

Next, when the user carries out the condition (3), this will provide the externally set time code 97 to the comparator 100, and activate the random access structure by the decoded VOP selector 107.

Although in the example above, the VOP time code holder 108 is described such that it supplies the comparator 100 with the time code 35 of the VOP image pointed by the count 85 fed at the transition to the condition (2) as the VOP time code 70, this is not essential. For example, The VOP time code holder 108 can always supply the comparator 100 with the time code 35 of the VOP image, which is pointed by the count 85 constantly fed from the start code analyzer 102, as the VOP time code 70. However, in the latter case, the comparator 100 must be configured such that it implements the random access structure using the VOP time code 70 fed at the instant of the transition to the condition (2) and the externally set time code 97 fed by the operation of the condition (3). In brief, it is enough for the random access structure to operate such that it utilizes among the time codes 35 stored in the VOP time code holder 108 the VOP time code 70 at the transition to the condition (2) and the externally set time code 97.

More specifically, the comparator 100 first makes a decision as to whether the current VOP is the VOP the user wishes to display or not (step ST66-3) by comparing the externally set time code 97 with the VOP time code 70 of the current VOP which is fed from the VOP time code holder 108 and takes place at the time the decoding is halted in accordance with the condition (2).

When the externally set time code 97 agrees with the VOP time code 70 of the current VOP ("YES" step ST66-3), the VOP is decided as the "VOP to be displayed", followed by the VOP header analysis of the VOP to be displayed (step ST67). Otherwise ("NO" at step ST66-3), a decision is made as to whether the VOP to be displayed is previous to the current VOP or not by comparing the externally set time code 97 with the VOP time code 70 of the current VOP (step ST66-4). Thus, one of the following two cases 1 and 2 is decided.

Case 1

The case 1 applies when the externally set time code 97 indicates a time subsequent to the VOP time code 70 in the foregoing condition (2) such as the externally set time code 97 is 01:00:30, and the VOP time code 70 in the condition (2) is 01:00:10 ("YES" at step ST66-4). The action is switched in response to the value of the object intra-coded indicator signal 7' (step ST66-5).

More specifically, when the object intra-coded indicator signal 7' is ON ("NO" at step ST66-5), that is, when it indicates that "all the VOPs in the VOL are intra coded", the comparator 100 sets the search instruction signal 99 to "forward search", and sends it with the bit stream to the start code analyzer 102 (step ST66-6). Thus, the start code analyzer 102 searches for the VOP start code behind, that is, after the VOP time code 70 in the condition (2).

In contrast, when the object intra-coded indicator signal 7' is OFF ("YES" at step ST66-5), that is, when it indicates that "the VOPs in the VOL are subject to the predictive coding", the individual VOPs cannot be directly decoded because they undergo the predictive coding.

Accordingly, as in the foregoing embodiment 6, the VOP header analyzer 104 must carry out the processing corresponding to that of the steps ST47-1–47-3 and ST47-11 as shown in FIG. 36 in the normal VOP header analysis at the next step ST67 so as to analyze and decide the modulo-time base and VOP time increment of the individual VOPs and to successively decode the VOP images by calculating the VOP time code 70 of the current VOP at which the decoding is halted. Thus, in this case, the subsequent VOPs are sequentially decoded.

Case 2

The case 2 takes place when the externally set time code 97 indicates a time before the VOP time code 70 in the condition (2) such as the externally set time code 97 is 01:00:00, and the VOP time code in the condition (2) is 01:00:10 ("NO" at step ST66-4). The action is switched in response to the value of the object intra-coded indicator signal 7' (step ST66-7).

More specifically, when the object intra-coded indicator signal 7' is ON ("NO" at step ST66-7), the comparator 100 sets the search instruction signal 99 at "backward search", and sends it with the bit stream to the start code analyzer 102 (step ST66-8).

This makes it possible for the start code analyzer 102 to analyze the bit stream in the backward direction, thus enabling searching for the start code of the VOPs previous to the foregoing condition (2).

In contrast, when the object intra-coded indicator signal 7' is OFF ("YES" at step ST66-7), that is, when it indicates that "the VOPs in the VOL are subject to the predictive coding", the individual VOPs cannot be directly decoded. In this case, the decoding must be continued to the image data successively. Specifically, the decoding must be carried out by ascending to the VOP image that is not subjected to the prediction, that is, to the previous I-VOP, and be restarted therefrom. This is handled by instructing to perform the backward search by ascending to the previous I-VOP using the search instruction signal 99 (step ST66-9).

Thus, in the present embodiment 7, when the object intra-coded indicator signal 7' is ON in the cases 1 and 2, the VOP start code detection is continued according to the search instruction signal 99, and the VOP image data is skipped without carrying out the VOP header analysis at step ST57 as in the embodiment 6.

In summary, in the present embodiment 7, because the VOP time code holder 108 stores the time codes 35 of all the VOPs in the VOL decoded by the VOL header analyzer 106 through the processing at step ST66-1 until the decoding of the current VOL is completed, every time the decoding is halted by the user operation in the condition (2), the VOP time code holder 108 reads the time code 35 of the VOP pointed by the current count 85 as the VOP time code 70 (step ST66-2); and a decision is made as to whether the current VOP is a VOP to be displayed or not by comparing the VOP time code 70 with the externally set time code 97 (step ST66-3). These processings are iterated until the externally set time code 97 agrees with the VOP time code 70 obtained as a result of the search. Then, when the externally set time code 97 agrees with the VOP time code 70 as a result of the search, which means that the decoding stops at the VOP to be displayed, the operation of the random access is completed.

As described above, according to the present embodiment 7, when the object intra-coded indicator signal 7', which indicates whether all the VOPs in the VOL are intra coded or not, is ON, that is, when all the VOPs in the VOL are intra coded, the desired VOP image data is directly searched for and decoded. This is because the VOP header analysis for respective VOPs at step ST67 can be omitted, and hence it is unnecessary to carry out the sequential VOP decoding.

Furthermore, the present embodiment 7 is configured such that it directly decodes the time codes 35 in the VOPs from the VOL header, and stores them in the VOP time code holder 108 so that they are read in accordance with the count 85 fed from the start code analyzer 102. This makes it possible to dispense with the need for decoding the information about the modulo-time base and VOP time increment, and hence the decoder does not require any calculation structure. Thus, the VOP to be decoded can be identified only by comparing the externally set time code 97 with each of the time codes 35 stored. This offers an advantage of being able to implement a very high speed random access that is faster than those of the embodiments 5 and 6.

For example, considering a home video according to the MPEG-4 compression standard, which intra codes all VOPs and stores them in the storing medium 95, and edits a desired scene by combining them with other object videos provided through the Internet or a CD-ROM or DVD-ROM, the decoding apparatus with the configuration of the present embodiment can make a high speed access to a picture at a desired time in the video pictures acquired, thereby enabling the video edition without stress. Furthermore, the video contents can be stored in a large capacity recording medium such as a DVD-RAM with their VOPs being intra coded by the compression standard according to the MPEG-4, so that desired edition can be achieved with making high speed access to produce a television program.

Although the present embodiment 7 is described by way of example of decoding the coded bit stream 39 including in the VOL header the object intra-coded indicator signal 7', display time multiplex identification information 34 and time codes 35 as shown in FIG. 15, the present invention is not limited to this. For example, the same concept is applicable to the VOP decoder for decoding the coded bit stream 40 or 41 as shown in FIG. 16 or 17.

For example, because the VOP time code contained in the GOV is multiplexed for each GOV, it is enough for the VOP decoder for decoding the coded bit stream 40 as shown in FIG. 16 to be configured such that the VOL header analyzer 106 decodes only the object intra-coded indicator signal 7', and the GOV header analyzer 61 decodes the display time multiplex identification information 34 and time codes 35 in response to the object intra-coded indicator signal 7'. In this case, as for the GOV including the display time multiplex identification information 34 which is ON, the high speed random access can be implemented for all the VOPs in the GOV.

As for the VOP decoder for decoding the coded bit stream 40 as shown in FIG. 17, it can be configured such that the GOV header analyzer 61 decodes the object intra-coded indicator signal 7', display time multiplex identification information 34 and time codes 35, so that the random access function can be defined for each GOV independently.

Although the foregoing embodiments 1–7 describe the image coding apparatus or image decoding apparatus according to the MPEG-4 that defines the coded (decoded)

images in the form of the object-based VOPs, and codes the images on an object by object basis, the present invention is not limited to this. For example, it is applicable to the image coding apparatus, image coding method, image decoding apparatus and image decoding method according to the MPEG-1 or MPEG-2 that does not have the concept of the object or VOP. In this case, coded images at respective times or image frames in a television signal, which constitute a moving picture sequence, correspond to the VOPs in the foregoing embodiments 1–5. Thus, replacing the VOPs by the coded images or image frames makes it possible to handle them in the same manner as in the embodiments 1–7.

For example, the MPEG-1 or MPEG-2 reserves a user data area which allows a user to define data freely, or bit fields for future functional extension. Thus, defining the syntax according to the present invention in these data areas can improve the function of the random access or frame skip control.

Although in the foregoing embodiments 1–7, the object intra-coded indicator signal 7' is described as the information indicating whether all the VOPs included in the VOL- or GOV-based moving picture sequence according to the MPEG-4 are intra coded or not, the present invention is not limited to the VOL- or GOV-based moving picture sequence. For example, as for the VOPs that constitute any units of the moving picture sequence, or defines the moving picture sequence, the object intra-coded indicator signal 7' can serve as information indicating whether all the VOPs included in the moving picture sequence based on the units other than the VOL or GOV are intra coded or not. This holds true when the VOPs are replaced by the coded images or image picture frames.

INDUSTRIAL APPLICABILITY

As described above, the image coding apparatus and image coding method are based on the MPEG-4, and are suitable for coding images on an object by object basis.

Furthermore, the image decoding apparatus and image decoding method according to the present invention are also based on the MPEG-4, and are suitable for decoding the coded bit stream in which the images are coded on the object by object basis.

The invention claimed is:

1. An image coding apparatus for generating a coded bit stream of video object layer (VOL) made up of a plurality of coded video object planes (VOP) and header information of the VOL, the image coding apparatus comprising a header multiplexer configured to multiplex the header information of the VOL, wherein said header multiplexer is configured to multiplex intra-coded indicator information indicating whether all VOPs of a moving picture sequence of a VOL are intra-coded, and to multiplex display time multiplex identification information indicating whether display time information that uniquely identifies display time of each VOP contained in a VOL is multiplexed into the header information of the VOL, and to multiplex said display time information according to the value of said display time multiplex identification information.

* * * * *